(12) United States Patent
Anderson et al.

(10) Patent No.: US 12,204,805 B2
(45) Date of Patent: Jan. 21, 2025

(54) TECHNIQUES FOR USING IN-AIR HAND GESTURES DETECTED VIA A WRIST-WEARABLE DEVICE TO OPERATE A CAMERA OF ANOTHER DEVICE, AND WEARABLE DEVICES AND SYSTEMS FOR PERFORMING THOSE TECHNIQUES

(71) Applicant: Meta Platforms Technologies, LLC, Menlo Park, CA (US)

(72) Inventors: Christopher Anderson, New York, NY (US); Paulo Jose Telo Coelho, Seattle, WA (US); Luke O'Connor, Toronto (CA); Emanuele Formento, San Francisco, CA (US); Diego Adrian Gutnisky, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/309,762

(22) Filed: Apr. 28, 2023

(65) Prior Publication Data

US 2023/0359422 A1   Nov. 9, 2023

Related U.S. Application Data

(60) Provisional application No. 63/414,886, filed on Oct. 10, 2022, provisional application No. 63/337,893, filed on May 3, 2022.

(51) Int. Cl.
*G06F 3/14* (2006.01)
*G02B 27/01* (2006.01)
(Continued)

(52) U.S. Cl.
CPC .......... *G06F 3/14* (2013.01); *G02B 27/0172* (2013.01); *G06F 1/163* (2013.01); *G06T 3/40* (2013.01); *G06V 40/174* (2022.01); *G06V 40/28* (2022.01)

(58) Field of Classification Search
CPC ......... G06F 3/14; G06V 40/174; G06V 40/28
(Continued)

(56) References Cited

U.S. PATENT DOCUMENTS

2009/0005700 A1   1/2009   Joshi et al.
2011/0221656 A1   9/2011   Haddick et al.
(Continued)

FOREIGN PATENT DOCUMENTS

CN   112269471 A   1/2021

OTHER PUBLICATIONS

International Search Report and Written Opinion for International Application No. PCT/US2023/020826, mailed Aug. 4, 2023, 10 pages.

*Primary Examiner* — Calvin C Ma
(74) *Attorney, Agent, or Firm* — Morgan, Lewis & Bockius LLP

(57) ABSTRACT

Systems and methods are provided for using a gesture detected at a wrist-wearable device to cause presentation of camera data at a head-wearable device. One example method includes receiving, via one or more sensors of a wrist-wearable device worn by a user, data generated based on performance of an in-air hand gesture by the user. In accordance with a determination that the data indicates that the in-air hand gesture is a camera-control gesture, the method further includes causing presentation to the user, via a display of a head-wearable device that is worn by the user and that is in communication with the wrist-wearable device, of a representation of camera data from a camera that (Continued)

is in communication with one or both of the wrist-wearable device and the head-wearable device.

20 Claims, 47 Drawing Sheets

(51) Int. Cl.
  *G06F 1/16* (2006.01)
  *G06T 3/40* (2006.01)
  *G06V 40/16* (2022.01)
  *G06V 40/20* (2022.01)
(58) Field of Classification Search
  USPC .......................................................... 345/156
  See application file for complete search history.

(56) References Cited

U.S. PATENT DOCUMENTS

| | | | |
|---|---|---|---|
| 2013/0123656 | A1 | 5/2013 | Heck |
| 2013/0235332 | A1 | 9/2013 | Blum et al. |
| 2016/0349849 | A1* | 12/2016 | Kwon .................... G06F 3/017 |
| 2020/0097083 | A1 | 3/2020 | Mao et al. |
| 2021/0064132 | A1 | 3/2021 | Rubin et al. |
| 2022/0121344 | A1* | 4/2022 | Pastrana Vicente .. G06F 3/0488 |

\* cited by examiner

700 ⇘

710
Receive data generated based on performance of an in-air hand gesture by a user that is wearing a wrist-wearable device

720
In accordance with a determination that the data indicates that the in-air hand gesture is a camera-control gesture

722
Cause presentation to the user, via a display of a head-worn device that is worn by the user and that is in communication with the wrist-wearable device, of a representation of camera data from a camera that is in communication with one or both of the wrist-wearable device and the head-worn device

730
The data is generated using, in part, one or more sensors of the wrist-wearable device, and While data generated by the one or more sensors of the wrist-wearable device indicates that the in-air hand gesture is maintained, continue to cause the presentation of the representation of the camera data via the display of the head-worn device

732
In accordance with a determination that the in-air hand gesture is no longer maintained, cause the presentation of the representation of the camera data via the display of the head-worn device to cease

734
In accordance with a determination that data generated by the one or more sensors of the wrist-wearable device indicates that the in-air hand gesture is no longer maintained

735
Cause a capture of an image within the field of view using the camera, and cause presentation of a representation of the image via the display of the head-worn device (C)

902
Responsive to an indication that a user wearing a head-wearable device requests to enable vestigial ear muscle detection, initiate a vestigial muscle training mode, while in a vestigial muscle training mode:

904
Present instructions to the user to perform a facial movement to move a respective vestigial ear muscle of one or more vestigial ear muscles

906
In accordance with a determination that facial movement related data detected via sensors of the head-worn device and based on the facial movement performed by the user satisfies detectable vestigial ear muscle movement criteria associated with movement of the respective vestigial ear muscle:

908
Provide an indication that a vestigial ear muscle movement was detected

910
Receive a user input to assign a vestigial ear muscle gesture to the vestigial ear muscle movement

912
Store the facial movement related data associated with the vestigial ear muscle gesture

Figure 9

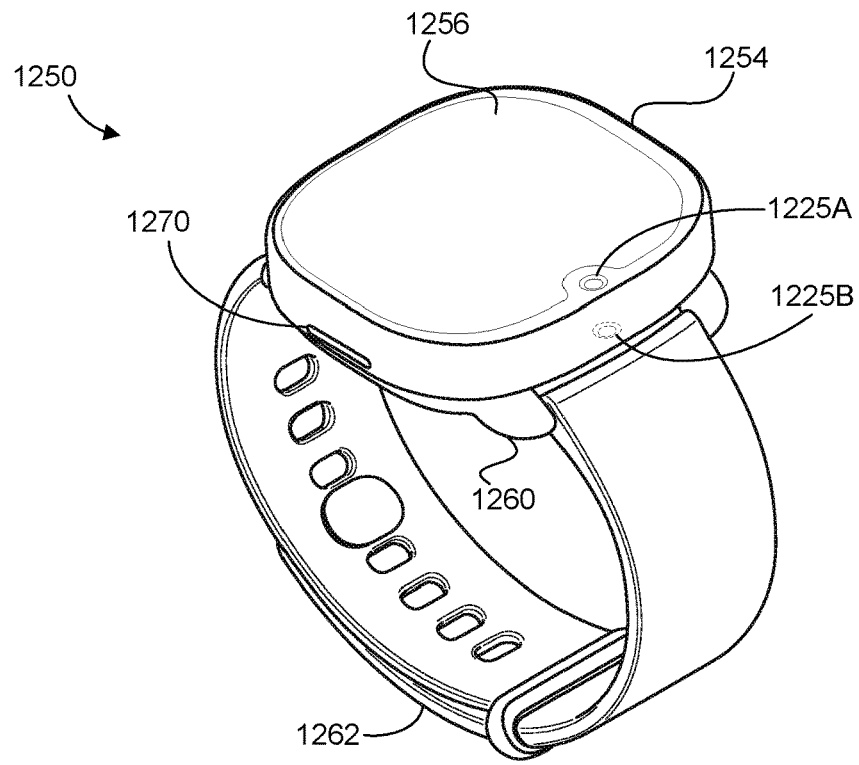
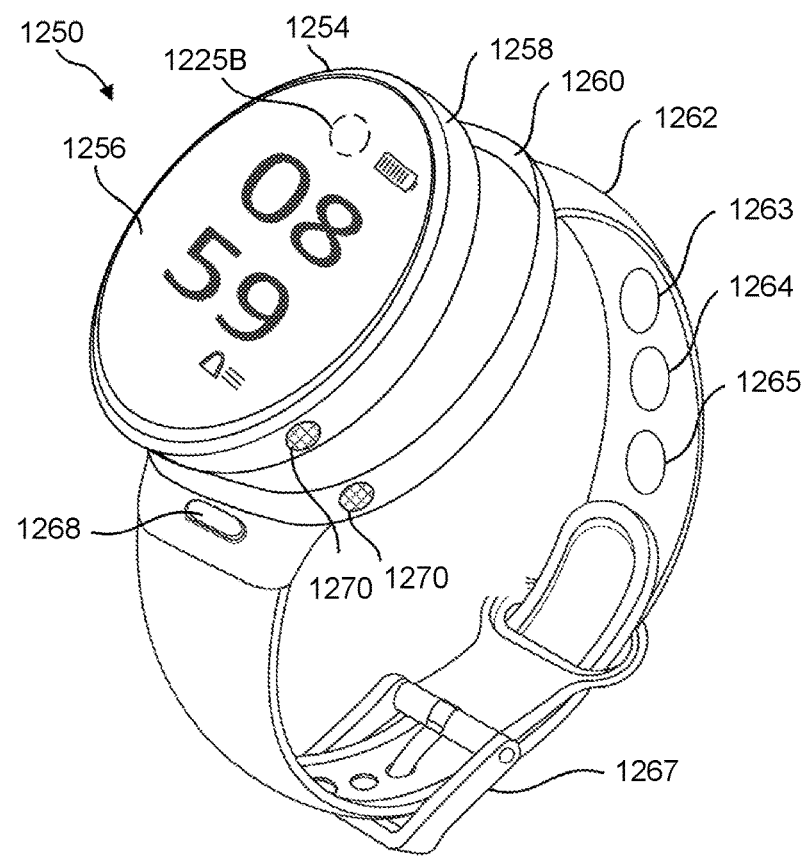
FIG. 12A

TECHNIQUES FOR USING IN-AIR HAND GESTURES DETECTED VIA A WRIST-WEARABLE DEVICE TO OPERATE A CAMERA OF ANOTHER DEVICE, AND WEARABLE DEVICES AND SYSTEMS FOR PERFORMING THOSE TECHNIQUES

RELATED APPLICATION

This application claims priority to U.S. Provisional Patent Application No. 63/414,886, filed Oct. 10, 2022, titled "Techniques For Using In-Air Hand Gestures Detected Via A Wrist-Wearable Device To Operate A Camera Of Another Device, And Wearable Devices and Systems For Performing Those Techniques," and U.S. Provisional Patent Application No. 63/337,893, filed May 3, 2022, titled "Techniques for Using In-Air Hand Gestures Detected Via A Wrist-Wearable Device To Operate A Camera Of Another Device, And Wearable Devices and Systems For Performing Those Techniques," which is hereby incorporated by reference in its entirety.

TECHNICAL FIELD

The present disclosure relates generally to wearable devices and methods for enabling quick and efficient capture of camera data and the presentation of a representation of the camera data at a coupled display, more particularly, to wrist-wearable devices configured to offer low-friction camera-control gestures based on the user's performance of a hand gesture and cause the capture of camera data at another device (e.g., a head-wearable device) and the presentation of the representation of the camera data at a display of another device (e.g., the head-wearable device).

BACKGROUND

Computing devices, such as computers, phones, and tablets, require users to navigate through a number of different user interfaces and/or provide multiple inputs to capture camera data and present the captured data. Requiring multi-step input processes through different applications and then through different user interfaces within those different applications requires a user to stop performing an activity (removing themselves from an experience) to interact with the computing devices for an extended time period, thereby wasting time and creating user dissatisfaction with such inefficient use cases. Additionally, requiring multi-step input processes for sharing data (such as an image or video) via computing devices requires the devices to be powered on longer and consume their available energy, thereby depleting what can be a limited power supply. Techniques for users to capture pictures and share them with their contacts are inadequate as they require direct user intervention at multiple points in the process (e.g., a user has to select activate an application, perform an action at the application, request to share content from the application, locate a contact they wish to share content with, select and share the content with the contact), thereby becoming burdensome to users, while also inefficiently making use of limited computing and power resources for certain computing devices (particularly wrist-wearable devices).

Many actions to control cameras are also not low friction as they can involve large arm movements, extended movements of a device to capture a desired image, and/or noisy voice commands that are unsuitable in certain social circumstances.

As such, there is a need for addressing one or more of the drawbacks discussed above by developing techniques to enable quick and efficient methods for a user to capture, present, and/or share camera data using low-friction inputs detected by a sensor of a wrist-wearable device.

SUMMARY

The wrist-wearable devices, head-wearable devices, and methods of use thereof (as well as systems including both wrist-wearable and head-wearable devices) described herein address one or more of the above-mentioned drawbacks by seamlessly allowing a user to interact with imaging devices using a wrist-wearable device. In particular, the wrist-wearable device can cause one or coupled devices, such as a head-wearable device, to seamlessly perform one or more actions associated with operating an imaging device and/or applications at the wrist-wearable device and/or the head-wearable devices. As one example, a method of using a gesture detected at a wrist-wearable device to present camera data at a head-wearable device is provided. The wrist-wearable device receives, via one or more sensors on the wrist-wearable device worn by a user, data based on performance of an in-air hand gesture by the user, and in accordance with a determination that the data indicates that the in-air hand gesture is a camera-control gesture, causes the presentation, via a display of a head-wearable device that is worn by the user and that is in communication with the wrist-wearable device, a representation of camera data from a camera that is in communication with one or both of the wrist wearable device and the head-wearable device.

This can be done without requiring the user to perform a lengthy sequence of inputs, instead, in some embodiments, the number of user inputs (e.g., pinch gestures detected by a wrist-wearable device) can be as few as one (one user input to cause activation of the imaging device and then capturing of an image using the imaging device). Further, the wrist-wearable devices described herein improve users' daily activities and productivity by reducing the number of direct inputs required by a user to access an application and/or capture images. For example, the wrist-wearable devices and methods described herein, in one embodiment, provide improved techniques for quickly capturing images and sharing them with contacts. In particular, a user, in some embodiments, can share images via image-sharing applications, with just one or two gestures detected by a wrist-wearable device. The reduced number of required inputs do not exhaust power and processing resources of a wrist-wearable device, thereby extending the battery life of the wrist-wearable device while further sustained user interactions with new systems make use of a wrist-wearable device as an input controller used to operate hardware at another device (e.g., in-air hand gestures detected by sensors of a wrist-wearable device to operate a head-wearable device's camera, all of which can be done using low-friction gestures in which a user need only move their digits and need not make large arm movements that would be socially unacceptable).

To help further the above goals, and as was briefly noted above, some embodiments described herein also make use of components of other wearable devices, such as a head-wearable device (e.g., smart glasses or virtual reality headset), including speaker, microphone, and/or camera of these other wearable devices to allow for seamlessly capturing and sharing data between the user and others. For instance, in some embodiments, a user can request, via the wrist-wearable device, to capture and share an image with a contact, and the wrist-wearable device, responsive to the request, can cause an imaging device of a head-wearable device to activate and be used in the capture of an image to be shared with the contact. Determinations can also be conducted as to whether an imaging device of the wrist-wearable device or the head-wearable device should be utilized (e.g., based on current power levels at each of the devices and/or based on available computing resources at each of the devices, and the like), and the appropriate imaging device can be activated based on those determinations, thereby furthering the benefits of making efficient use of limited power and computing resources at wearable devices. Additional examples are explained in further detail below.

BRIEF DESCRIPTION OF THE DRAWINGS

A more particular description may be had by reference to the features of various embodiments, some of which are illustrated in the appended drawings. The appended drawings illustrate pertinent example features of the present disclosure. The description may admit to other effective features as the person of skill in this art will appreciate upon reading this disclosure.

FIG. 9 illustrates a detailed flow diagram of a method of detecting vestigial ear movements at a head-wearable device, according to some embodiments.

FIGS. 12A-12E illustrate an example wrist-wearable device, in accordance with some embodiments.

In accordance with common practice, like reference numerals may be used to denote like features throughout the specification and figures.

DETAILED DESCRIPTION

Figure 1A:
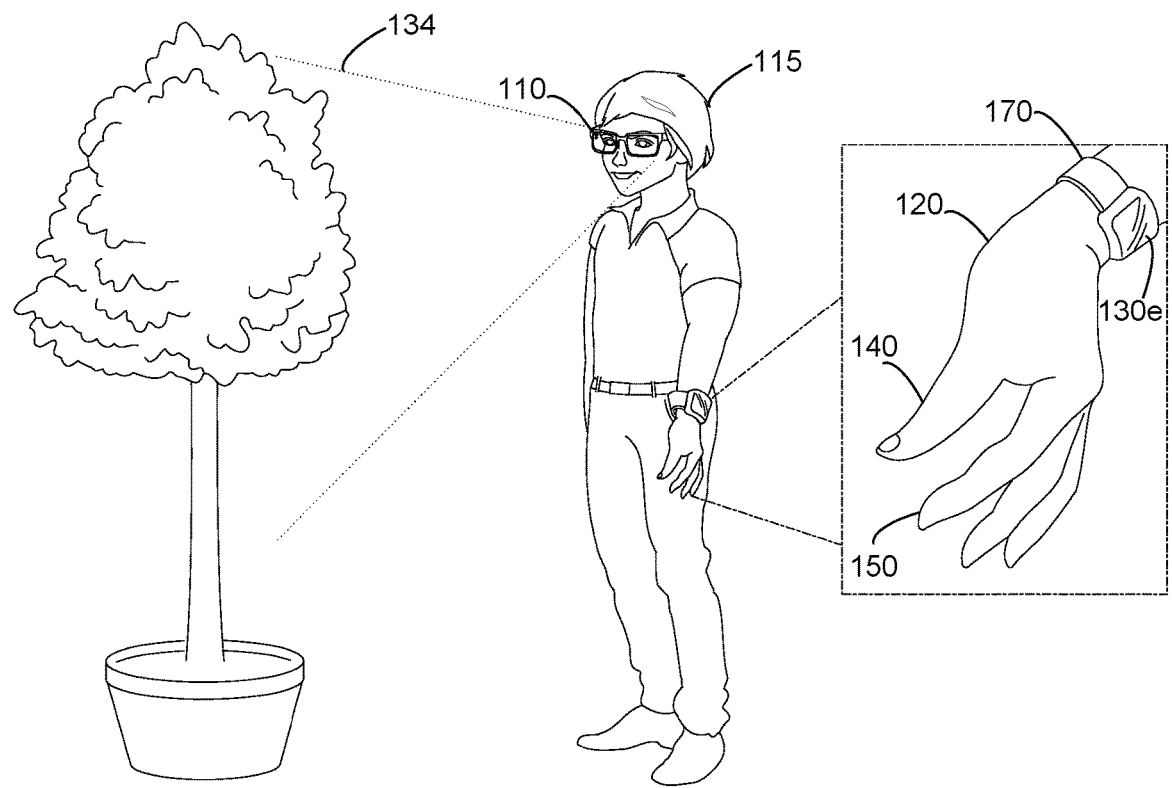
FIGS. 1A-1F illustrate coordinating operations of a wrist-wearable device and a head-wearable device to cause presentation of camera data, in accordance with some embodiment.

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

FIGS. 1A-1F illustrate coordinating operations of a wrist-wearable device 170 and a head-wearable device 110 to cause presentation of camera data, in accordance with some embodiments. In particular, using gestures detected at a wrist-wearable device 170 to cause presentation of camera data at a head-wearable device 110. In some embodiments, the wrist-wearable device 170 is communicatively coupled with the head-wearable device 110 (e.g., by way of a Bluetooth connection between the two devices, and/or the two devices can also both be connected to an intermediary device such as a smartphone that provides instructions and data to and between the two devices). The wrist-wearable device 170 includes one or more displays 130a (e.g., a touch screen 130e) for presenting a visual representation of data to a user 115, speakers for presenting an audio representation of data to the user 115, microphones for capturing audio data, imaging devices 111 (e.g., a camera) for capturing image data and/or video data (referred to as "camera data"), and sensors (e.g., sensors 1121, such as neuromuscular-signal sensors (e.g., electromyography (EMG) sensors), inertial measurement units (IMU)s, biometric sensors, position sensors, and/or any other sensors described below in reference to FIG. 11) for detecting and determining one or more hand gestures performed by the user 115. The head-wearable device 110 includes one or more imaging devices 111, microphones, speakers, displays 130 (e.g., a heads-up display 130b, a built-in or integrated monitor or screen, a projector, and/or similar device), and/or sensors 1121. In some embodiments, the one or more components of the head-wearable device 110 described above are coupled with the housing and/or lenses of the head-wearable device 110. In some embodiments, the one or more components of the wrist-wearable device 170 described above are coupled with a wrist-wearable structure (e.g., a band portion) of the wrist-wearable device 170, housed within a capsule portion of the wrist-wearable device 170 or a combination of the wrist-wearable structure and the capsule portion. In some embodiments, the wrist-wearable device 170 and the head-wearable device 110 are communicatively coupled via an intermediary device (e.g., a server 1170, a computer 1174a, a smartphone 1174b and/or other devices described below in reference to FIG. 11) that is configured to control the wrist-wearable and head-wearable devices 170 and 110.

In some embodiments, the wrist-wearable device 170 is configured to cause the head-wearable device 110 (and/or other communicatively coupled device with an imaging device 111) to capture, receive, and/or present camera data. Particularly, in some embodiments the wrist-wearable device 170 is configured to detect hand gestures (e.g., in-air hand gesture, surface-contact gestures) performed by the user, and if the hand gesture is determined as a camera-control gesture, cause the head-wearable device 110 to capture, receive, and/or present camera data. In some embodiments, the different hand gestures are detected using only the sensors of the wrist-wearable device 170. For example, a hand gesture can be detected using only neuro-muscular-signal data sensed by neuromuscular-signal sensors, IMU data sensed by IMU sensors, etc. In some embodiments, the sensor data of the wrist-wearable device 170 can be combined to detect that a hand gesture was performed. For example, the wrist-wearable device 170 can detect a hand gesture using neuromuscular-signal data and IMU data. In some embodiments, the hand gesture is identified as a camera-control gesture based, in part, on sensor data from one or more sensors of the wrist-wearable device 170, which is obtained while the wrist-wearable device 170 is worn by the user 115. For example, the wrist-wearable device 170 can detect a hand gesture and determine that the hand gesture is a camera-control gesture based, in part, on EMG sensor data and/or IMU data detected by its one or more sensors. Alternatively, or in addition, in some embodiments, the hand gesture is determined as a camera-control gesture based on camera data captured by communicatively coupled imaging devices 111. For example, camera data captured by the head-wearable device 110, wrist-wearable device 170, and/or other imaging device communicatively coupled with the wrist-wearable device 170 can be processed (e.g., computer vision) to identify a hand gesture.

Figure 11:
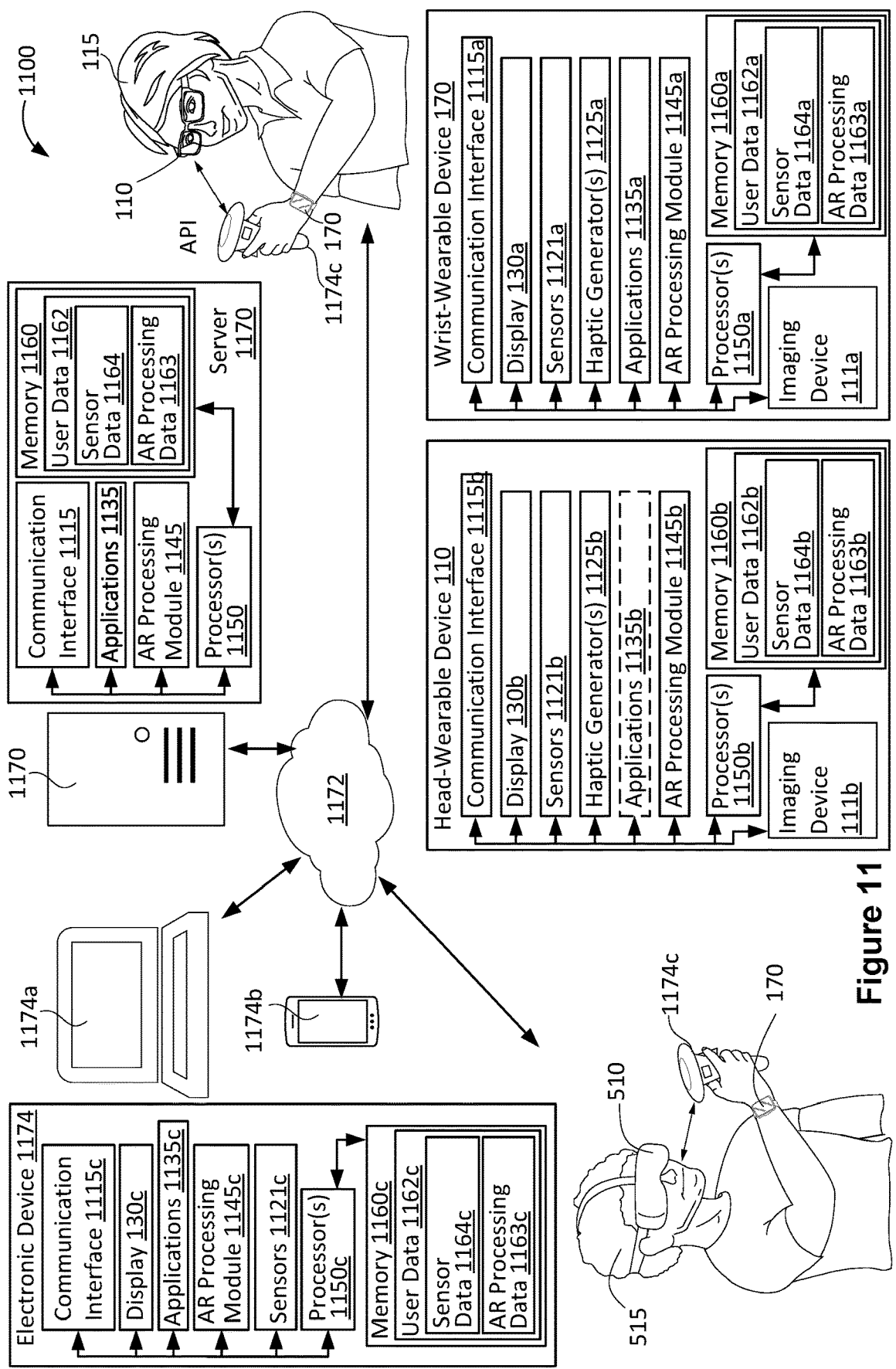
FIG. 11 illustrates a system of one or more devices for capturing and presenting camera data, in accordance with some embodiments.

The hand gesture can be an in-air gesture, a surface-contact gesture, and or other gestures that can be detected and determined based on movements of a single hand (e.g., a one-handed gesture performed with a user's hand that is wearing/donning the wrist-wearable device). In-air means, in some embodiments, that the user 115's hand 120 does not contact a portion of the wrist-wearable device 170 (or other communicatively coupled device), in other words the gesture is performed in open air in 3D space and without contacting the wrist-wearable device 170. Surface-contact gestures (contacts at surfaces other than the wrist-wearable device 170) more generally are also contemplated in which neuromuscular signals sensed by one or more EMG sensors (or other types of data from other sensors, such as proximity sensors, time-of-flight sensors, sensors of an inertial measurement unit, etc.) can be used to detect a contact (or an intention to contact) a surface (e.g., a single or double finger tap on a table, on a user's leg, a couch, etc.). Thus, while the primary example herein is an in-air gesture, the disclosure is not limited to those in-air gestures, as other gestures that do not contact a wrist-wearable device 170 are also contemplated, including the surface-contact gestures just described. Further, hand gestures can be associated with one or more commands other than a camera-control gesture. The hand gestures, when detected and determined as a respective command by one or more processors (e.g., processors 1150; FIG. 11), are configured to cause an action to be performed at a computing device, such as the wrist-wearable device 170, head-wearable device 110, or other device described below in reference to FIG. 11. In other words, although FIGS. 1A-1F illustrate the coordination between the wrist-wearable device 170 and the head-wearable device 110 using detected gestures by the wrist-wearable device 170, gestures detected by the wrist-wearable device 170 can cause other devices (e.g., smartphones, tablets, security cameras, etc.) to capture, provide, and/or present camera data as described below in reference to FIGS. 4A-4J.

In some embodiments, the head-wearable device 110 is a pair of smart glasses, augmented reality (AR)goggles (with or without a heads-up display), AR glasses (with or without a heads-up display), other head-mounted displays, or head-wearable device 110). The head-wearable device 110 is configured to capture camera data via an imaging device 111 and/or present a representation of the camera data via the display 130. In some embodiments, the display 130 is coupled with one or both of the lenses of the head-wearable device 110. Camera data presented by the display 130 is presented in conjunction with the field of view 134 of the user 115. In some embodiments, the camera data is overlayed over a portion of the field of view 134 of the user 115. In addition, in some embodiments, the head-wearable device 110 is configured to capture audio data via a microphone and/or present a representation of the audio data via speakers.

In some embodiments, head-wearable device 110 is configured to present an artificial-reality environment (e.g., AR, virtual reality (VR) environment, and the like) and/or perform one or more commands in an artificial-reality environment. In some embodiments, the head-wearable device 110 can be an artificial-reality system including, but not limited to, non-immersive, semi-immersive, and fully-immersive VR systems; marker-based, markerless, location-based, and projection-based augmented reality systems; hybrid reality systems; and other types of mixed reality systems.

Turning to FIG. 1A, the user 115 is viewing a physical environment including one or more objects while wearing the head-wearable device 110 and the wrist-wearable device 170. While wearing the wrist-wearable device 170, sensor data is monitored to sense a hand gesture performed by user 115. The sensor data can include EMG data (e.g., one or more neuromuscular signals sensed by EMG sensors); IMU data (e.g., position, orientation, and/or other data sensed by one or more IMUs); acceleration data (e.g., sensed by one or more accelerometers), as well as other sensor data described below in reference to FIG. 11. The data used to detect and determine a hand gesture can also be data from an imaging device 111 that is able to see the user 115's hand 120 to use computer vision to detect gestures. One or all of the sensors can be utilized to provide data for detecting and determining a hand gesture. The sensed hand gestures are further determined as a particular control gesture (e.g., a camera-control gesture) based, in part, on the sensor data. For example, when the user 115 moves a portion of their hand or intends to move a portion of their hand (e.g., phalanges 140, 150, etc.), the wrist-wearable device 170 detects position and/or orientation data as well as neuromuscular signals generated by the user 115's hand 120 movement. The wrist-wearable device 170, using the one or more processors 1150, determines the type of hand movements performed or intended to be performed by the user 115 as well a control command associated with the hand gesture based on the detected position and/or orientation data and neuromuscular signals. As described below, the wrist-wearable device 170 provides one or more commands associated with the hand gesture to another device, such as the head-wearable device 110, to perform a corresponding action associated with operating the other device. Alternatively, in some embodiments, the wrist-wearable device 170 provides sensor data associated with the hand gesture to another device such that the other device can determine the type of hand gesture performed by the user 115.

Figure 1B:
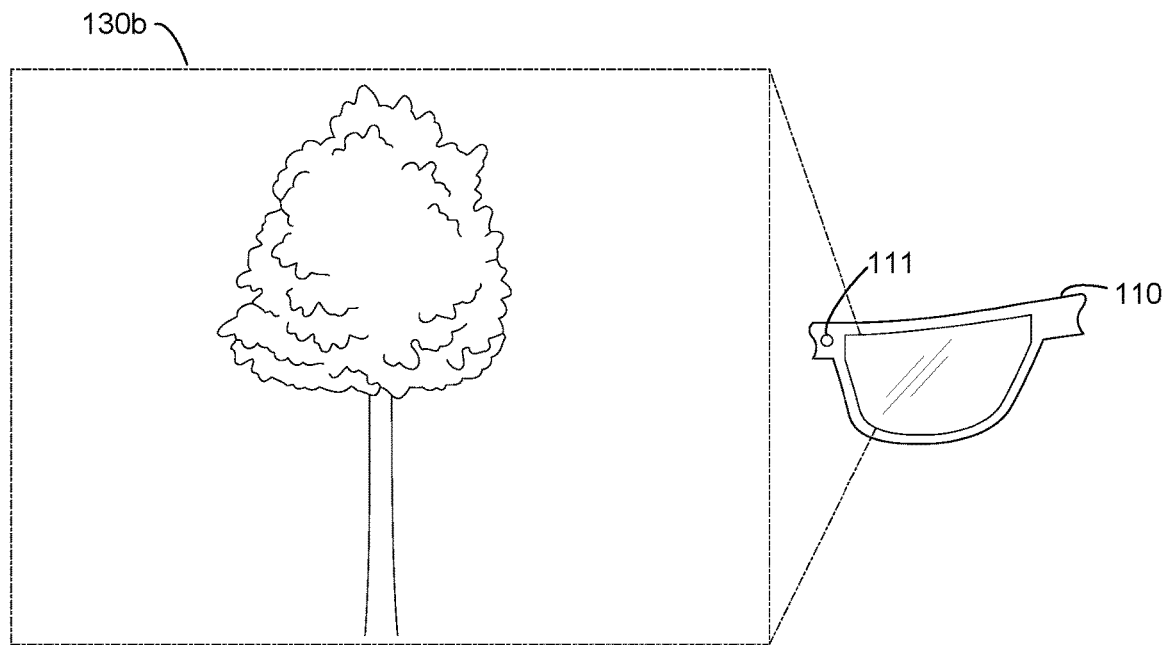

FIG. 1B illustrates the field of view 134 of the user 115 in FIG. 1A. In particular, the user 115's view before any hand gesture is performed and detected by the wrist-wearable device 170. The user 115 can move around freely without having their field of view 134 obstructed. For example, as the user 115 moves their head the field of view 134 of the user 115 changes based on the user 115's movements. As described above, in some embodiments, the display 130 is coupled with a lens or both lenses. In some embodiments, the display 130 is positioned over a portion of the lens without obstructing the user 115's view. Alternatively, in some embodiments, the display 130 makes up all or a substantial portion of the lens or lenses (while still allowing the user 115 with full visibility of their field of view 134). In some embodiments, the display 130 is a heads-up display coupled with or integrated into one or both lenses, or a heads-up display coupled with or integrated with a portion of the frame around the lenses.

Figure 1C:
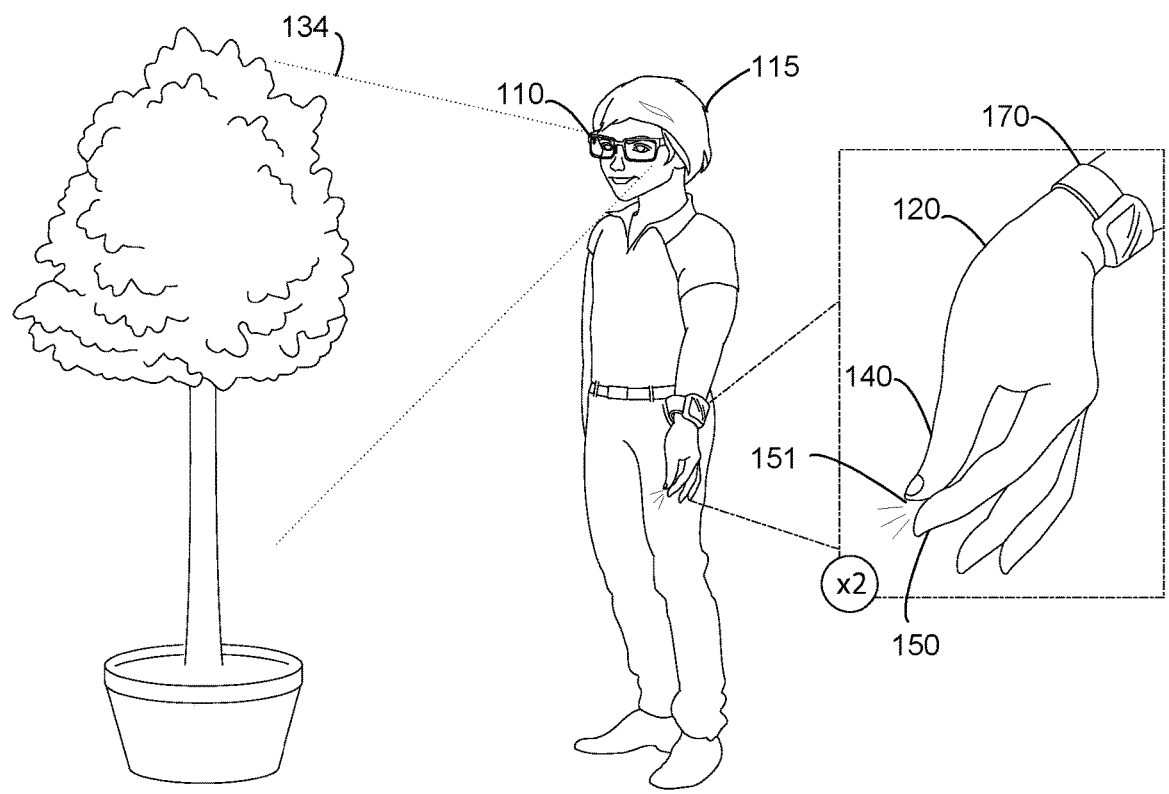

FIG. 1C illustrates the user 115 performing a camera-control gesture that is detected by the wrist-wearable device 170. More specifically, the performance of the hand gesture generates sensor data that is sensed by one or more sensors of the wrist-wearable device 170, which is used by the wrist-wearable device 170 to determine that the hand gesture is a camera-control gesture (e.g., a double tap of the phalanges 140 and 150). A camera-control gesture is a hand gesture associated with one or more commands or instructions configured to control an imaging device 111. In some embodiments, the camera-control gesture is associated with instructions to cause an imaging device 111 to capture camera data (e.g., continuously capture a video stream, capture a single image, capture a plurality of images, capture a sequence of images, etc.), adjust camera data (e.g., zoom in, zoom out, pan in different directions (e.g., left, right, up, down, and diagonally), etc.), switch between different camera modes (e.g., panoramic, video, high dynamic range (HDR) mode, night mode, etc.), and/or other camera operations.

Figure 1D:
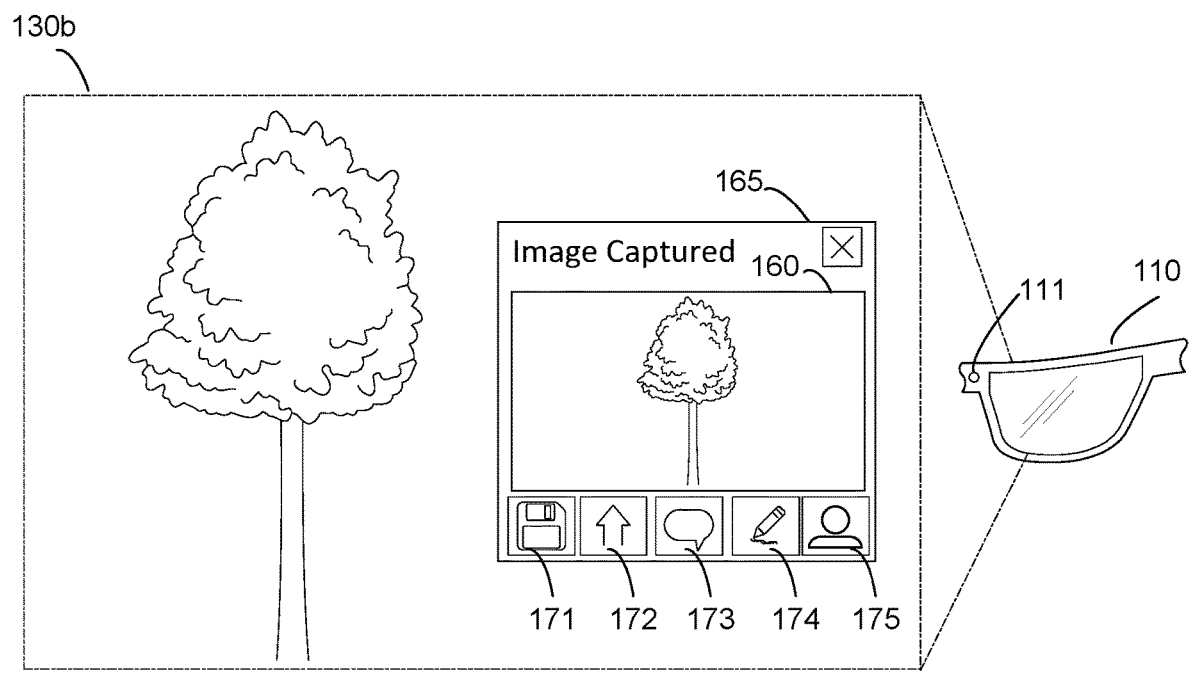

In some embodiments, in accordance with a determination, by the wrist-wearable device 170 that the sensor data indicates that the hand gesture is a camera-control gesture for capturing camera data, the wrist-wearable device 170 provides one or more commands or instructions associated with the camera-control gesture to another device including or communicatively coupled with an imaging device 111, such as the head-wearable device 110. The commands or instructions associated with the camera-control gesture cause the imaging device 111 of the other device to capture camera data. For example, when the double tap of the phalanges 140 and 150 is detected by the wrist-wearable device 170, the head-wearable device 110 is caused to capture camera data (as shown by captured image 160; FIG. 1D). More specifically, the camera-control gesture demonstrated in FIG. 1C is the user 115's thumb (phalange 140) and pointer finger (phalange 150) performing a double tap action which ultimately results in the capture of the camera data. The above example is non-limiting; the user 115 could perform a double tap or double pinch gesture with other phalanges and is not only limited to the thumb (phalange 140) and pointer finger (phalange 150) (e.g., could also be a thumb (phalange 140) and middle finger, thumb (phalange 140) and ring finger, thumb (phalange 140) and pinky, two other fingers, etc.). In some embodiments, the camera-control gestures are defined by the user 115 (e.g., user defined camera-control gestures) or automatically defined (e.g., predefined camera-control gestures) by the wrist-wearable device 170 or other devices described below in reference to FIG. 11. The camera-control gestures can be defined using a head-wearable device 110, a smartphone 1174b, the wrist-wearable device 170, or other intermediary device. For example, a user 115 could define a camera-control gesture for capturing camera data to be a single tap instead of a double tap by any two phalanges. The wrist-wearable device 170 causes the action associated with the camera-control gesture to be performed immediately (in response to detection) to the hand gesture. In other words, in response to a detected camera-control gesture no additional input is required from the user 115 to trigger an operation such as the capture of camera data.

FIG. 1D illustrates the field of view 134 of the user 115 in FIG. 1C. More specifically, FIG. 1D shows the user 115's view after the camera-control gesture (e.g., the double tap of the phalanges 140 and 150) is detected by the wrist-wearable device 170. The wrist-wearable device 170, in response to determining that the hand gesture is a camera-control gesture for capturing camera data, causes the head-wearable device 110 to capture camera data. In some embodiments, the camera-control gesture for capturing camera data also causes the head-wearable device 110 to present a representation of the camera data (e.g., captured image 160). In some embodiments, the representation of the camera data is displayed over a portion of the user 115's field of view 134. In some embodiments, the representation of the camera data is presented semi-transparent such that the user 115's view is not substantially obstructed (e.g., transparency of at least 25% such that the user 115 can see through the representation of the camera data). In some embodiments, the user 115 can adjust the transparency such that the representation of the camera data is fully transparent (e.g., invisibly), fully opaque, or different gradients in between.

In some embodiments, the representation of the camera data is presented within a user interface 165 displayed at the display 130 of the head-wearable device 110. In some embodiments, the user interface 165 includes one or more affordance for interacting with the representation of the camera data. For example, the one or more affordances include a save affordance 171, a share affordance 172, a messaging affordance 173, an editing affordance 174, and a contacts affordance 175. The operations performed by the different affordance are discussed below in reference to FIGS. 3A-3J. Similar to the representation of the camera data, the user interface 165 is displayed over a portion of the user 115's field of view 134 and/or presented semi-transparent such that the user 115's view is not substantially obstructed.

Figure 1E:
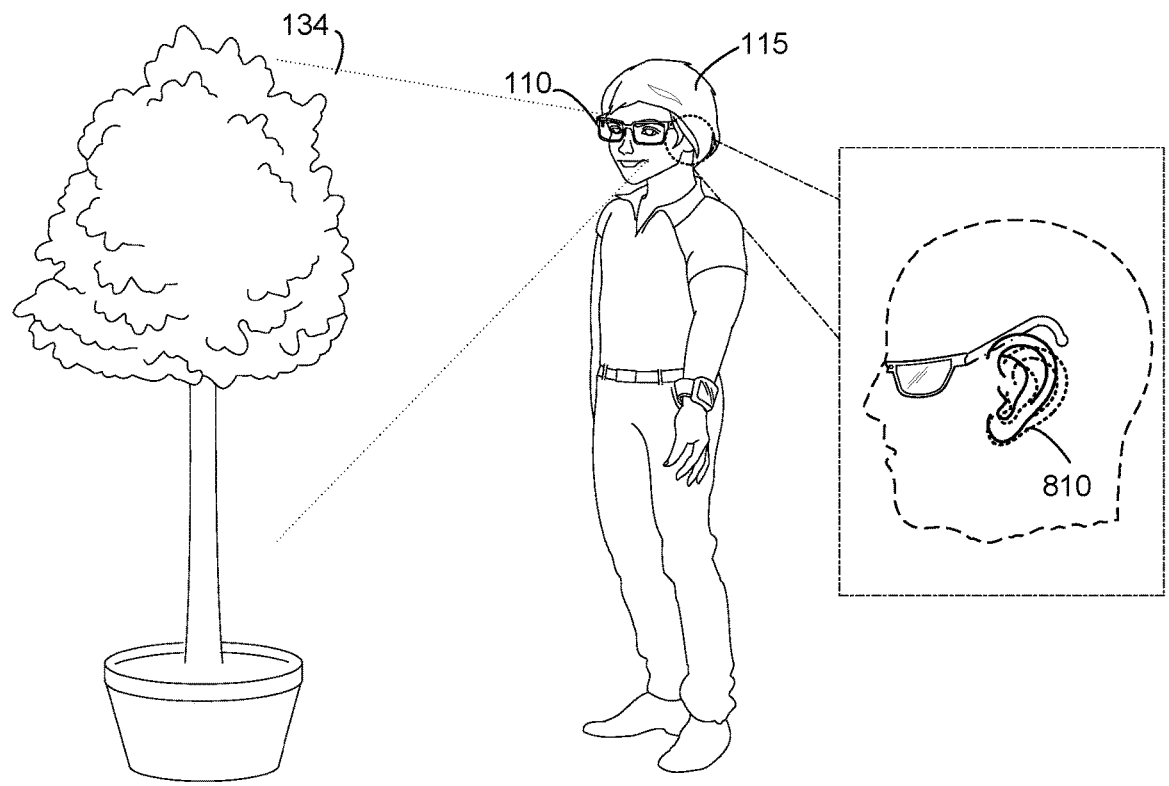
Figure 1F:
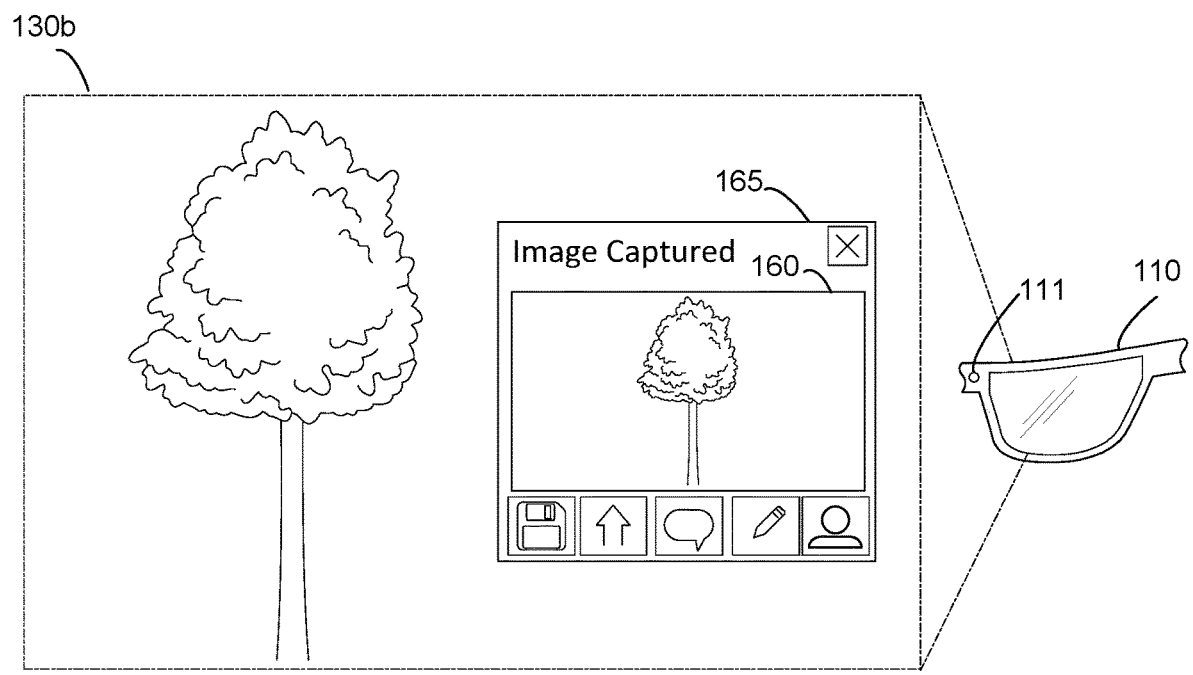

FIG. 1E illustrates the user 115 performing a camera-control gesture via one or more vestigial ear muscle gestures (e.g., ear 810 movement) that are detected by sensors (e.g., surface EMGs) coupled with the head-wearable device 110. More specifically, the performance of a vestigial ear muscle gesture generates sensor data that is sensed by one or more sensors of the head-wearable device 110 and used by the head-wearable device 110 to determine that the vestigial ear muscle gesture was performed. The head-wearable device 110, in accordance with a determination that the sensor data indicates that the vestigial ear muscle gesture was performed, determines a control action, such as a camera-control gesture, associated with the vestigial ear muscle gesture and performs the control action or provides one or more commands or instructions associated with the control action to cause another device communicatively coupled with the head-wearable device 110 to perform the control action. For example, when the movement of the vestigial ear muscle (e.g., the user 115 wiggling their ear 810) is detected by the head-wearable device 110, the head-wearable device 110 determines a vestigial ear muscle gesture associated with the movement of the vestigial ear muscle and, in accordance with a determination that the vestigial ear muscle gesture corresponds to a camera-control gesture (e.g., capture image data), the head-wearable device 110 captures image data via a communicatively coupled imaging device 111 (as shown by captured image 160; FIG. 1F).

FIG. 1F illustrates the field of view 134 of the user 115 in FIG. 1E. More specifically, FIG. 1F shows the user 115's view after the vestigial ear muscle gesture corresponding to the camera-control gesture is detected by the head-wearable device 110. In some embodiments, after image data is captured by performance of the vestigial ear muscle gesture, the head-wearable device 110 present a representation of the captured image data to the user. The above examples of FIGS. 1E-1F are non-limiting; the user 115 could move vestigial ear muscles of each ear or both ears to cause the performance of one or more control actions, such as performing a call, initiating a digital assistant, initiating one or more applications, navigating a user interface, etc. Vestigial ear muscle gestures can include wiggling one or both ears; pinning one or both ears backwards; moving one or both ears up, down, left, right; a particular sequence or pattern of ear movements (e.g., moving the left ear twice, moving the left ear once and the right ear twice, moving both ears at the same time, etc.). As described below in reference to FIGS. 8A-8H, the user 115 can be trained to use one or more vestigial ear muscles to perform different vestigial ear muscle gestures.

Although the examples of FIGS. 1A-1F describe the interaction between the wrist-wearable device 170 and the head-wearable device 110, hand gestures detected by the wrist-wearable device 170 can cause other communicatively coupled device to capture camera data, present camera data, and/or provide captured camera data for presentation at communicatively coupled display.

FIG. 2A-2F illustrate different hand gestures performed by a user, in accordance with some embodiments. In particular, hand gestures that are determined by a wrist-wearable device 170 to be different camera-control gestures. As described above in reference to FIGS. 1A-1F, hand gestures are determined to be one or more camera control-gestures based on sensor data obtained by one or more sensors 1121 (FIG. 11) of the wrist-wearable device 170.

Figure 2A:
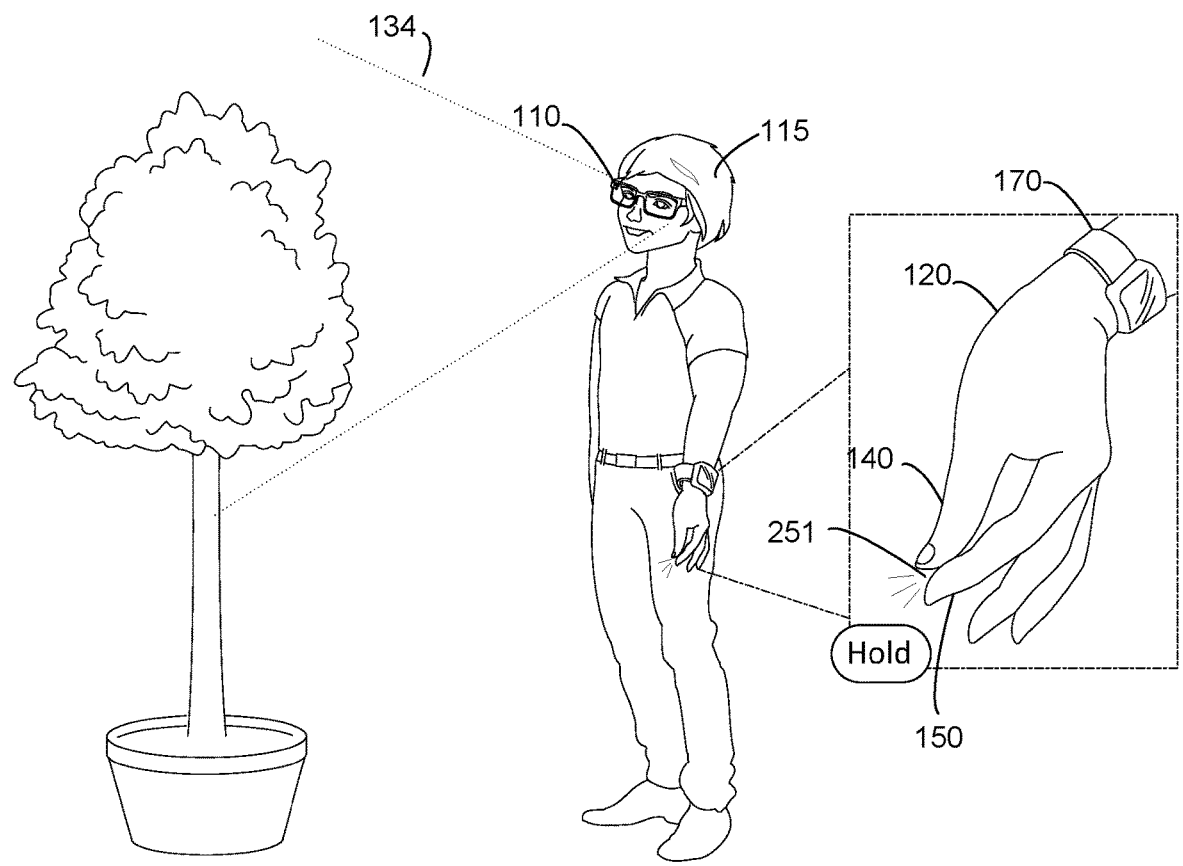
FIG. 2A-2F illustrate different hand gestures performed by a user, in accordance with some embodiments.

In FIG. 2A, the user 115 performs and maintains a hand gesture (e.g., pinching and holding phalanges 140 and 150 together, a pinch and hold gesture 251). In some embodiments, maintaining a hand gesture can include holding a phalange or phalanges still for a predetermined period of time (e.g., two or more seconds) and/or holding at least two phalanges in contact for a predetermined period of time (e.g., two or more seconds). Alternatively or additionally, in some embodiments, maintaining a hand gesture can include applying a predetermined threshold pressure between at least two phalanges or at least one phalange and a surface (e.g., a table, wall, palm, leg, etc.) for a predetermined period of time (e.g., at least two seconds). The hand gesture performed by the user 115 generates sensor data (e.g., EMG data, IMU data, etc.) that is used by the wrist-wearable device 170 to determine, using the one or more processors 1150 (FIG. 11), a camera control-gesture.

In FIG. 2A, the pinch and hold gesture 251 is associated with a camera control-gesture for displaying a preview of a representation of camera data captured by an imaging device 111. The camera control-gesture for displaying a preview of a representation of camera data captured by an imaging device 111, when detected, causes the head-wearable device 110 to present, via a display 130, a representation of the camera data captured by an imaging device 111.

Figure 2B:
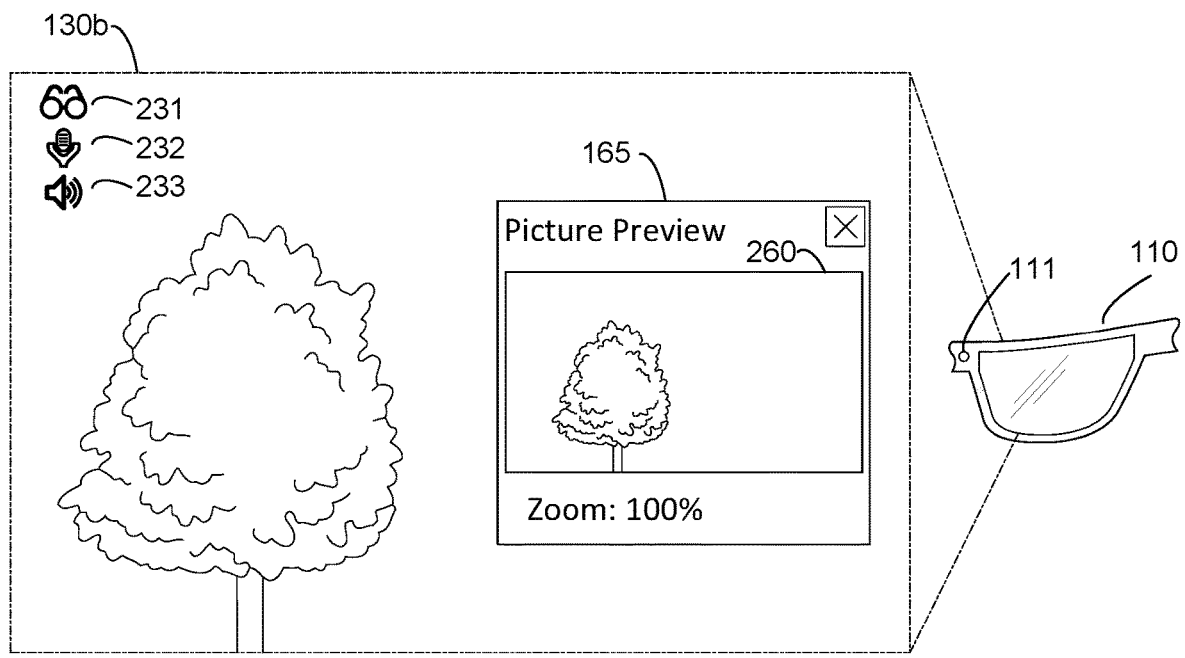

FIG. 2B illustrates a field of view 134 of the user 115 in FIG. 2A. In some embodiments, in accordance with a determination the hand gesture is a camera control-gesture for displaying a preview of a representation of camera data captured by an imaging device 111 (e.g., the pinch and hold gesture 251), the head-wearable device 110 presents a preview 260 to the user 115. The preview 260 includes a representation of camera data captured within a field of view 134 of the user 115. In some embodiments, the preview 260 includes a subset of the field of view 134 or of the entire field of view 134 of the user 115. The preview 260 can be a live feed (e.g., simultaneous capture and presentation) of what the camera is viewing while the hand gesture is maintained. Alternatively, the preview 260 can be a recording of a field of view 134 captured by the user 115. In some embodiments, a plurality of previews from one or more cameras can be displayed on the head-wearable device 110. In some embodiments, the preview 260 is presented to the user 115 via a user interface 165 as described above in reference to FIGS. 1A-1F.

In some embodiments, the head-wearable device 110 presents to the user 115 one or more indications that notify the user 115 that the imaging device 111 is active (e.g., glasses icon 231), the microphone is active (e.g., mic icon 232), and/or the speakers are audible (e.g., speaker icon 233). In some embodiments, the indications are provided to the user 115 as long as the camera control-gesture for displaying a preview of a representation of camera data is detected. In some embodiments, respective indications are provided to the user when the device is active.

Figure 2C:
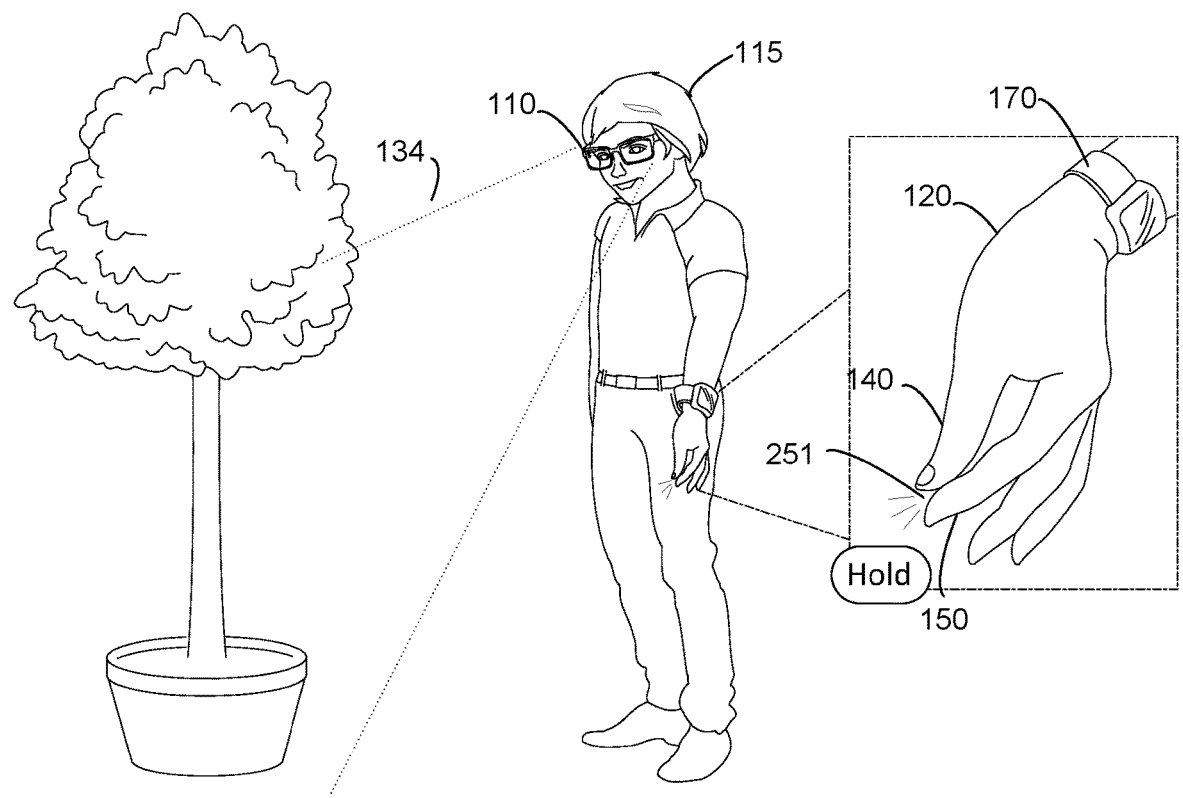

FIG. 2C illustrates adjustments to the camera data while the user 115 performs and maintains a hand gesture. In particular, while the user 115 performs the pinch and hold gesture 251 (e.g., the camera control-gesture for displaying a preview of a representation of camera data), the camera data captured by the imaging device 111 of head-wearable device updates in accordance with changes to the user 115's field of view 134. For example, while the user 115 performs and maintains the pinch and hold gesture 251, the imaging device 111 captured camera data reflecting changes in the user 115's head movement (e.g., moving side-to-side up and down, etc.). Alternatively or in addition, in some embodiments, while the user 115 performs and maintains the pinch and hold gesture 251, movement of the user 115's wrist can be interpreted to cause changes in the field of view 134 of the camera (e.g., panning the camera side-to-side, up and down, etc.).

Figure 2D:
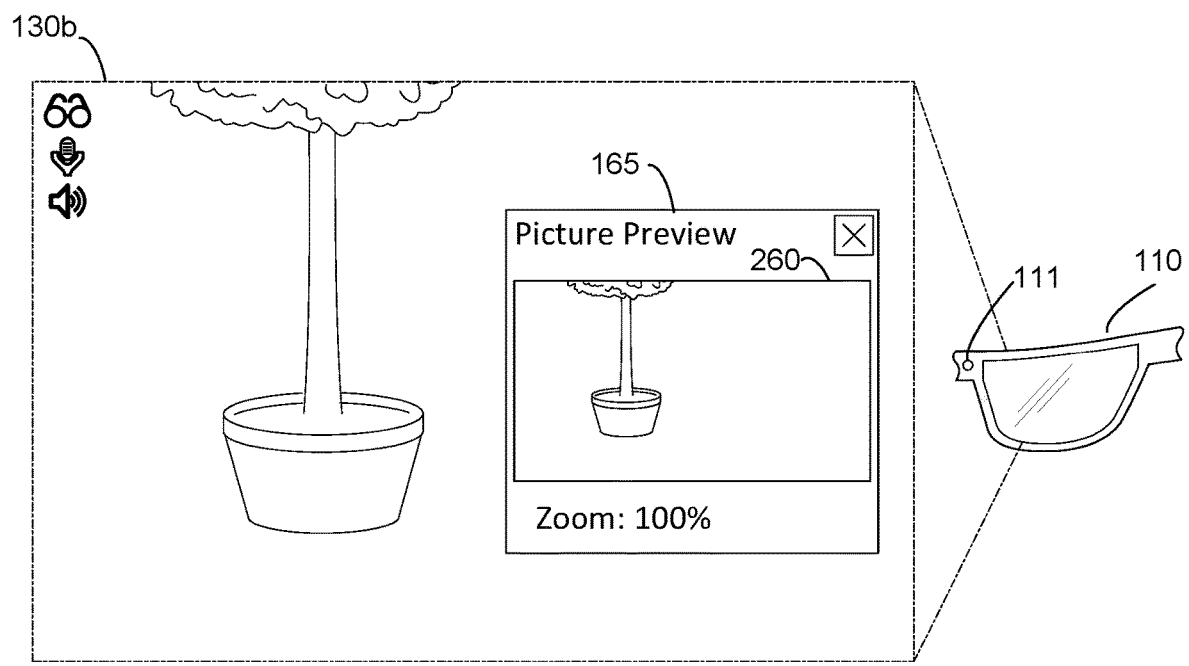

FIG. 2D illustrates a field of view 134 of the user 115 in FIG. 2C. In particular, in accordance with a determination the pinch and hold gesture 251 is performed and maintained, the preview 260 presented via a display 130 of the head-wearable device is updated to show a representation of the camera data reflective of the user 115's field of view 134 as they move their head. For example, as the user 115 moves their head down, the preview 260 is updated to show the user's change in field of view 134 (e.g., the bottom of the object as opposed to the top). The changes to the preview 260 are presented to the user while the pinch and hold gesture 251 is performed and maintained. In this way, the user 115 has a visual representation of the camera data that is being captured or about to be captured by the imaging device 111 of the head-wearable device 110.

Figure 2E:
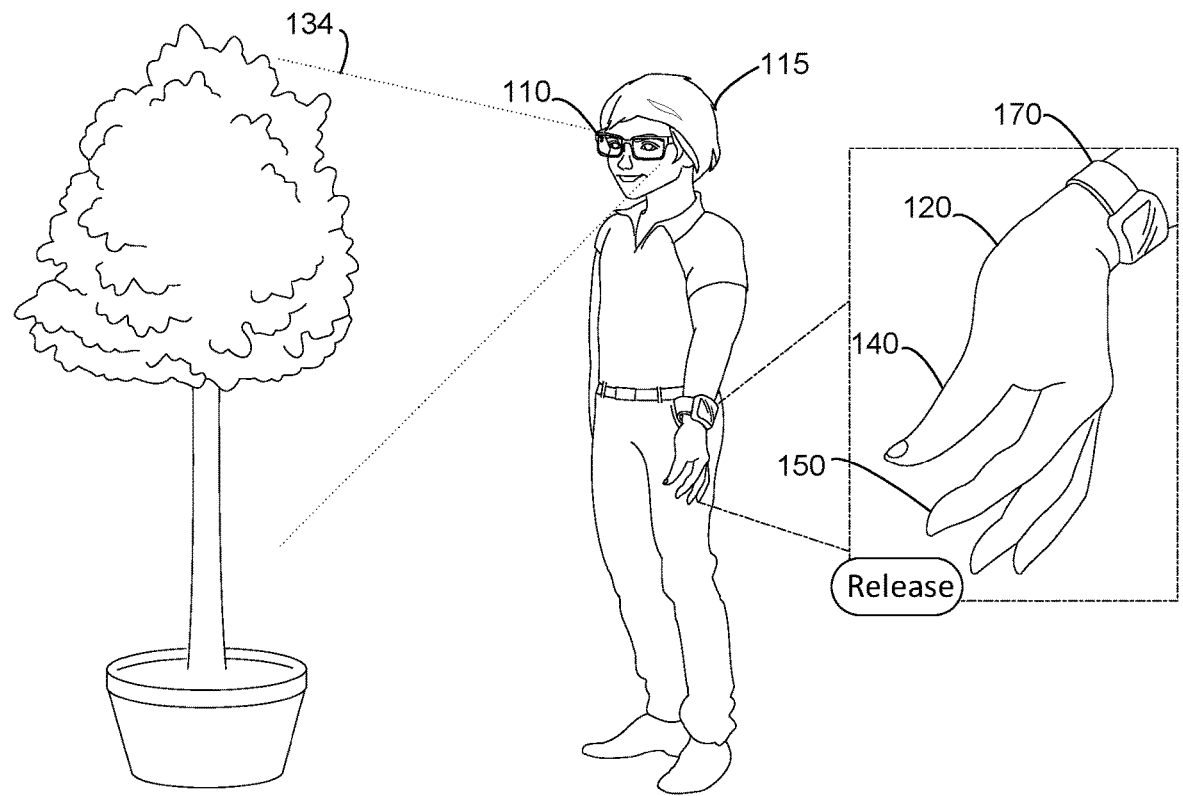

FIG. 2E illustrates the user 115 no longer performing and maintaining a hand gesture (e.g., releasing the hand gesture). Releasing a hand gesture can include moving a phalange that was held still for a predetermined period of time; separating at least two phalanges 140 and 150 that were contacting one another such that they are no longer in contact; moving a phalange or phalanges contacting a surface such that the phalange or phalanges are no longer contacting the surface;

and/or removing (e.g., no longer applying) a predetermined threshold pressure between at least two phalanges 140 and 150, or at least one phalange and a surface. The wrist-wearable device 170 determines that the user 115 releases the hand gesture (e.g., pinch and hold gesture 251) based on sensor data obtained by the one or more sensors 1121. In some embodiments, when the user 115 releases the hand gesture, the camera control-gesture associated with the hand gesture is completed or a follow-on action is performed. For example, releasing the pinch and hold gesture 251 can cause the head-wearable device to capture camera data, via an imaging device of the head-wearable device, of the user 115's field of view when the pinch and hold gesture 251 is released. In some embodiments, a representation of the captured image data is presented to the user 115 via the display 130 of the head-wearable device 110.

Figure 2F:
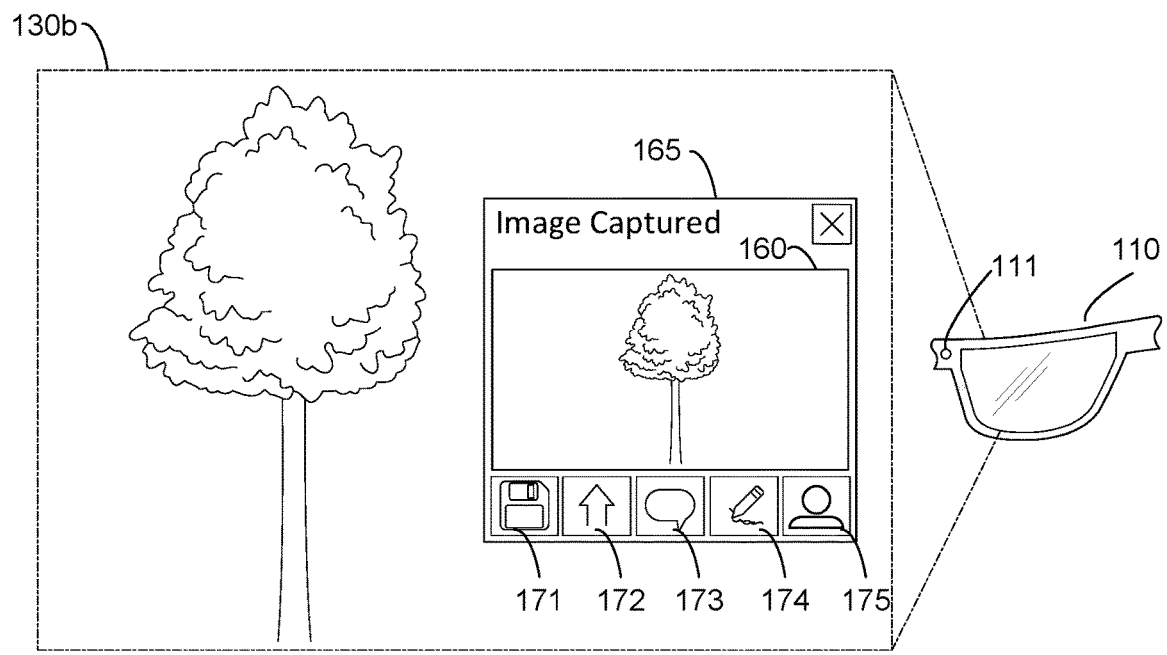

FIG. 2F illustrates a field of view 134 of the user 115 in FIG. 2E. Specifically, the head-wearable device 110 presents, via display 130, a field of view of the user 115 when the pinch and hold gesture 251 is released. As described above, in some embodiments, when the pinch and hold gesture 251 is released, the imaging device 111 of the head-wearable device captures camera data of the user 115's field of view. Further, in some embodiments, when the pinch and hold gesture 251 is released, a representation of the captured camera data is presented to the user 115.

As described above in reference to FIG. 1D, the representation of the camera data (e.g., captured image 160) is presented within a user interface 165 displayed at the display 130 of the head-wearable device 110. In some embodiments, the representation of the camera data is presented at a display 130 of the wrist-wearable device 170. In some embodiments, the representation of the camera data is presented at the wrist-wearable device 170 based on a determination that the user 115 is focused on the wrist-wearable device 170. A determination that the user is focused on the wrist-wearable device 170 is based on the by the sensor data obtained by the one or more sensors 1121 indicating that the user 115 is looking at the wrist-wearable device 170.

Figure 3A:
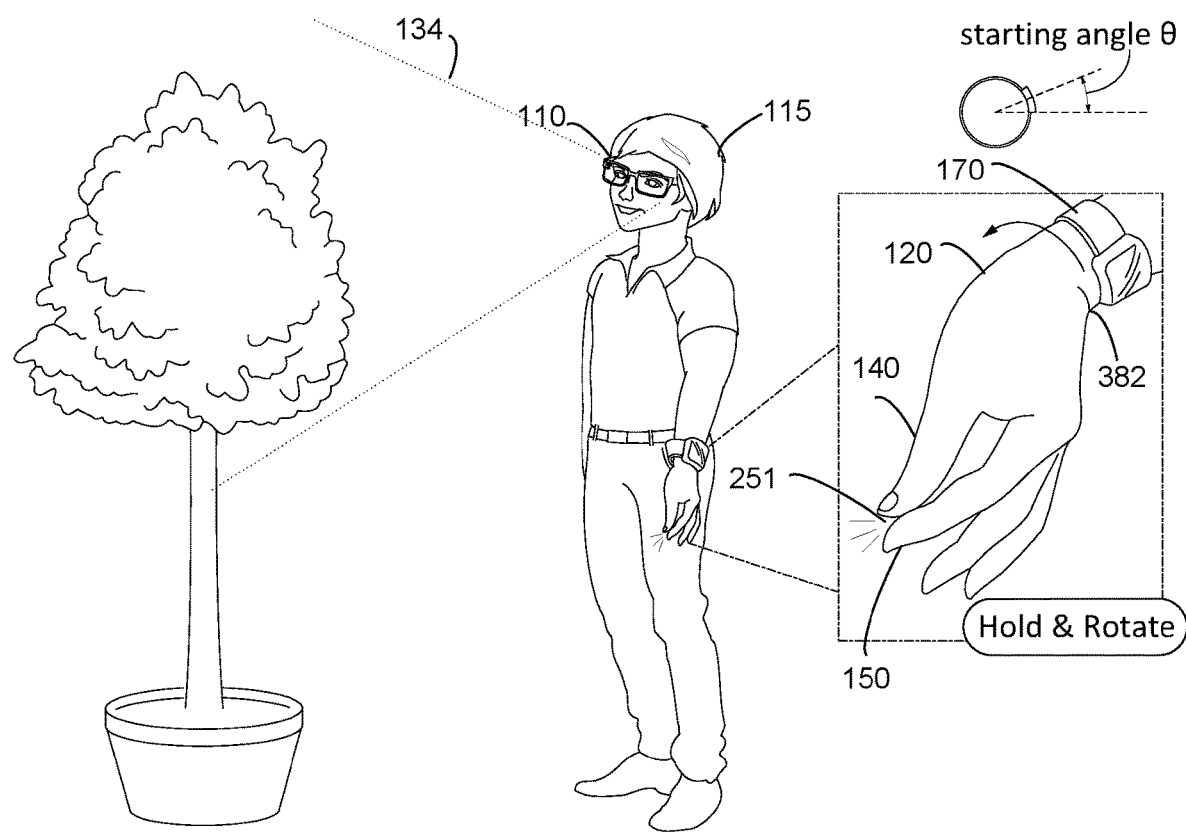
FIGS. 3A-3N illustrate adjustments to a representation of camera data using one or more hand gestures performed by a user, in accordance with some embodiments.
Figure 3B:
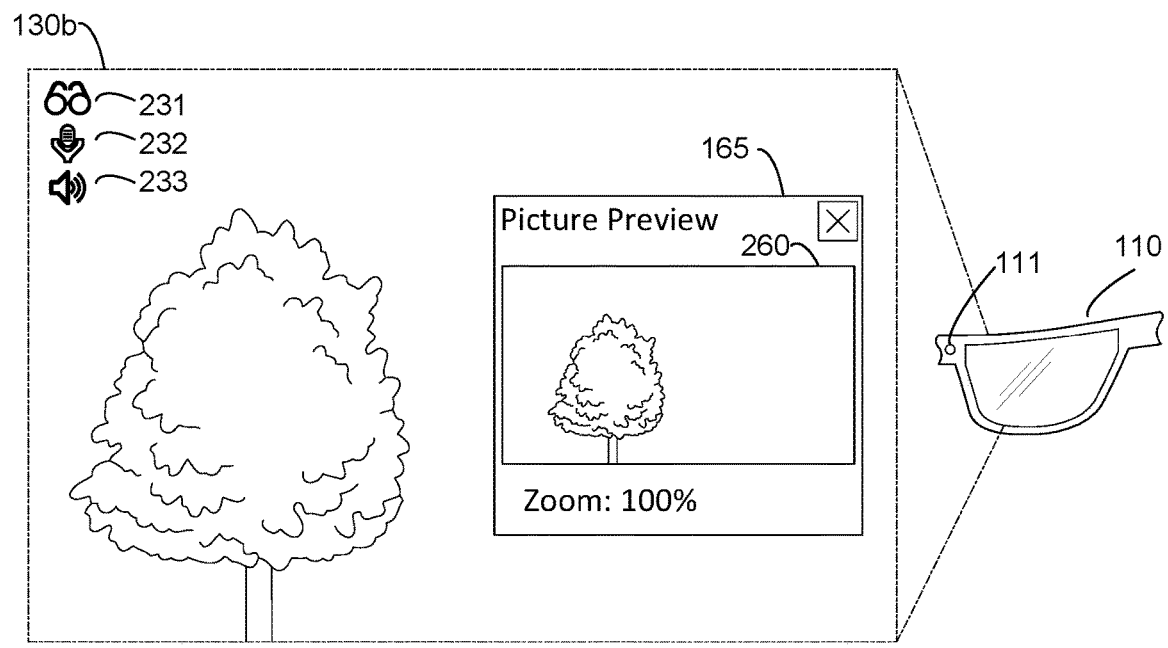
FIGS. 3O-3Z illustrate selection of one or more capture modes using one or more hand gestures performed by a user, in accordance with some embodiments.
Figure 3C:
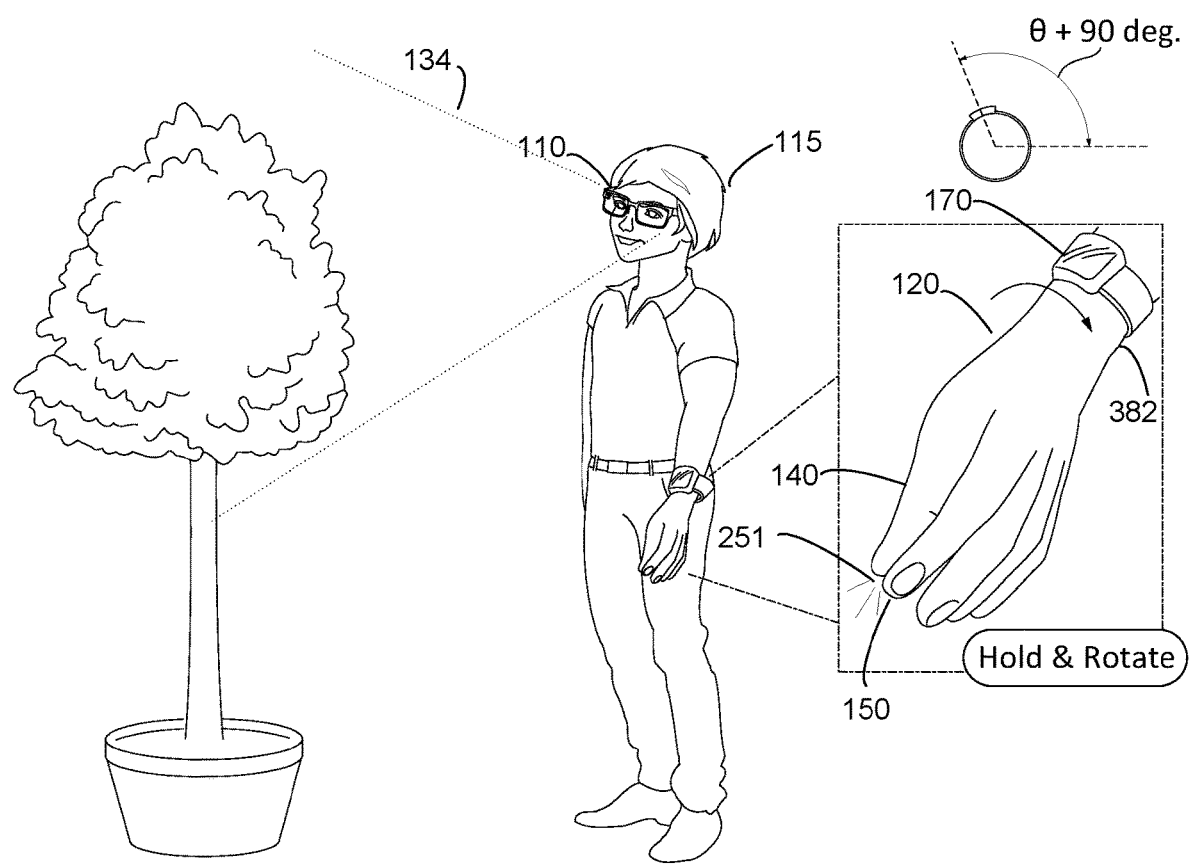
Figure 3D:
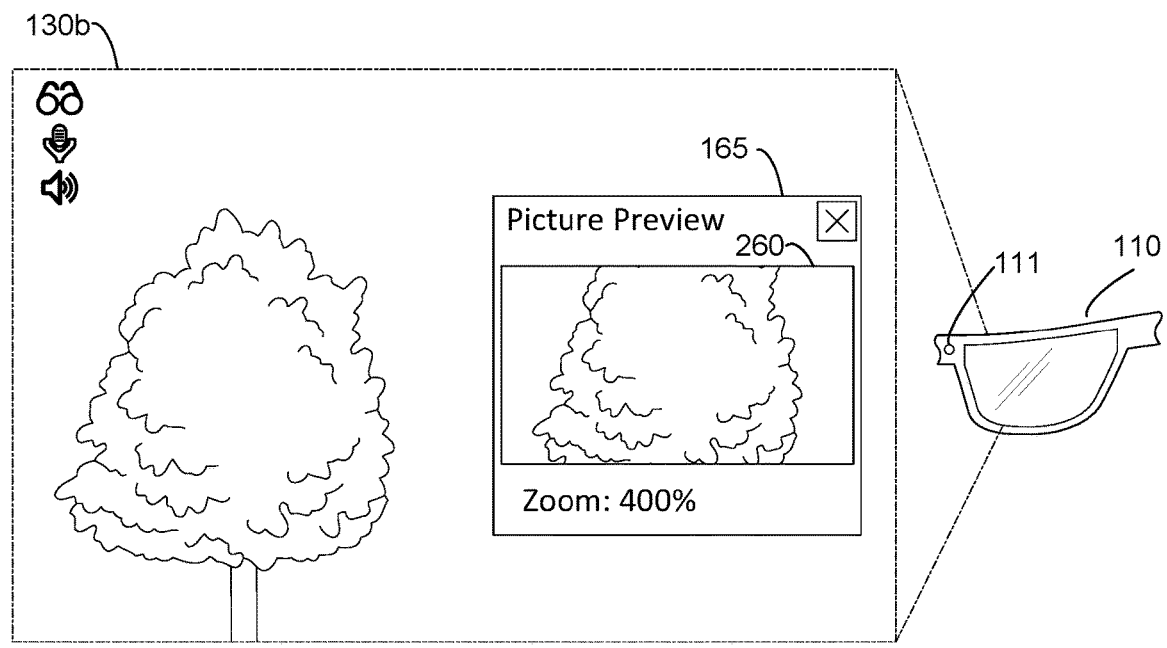
Figure 3E:
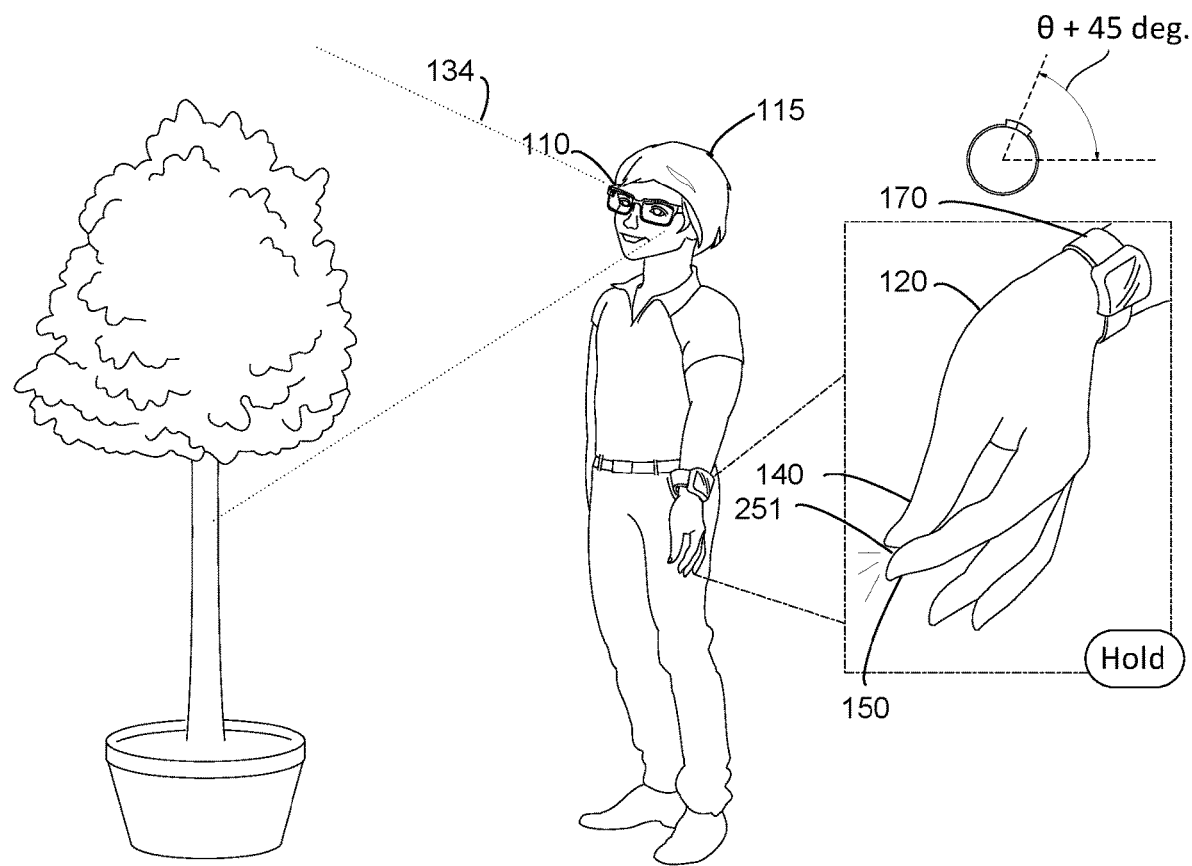
Figure 3F:
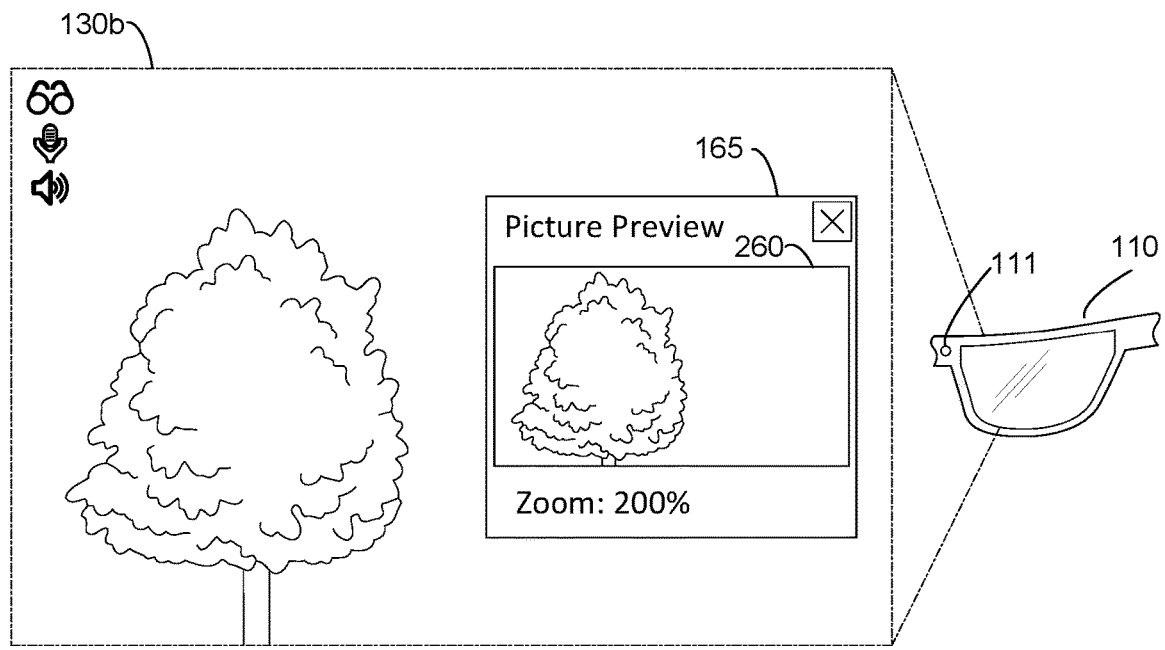
Figure 3G:
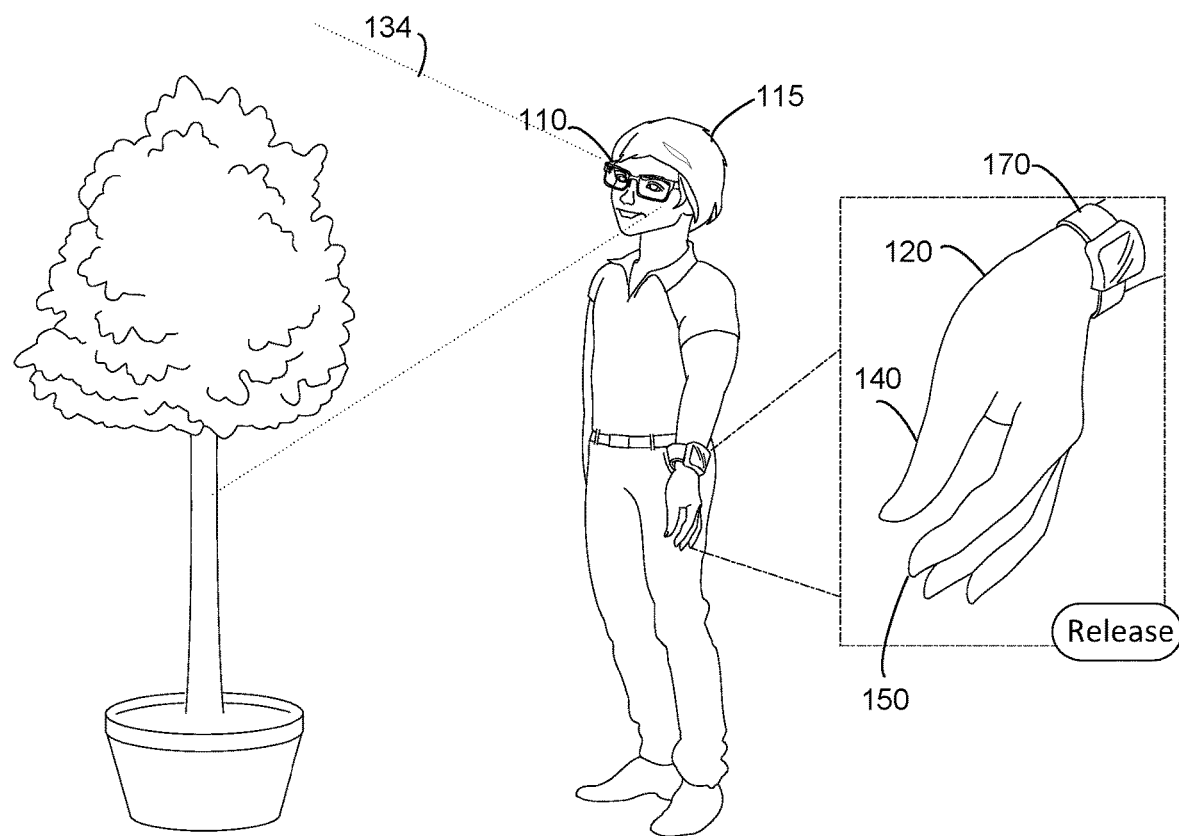
Figure 3H:
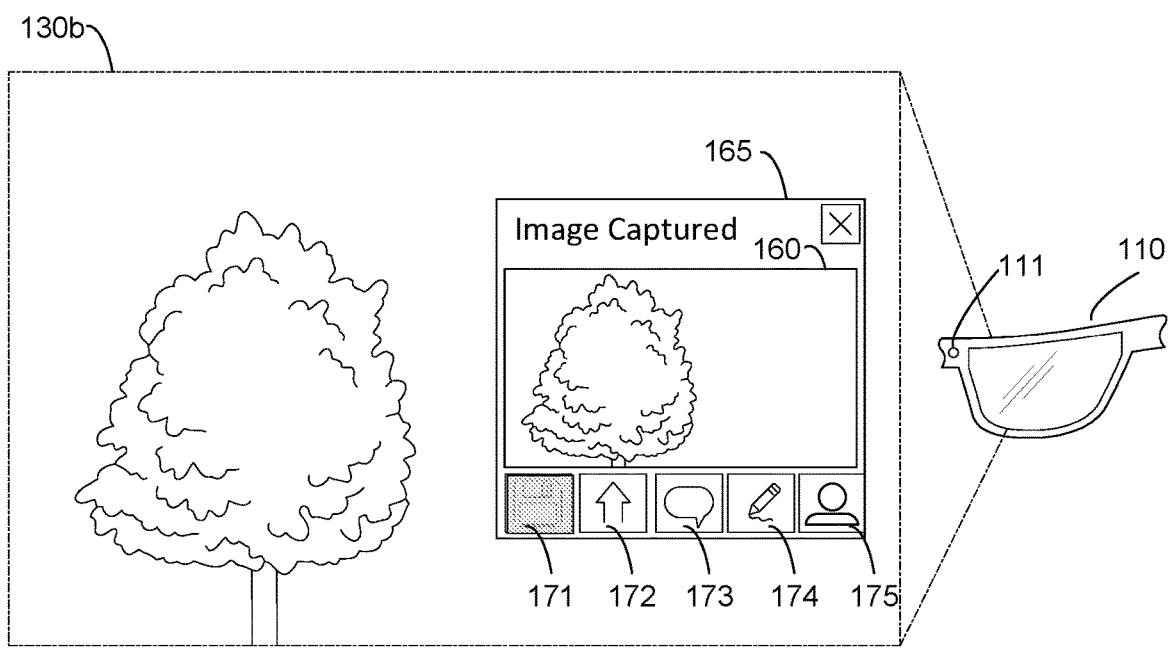
Figure 3I:
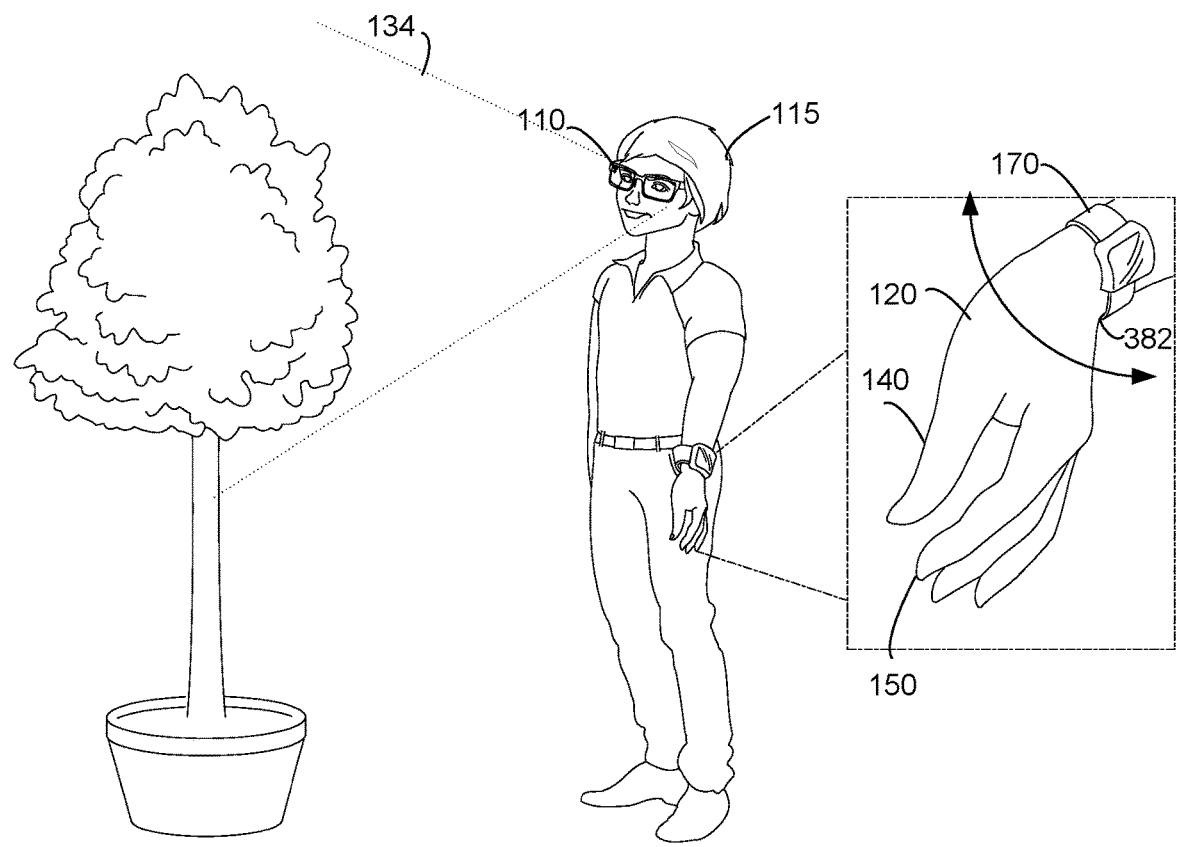
Figure 3J:
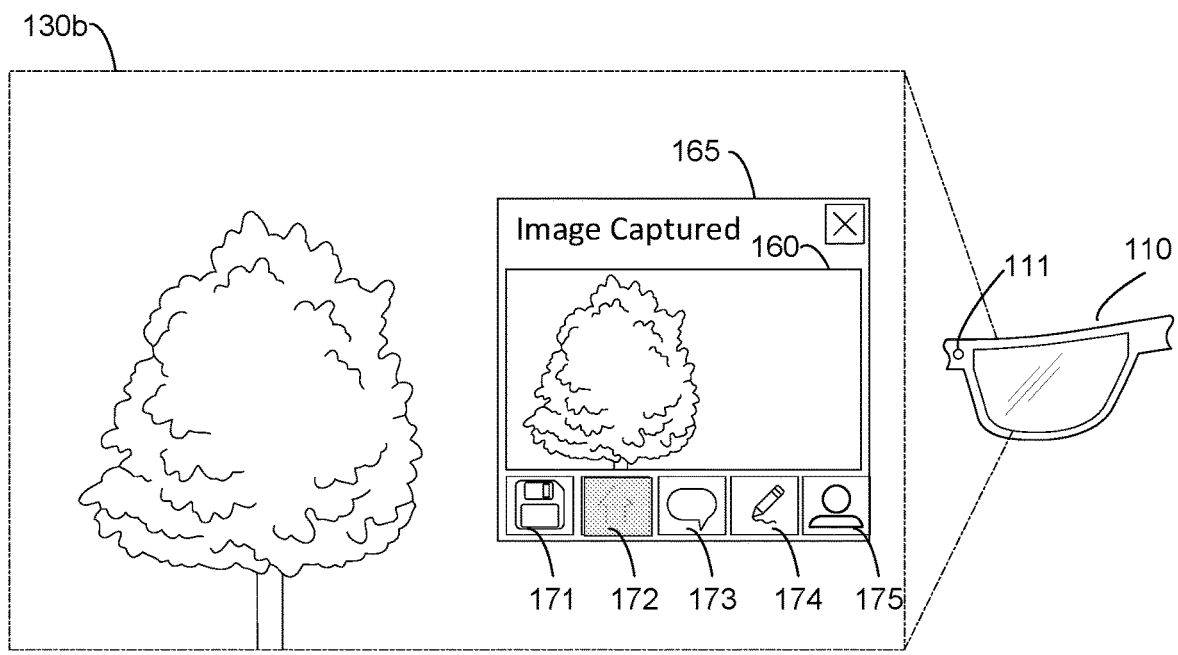
Figure 3K:
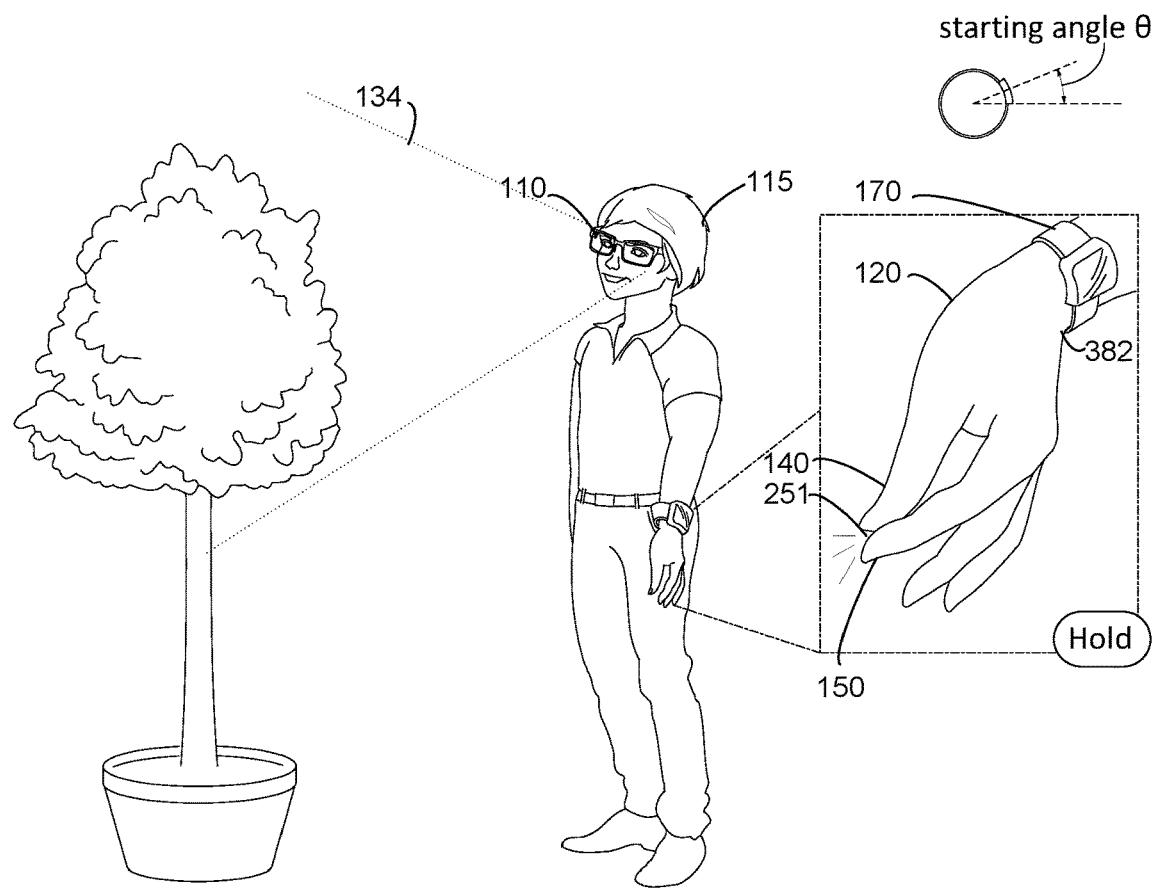
Figures 1, 3L:
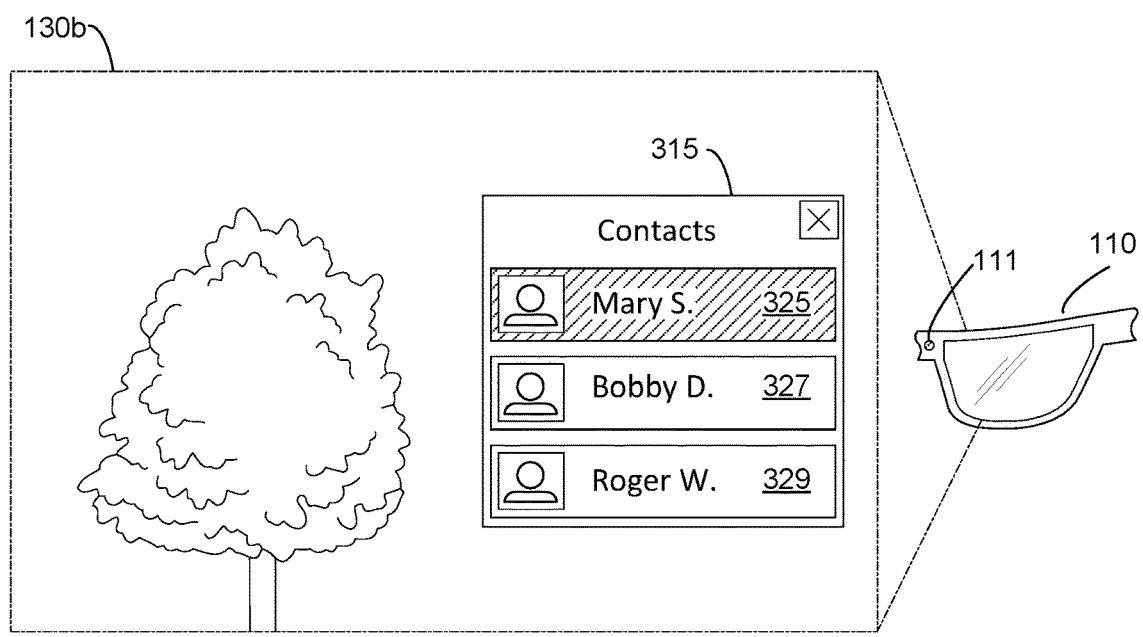
Figures 2, 3L:
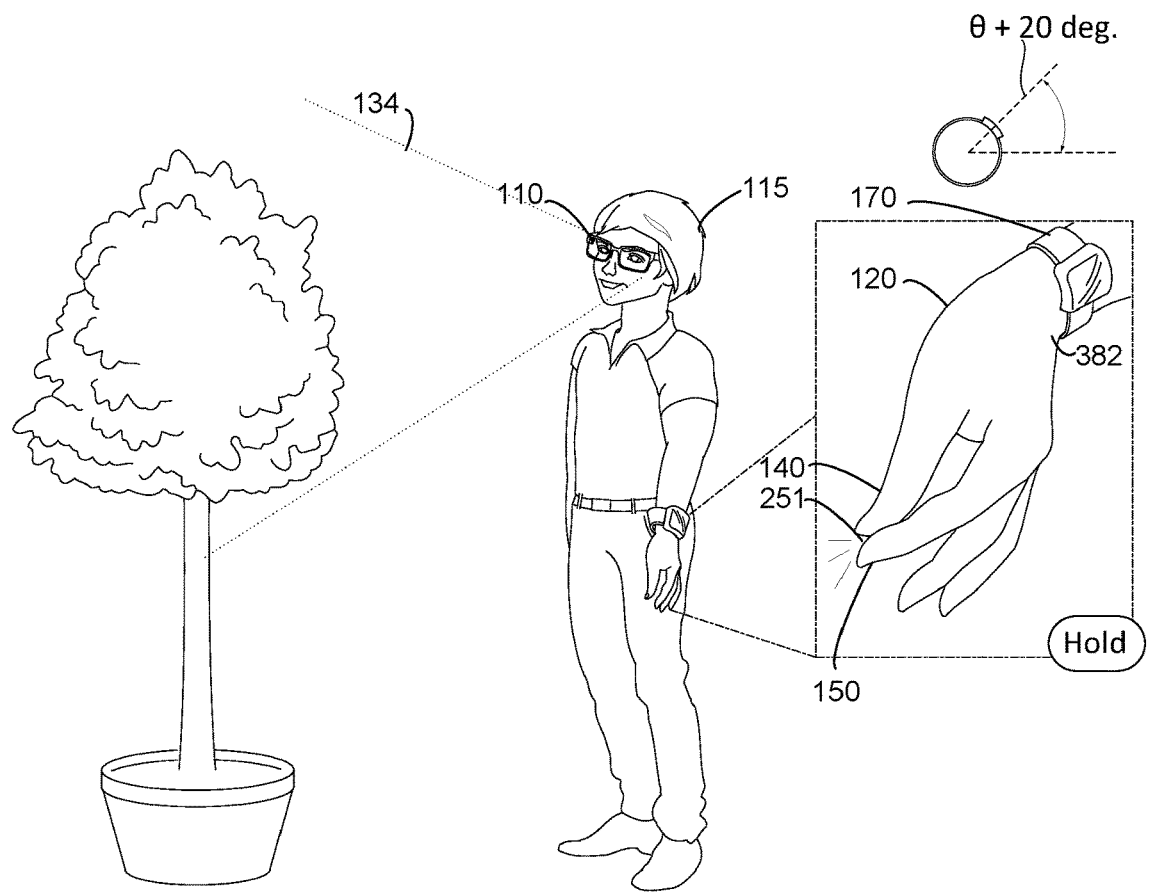
Figures 3, 3L:
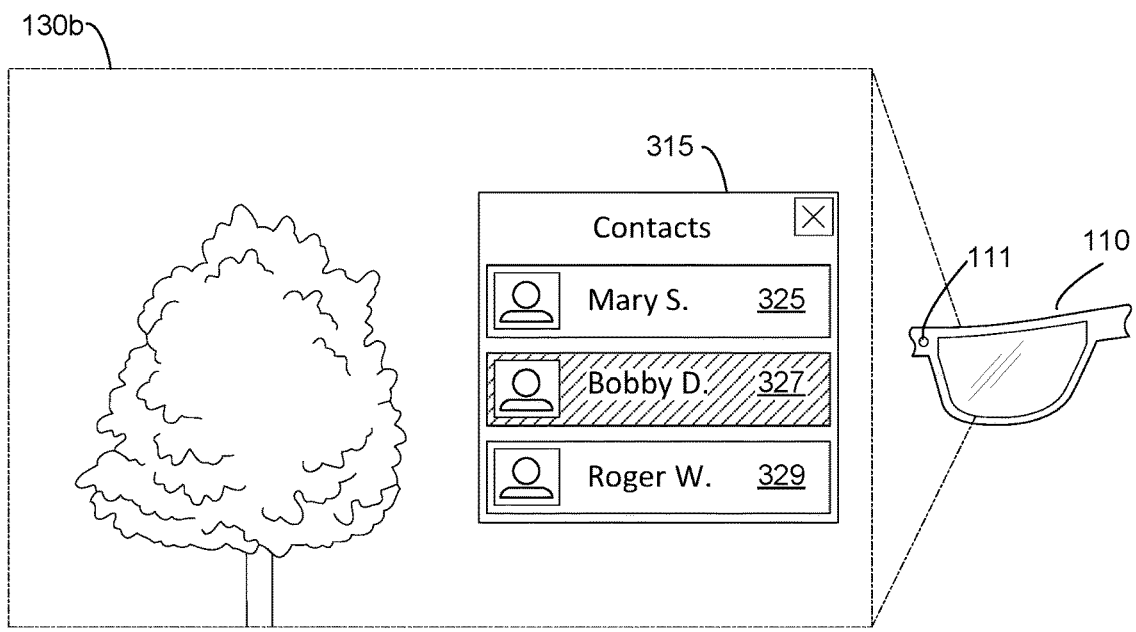
Figures 3, 3L, 4:
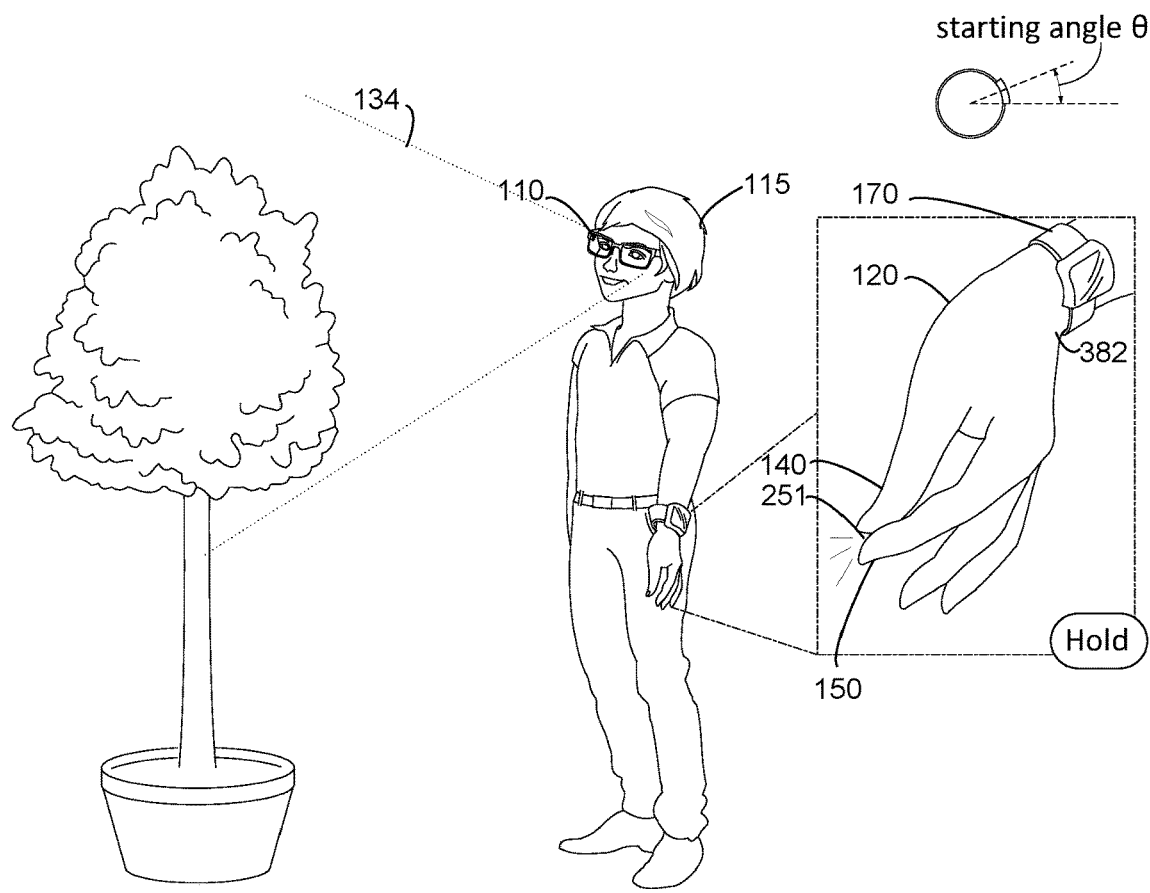
FIGS. 4A-4J illustrate different surface-contact gestures performed by a user, in accordance with some embodiments.
Figures 3, 3L, 4, 5:
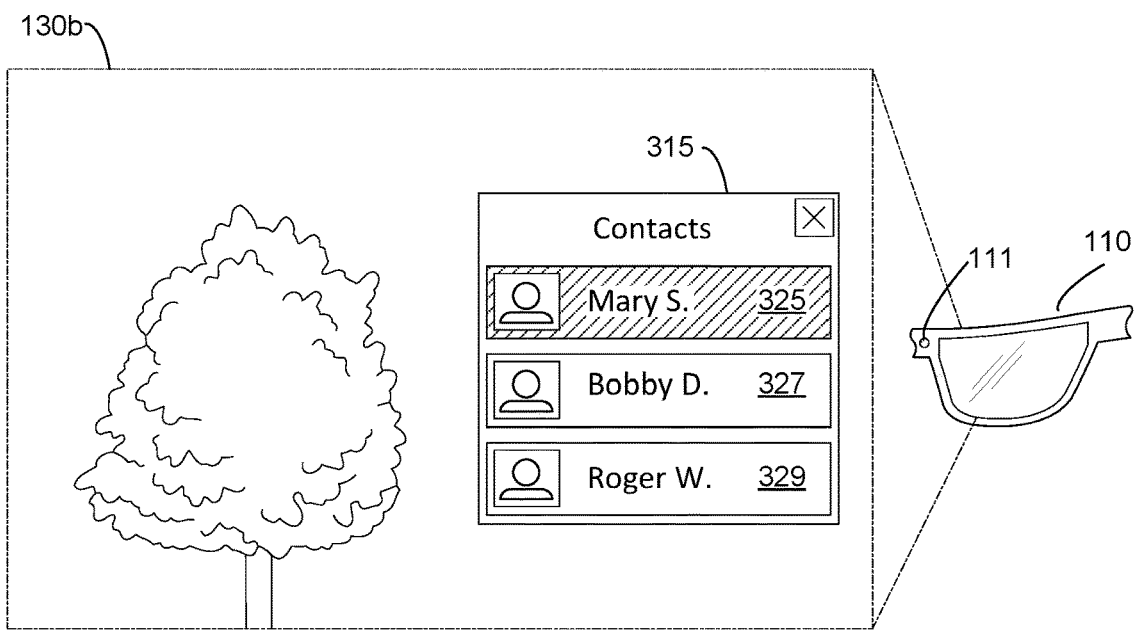
FIGS. 5A-5C illustrate coordination of a wrist-wearable device and a head-wearable device to cause presentation of camera data in an AR environment, in accordance with some embodiments.
Figures 3, 3L, 4, 5, 6:
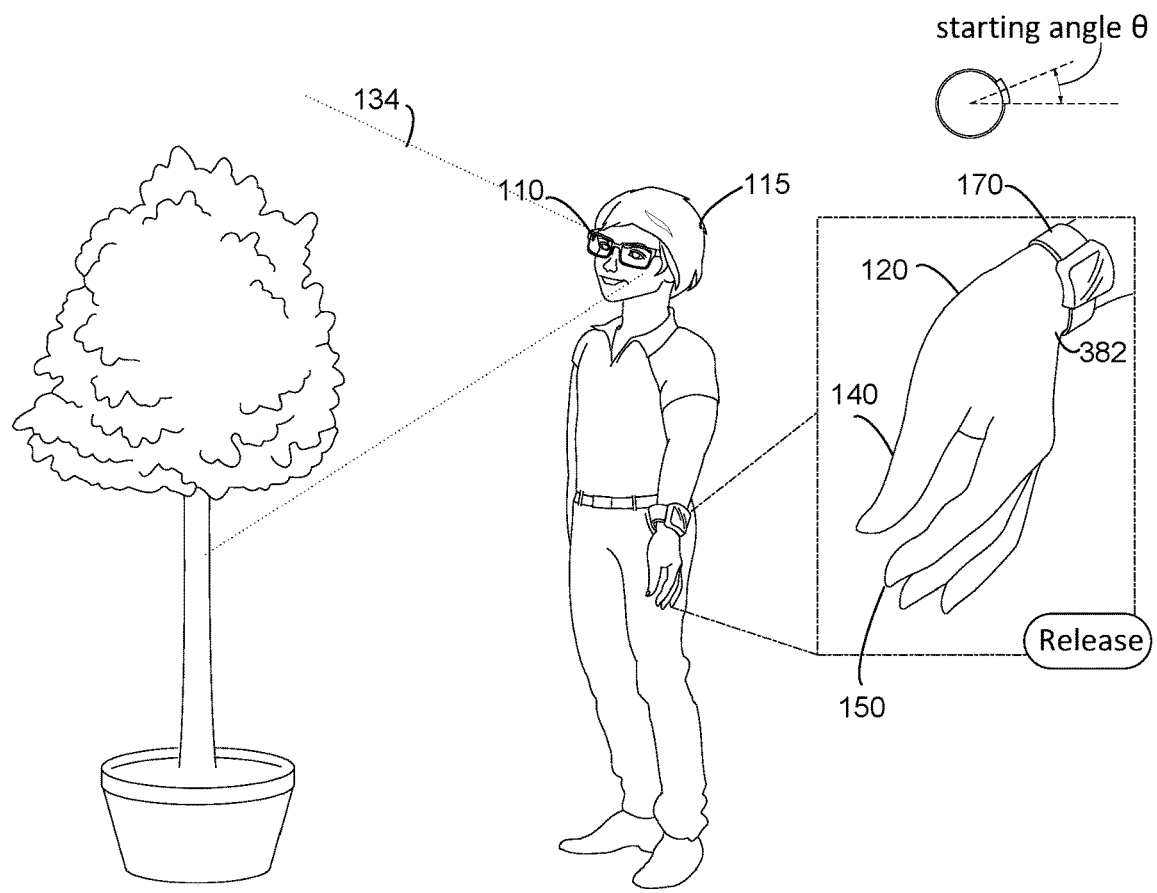
FIGS. 6A and 6B illustrates a flow diagram of a method for detecting an in-air hand gesture and determining if the in-air hand gesture is a camera-control gesture, according to some embodiments.
Figures 3, 3L, 4, 5, 6, 7:
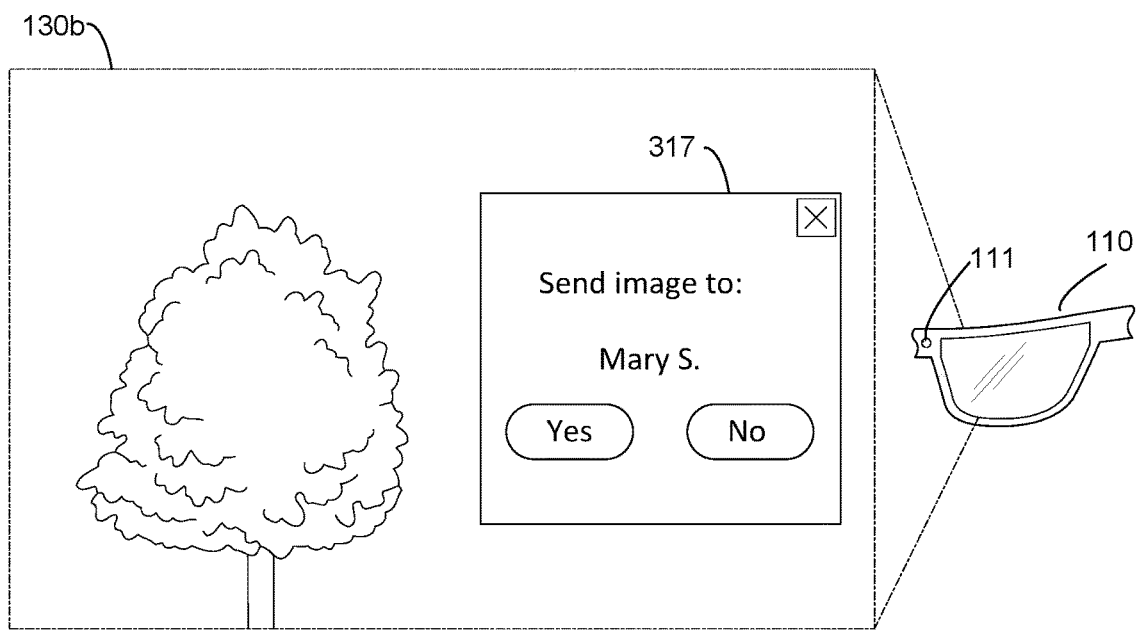
FIGS. 7A and 7B illustrates a detailed flow diagram of a method of using a gesture detected at a wrist-wearable device to cause presentation of camera data at a head-wearable device, according to some embodiments.
Figure 3M:
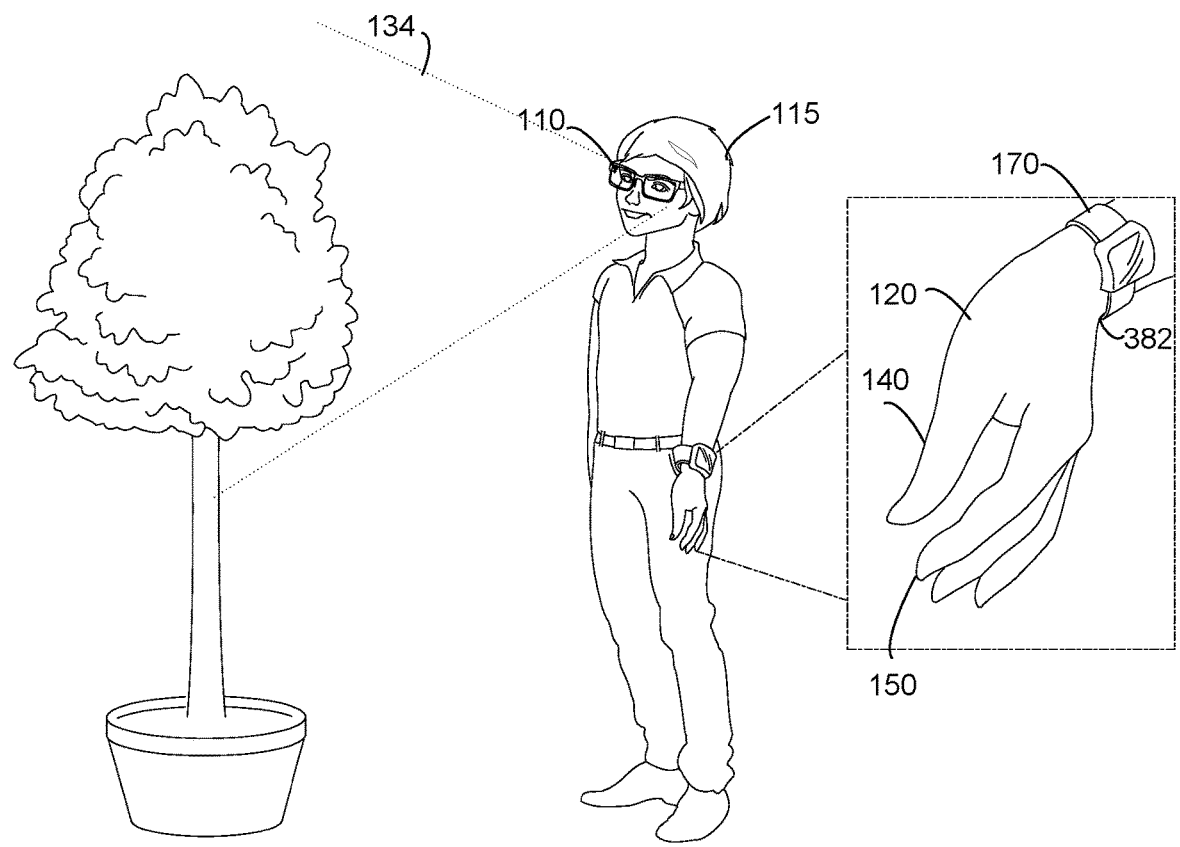
Figure 3N:
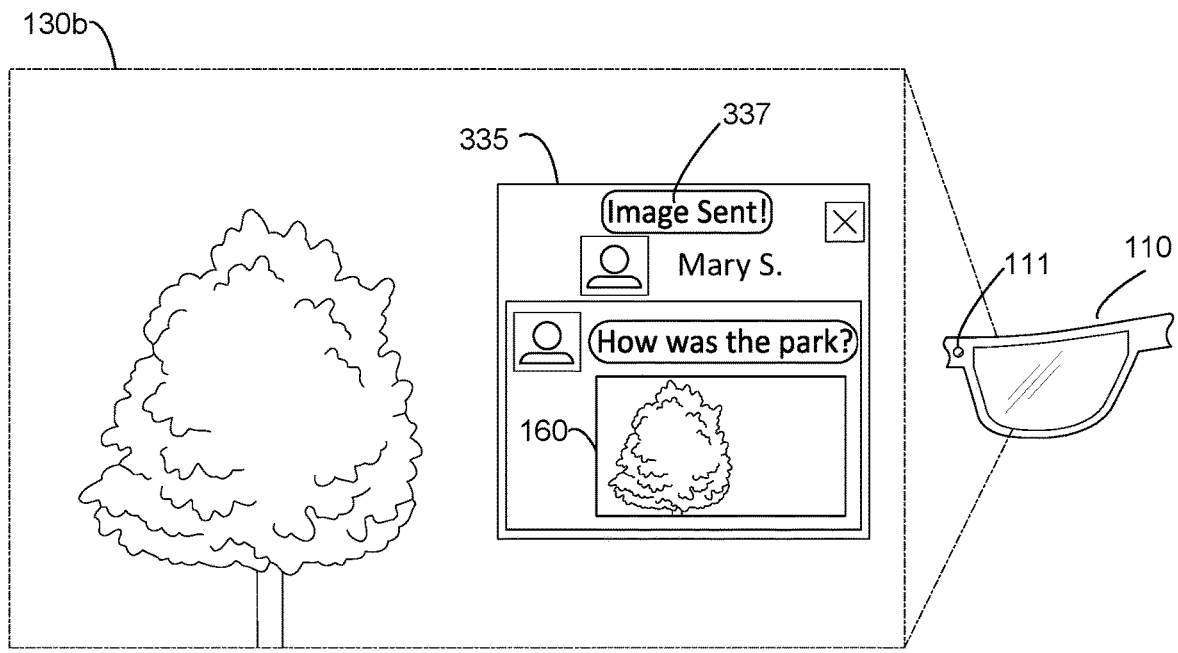

FIGS. 3A-3N illustrate adjustments to a representation of camera data using one or more hand gestures performed by a user, in accordance with some embodiments. In particular, hand gestures that, when detected by a wrist-wearable device 170, cause adjustments to camera data captured by an imaging device 111. As described above in reference to FIGS. 1A-1F, hand gestures are determined to be one or more camera control-gestures based on sensor data obtained by one or more sensors 1121 (FIG. 11) of the wrist-wearable device 170.

In FIG. 3A, the pinch and hold gesture 251 is associated with a camera control-gesture for displaying a preview of a representation of camera data captured by an imaging device 111. The camera control-gesture for displaying a preview of a representation of camera data captured by an imaging device 111 (e.g., of head-wearable device 110), when detected, causes the head-wearable device 110 to present, via a display 130, a representation of the camera data captured by an imaging device 111. As described below, in some embodiments, multiple hand gestured can be linked together to perform one or more action sequentially or concurrently. For example, additional hand gestures can be detected by the wrist-wearable device 170 that cause one or more adjustments to the camera data captured by an imaging device 111. Additionally, in some embodiments, the user is preparing to perform an additional hand gesture such as rotating the wrist 382, which starts at an angle theta.

FIG. 3B illustrates a field of view 134 of the user 115 in FIG. 3A. In some embodiments, in accordance with a determination the hand gesture is a camera control-gesture for displaying a preview of a representation of camera data captured by an imaging device 111 (e.g., the pinch and hold gesture 251), the head-wearable device 110 presents, via a display 130, a preview 260 to the user 115. Similar to FIGS. 2A-2F, the preview 260 includes a representation of camera data captured within a field of view 134 of the user 115. In some embodiments, the preview 260 includes information corresponding to the camera data captured by the imaging device 111. For example, the preview 260 incudes a current magnification of the representation of the camera data (e.g., zoom at 100%). In some embodiments, the information includes a capture time, capture location, one or more applied filter, camera modes, tags, stickers, and/or other information related to the captured camera data. In some embodiments, the information notifies the user that representation of the camera data is an unaltered representation of the image. In some embodiments, while camera control-gesture for displaying a preview of a representation of camera data captured is maintained, the head-wearable device 110 presents to the user 115 one or more indications that notify the user 115 that the head-wearable device 110 is capturing imaging data (e.g., glasses icon 231), capturing audio (e.g., mic icon 232), and/or the presenting audio data (e.g., speaker icon 233).

FIG. 3C illustrates adjustments to the camera data while the user 115 performs and maintains a hand gesture and performs an additional camera-controlling gesture. In particular, while the user 115 performs the pinch and hold gesture 251 (e.g., the camera control-gesture for displaying a preview of a representation of camera data), the user performs an additional gesture (e.g., rotating their wrist 382 by a predetermined degree) that causes the camera data captured by the imaging device 111 of head-wearable device to update. In some embodiments, rotation of a user 115's wrist is associated with a camera-control gesture for zooming-in or zooming-out that, when detected by the wrist-wearable device 170, adjust the magnification of the camera data captured by the imaging device accordingly.

FIG. 3D illustrates a field of view 134 of the user 115 in FIG. 3C. In particular, in accordance with a determination the pinch and hold gesture 251 is performed and maintained, and an additional camera controlling gesture is performed (e.g., the wrist 382 rotation), the preview 260 presented via a display 130 of the head-wearable device is updated to show a zoomed in representation of the camera data. For example, when the user 115 rotates their wrist, the preview 260 is updated to show the user's field of view 134 magnified by 400% (e.g., a closer zoomed in view of the object). In other words, changes to the magnification of the representation of the camera data are presented to the user 115 as the gesture is performed. In this way, the user 115 can visually see the changes being performed on the camera data.

The amount of magnification applied to the representation of the camera data is based on the rotation of the user 115's wrist. For example, the more the user rotates their wrist 382 counter-clockwise the greater the magnification. The user 115 can also control the rate at which the magnification is applied based on how fast the user 115 moves their wrist 382. The different movements of the user 115's wrist 382 are detected by the one or more sensors of the wrist-wearable device 170 and used to determine how the camera-control gestures (e.g., the magnification) should be applied. In some embodiments, the user 115 holds their wrist 382 in a rotated position for predetermined period of time (e.g., 2-5 seconds) to lock the representation of the camera data with a particular magnification. Alternatively or in addition, in some embodiments, a user 115 is required to hold their wrist 382 in a rotated position to trigger the magnification of the camera data.

FIG. 3E illustrates further adjustments to the camera data while the user 115 performs and maintains a hand gesture and performs a further camera-controlling gesture. In particular, while the user 115 performs the pinch and hold gesture 251, the user performs a further gesture (e.g., rotating their wrist 382 by another predetermined degree) that causes the camera data captured by the imaging device 111 of head-wearable device to update. Specifically, the user 115 rotates their wrist 382 in an opposite direction than the one shown in FIG. 3C (e.g., clockwise), which causes the magnification of the camera data captured by the imaging device 111 of head-wearable device to decrease (e.g., zooms-out from 400% to 200%).

FIG. 3F illustrates a field of view 134 of the user 115 in FIG. 3E. In particular, in accordance with a determination the pinch and hold gesture 251 is performed and maintained, and a further camera controlling gesture is performed (e.g., the wrist 382 rotation in the opposite direction), the preview 260 presented via a display 130 of the head-wearable device is updated to show a zoomed-out representation of the camera data. The changes to the preview 260 are presented to the user while the pinch and hold gesture 251 is performed and maintained and the wrist rotation is performed.

FIG. 3G illustrates the user 115 no longer performing and maintaining a hand gesture (e.g., releasing the hand gesture). As described above in FIGS. 2A-2D, in some embodiments, when the user 115 releases the hand gesture, the camera control-gesture associated with the hand gesture is completed or a follow-on action is performed. In FIG. 3G, releasing the pinch and hold gesture 251 causes the head-wearable device 110 to capture camera data with a magnification of 200%. In some embodiments, a representation of the captured image data is presented to the user 115 via the display 130 of the head-wearable device 110.

FIG. 3H illustrates a field of view 134 of the user 115 in FIG. 3G. Specifically, the head-wearable device 110 presents, via display 130, a captured image when the pinch and hold gesture 251 is released. As described above in reference to FIGS. 1D and 2D, the representation of the camera data (e.g., captured image 160) can be presented within a user interface 165 displayed at the display 130 of the head-wearable device 110. In some embodiments, the user interface 165 includes one or more affordances for interacting with the captured image 160. For example, the one or more affordances can include, but are not limited to, a save affordance 171, a share affordance 172, a messaging affordance 173, an editing affordance 174, and a contacts affordance 175. The save affordance 171 allows the user 115 to save the captured image 160 to memory, the share affordance 172 allows the user 115 to directly share the captured image 160 to a website, application, social media platforms, etc., the messaging affordance 173 allows the user to directly send the captured image 160 via a messaging application, an editing affordance 174 allows the user to edit the captured image 160 (e.g., apply filters, change the resolution, apply an additional zoom-in or zoom-out, tag objects or individuals, crop the captured image data 160, and a number of other edits), and the contacts affordance 175 allows the user to directly send the captured image 160 to a specified contact.

In some embodiments, the user is able to perform other in-air hand gestures to allow for quick sharing of captured images, without the need to display the one or more options. In another embodiment, both in-air hand gestures and presented affordances can be utilized to share captured images 160. In one example, the user can contact a particular phalange portion of their middle finger to share with different contacts, e.g., if a distal phalange portion is contacted (e.g., using a user's thumb (phalange 140)), then the image shared with a first contact, if a middle phalange portion is contacted (e.g., using a user's thumb (phalange 140)), then the image is shared with a second contact distinct from the first contact, and if a proximal phalange portion is contacted (e.g., using a user's thumb (phalange 140)), then the image is shared with a third contact that is distinct from the first and second contacts. In some embodiments, the in-air gesture that causes capturing of the image can be a multi-step in-air gesture such that a first portion of the gesture (e.g., thumb (phalange 140) contacting index finger) can cause capturing of the image and a second portion of the gesture (e.g., a pressing force between the thumb (phalange 140) and index finger (phalange 150) exceeding a force threshold) can cause sharing of the image with a specific contact (e.g., different contacts can be associated with different force thresholds to allow for easy sharing of images using such multi-step in-air gestures.

FIG. 3I illustrates the user 115 performing one or more gestures to navigate and select one or more affordances presented within the user interface 165. In particular, FIG. 3I shows the user 115 moving their wrist 382 up or down to cycle through the one or more affordances. For example, as shown in FIG. 3J, in accordance with the user 115's wrist movement, the save affordance 171 is de-selected and the share affordance 172 is selected. The user 115 can select the affordance through the use of another hand gesture (e.g., contacting at least two phalanges, holding at least one phalange still, and/or other examples described herein.

FIG. 3K illustrates the user 115 performing one or more gestures to navigate and select one or more contact affordances (e.g., shown in a contacts user interface 315) for sharing captured image data. The user 115 can cause the head-wearable device 110 to display the contacts user interface 315 via a punch and hold gesture 251. The one or more contact affordances can include a first contact 325, a second contact 327, and a third contact 329 presented within the user interface 165. More than three contact affordances can be displayed within the user interface 165. The user 115 can navigate through the different contact affordances by moving their wrist 382 up or down or rotating their wrist 382 to cycle through the one or more affordances.

In FIG. 3L-1, the first contact 325 is highlighted. The user 115 can navigate through the different contact affordances by maintaining the hold gesture 251 and moving their wrist 382 up or down, or rotating their wrist 382 to cycle through the one or more affordances. For example, in FIGS. 3L-2 and 3L-3, while maintaining the pinch and hold gesture 251, the user 115 rotates their wrist 382 a predetermined amount (e.g., 20 degrees) to cycle from the first contact affordance 325 to the second contact affordance 327. In FIGS. 3L-4 and 3L-5, while maintaining the pinch and hold gesture 251, the user 115 returns their wrist 382 to the starting position which causes the contacts user interface 315 to cycle back from the second contact affordance 327 to the first contact affordance 325. In FIGS. 3L-6 and 3L-7, the user selects the first contact affordance 325 by releasing the pinch and hold gesture 251. After the contact affordance is selected, the head-wearable device 110 can display a confirmation user interface 317 that allows the user 115 to confirm sharing the captured image 160 or cancel (or go back).

FIGS. 3M and 3N illustrate a messaging interface 335 displayed at the display 130 of the head-wearable device 110. The messaging interface 335 can be displayed, via the head-wearable device 110, after the user 115 has selected the first contact affordance 325 in FIG. 3L-7. In some embodiments, a notification is provided to the user 115 to inform them that the message was successfully sent to the selected contact (e.g., "Image Sent" 337 or "Image sent to Mary S."). The messaging interface 335 includes a message thread shared between the user 115 and the selected contact affordance (e.g., the first contact 325). As shown in FIG. 3N, the captured image 160 is shared with the first contact 325 via the message thread on interface 335. The captured image 160 can be shared using different applications or contact information. For example, the captured image 160 can be shred using one or more social media applications, email, messaging applications, file sharing applications, etc.

FIGS. 3O-3Z illustrate selection of one or more capture modes using one or more hand gestures performed by a user, in accordance with some embodiments. In particular, hand gestures that, when detected by a wrist-wearable device 170, cause a head-wearable device 110 and/or the wrist-wearable device 170 to present one or more affordances for selecting one or more capture mores and/or an image data gallery as discussed in detail below. As described above in reference to FIGS. 1A-1F, the wrist-wearable device 170 can detect and determine one or more hand gestures based on sensor data obtained by one or more sensors 1121 (FIG. 11).

Figure 3O:
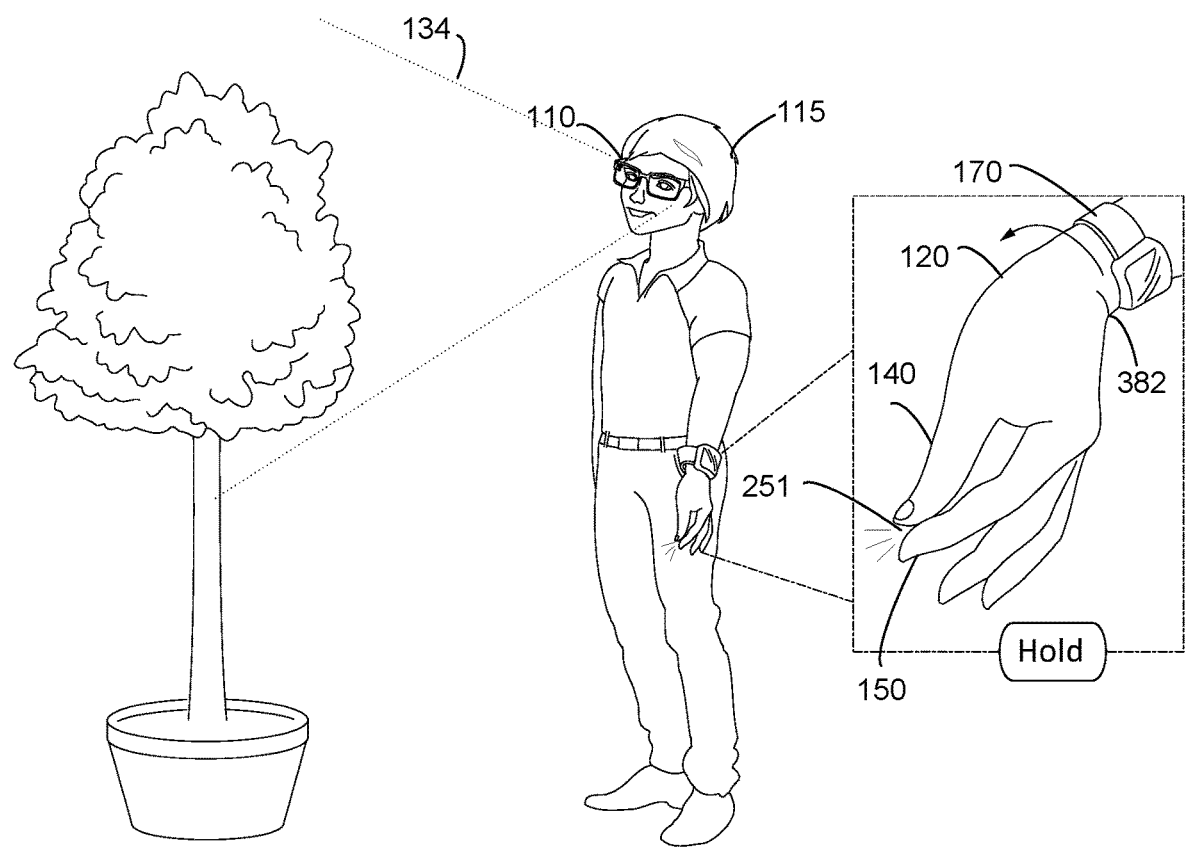

In FIG. 3O, a pinch and hold gesture 251 associated with a camera control-gesture for selecting one or more capture modes is detected. The camera control-gesture for selecting one or more capture modes, when detected, causes the head-wearable device 110 to present, via a display 130, one or more affordances for selecting a capture mode and/or viewing an image data gallery. For example, the head-wearable device 110 can display an image data capture affordance 383, a video data capture affordance 384, and an album affordance 385 (FIG. 3R). As shown below in FIG. 3P, in addition to the one or more affordances for selection a capture mode and/or viewing an image data gallery, the head-wearable device 110 can display a representation of camera data captured by an imaging device 111 of head-wearable device 110.

Figure 3P:
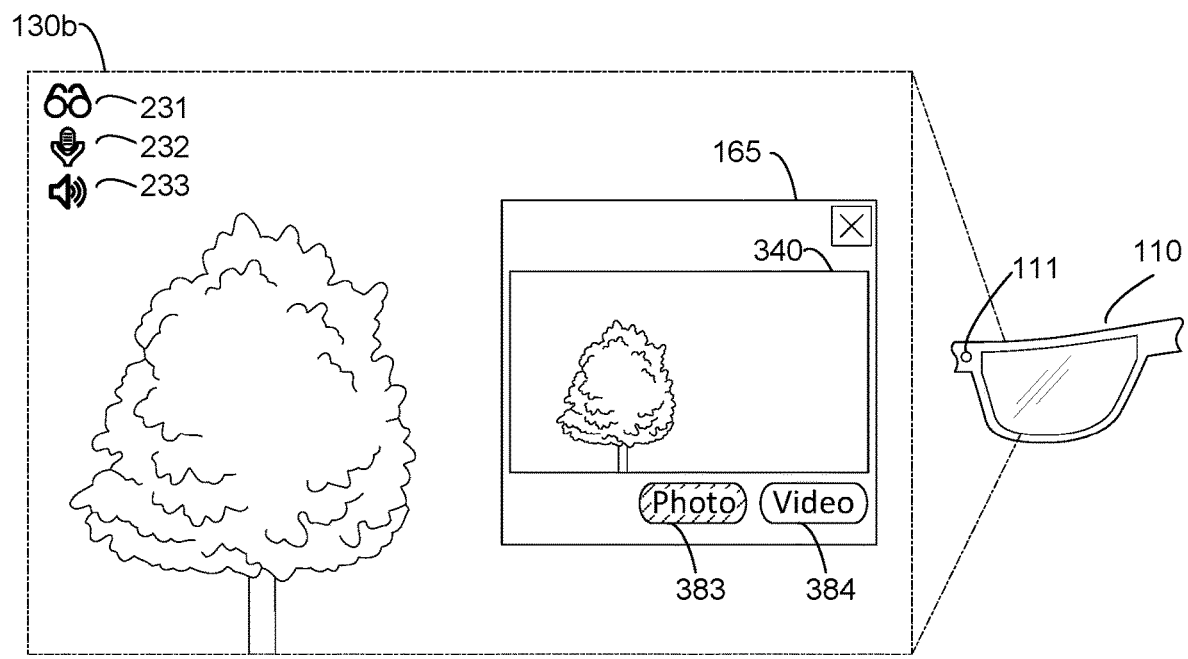

FIG. 3P illustrates a field of view 134 of the user 115 in FIG. 3O. In some embodiments, in accordance with a determination the hand gesture is a camera control-gesture for selecting one or more capture modes, the head-wearable device 110 presents, via the display 130, a preview 340, an image data capture affordance 383, a video data capture affordance 384, an album affordance 385. Similar to FIGS. 2A-3N, the preview 340 includes a representation of camera data captured within a field of view 134 of the user 115. In some embodiments, the preview 340 includes information corresponding to the camera data captured by the imaging device 111. In some embodiments, the head-wearable device 110 also presents one or more indications that notify the user 115 that the head-wearable device 110 is capturing imaging data (e.g., glasses icon 231), capturing audio (e.g., mic icon 232), and/or the presenting audio data (e.g., speaker icon 233).

Figure 3Q:
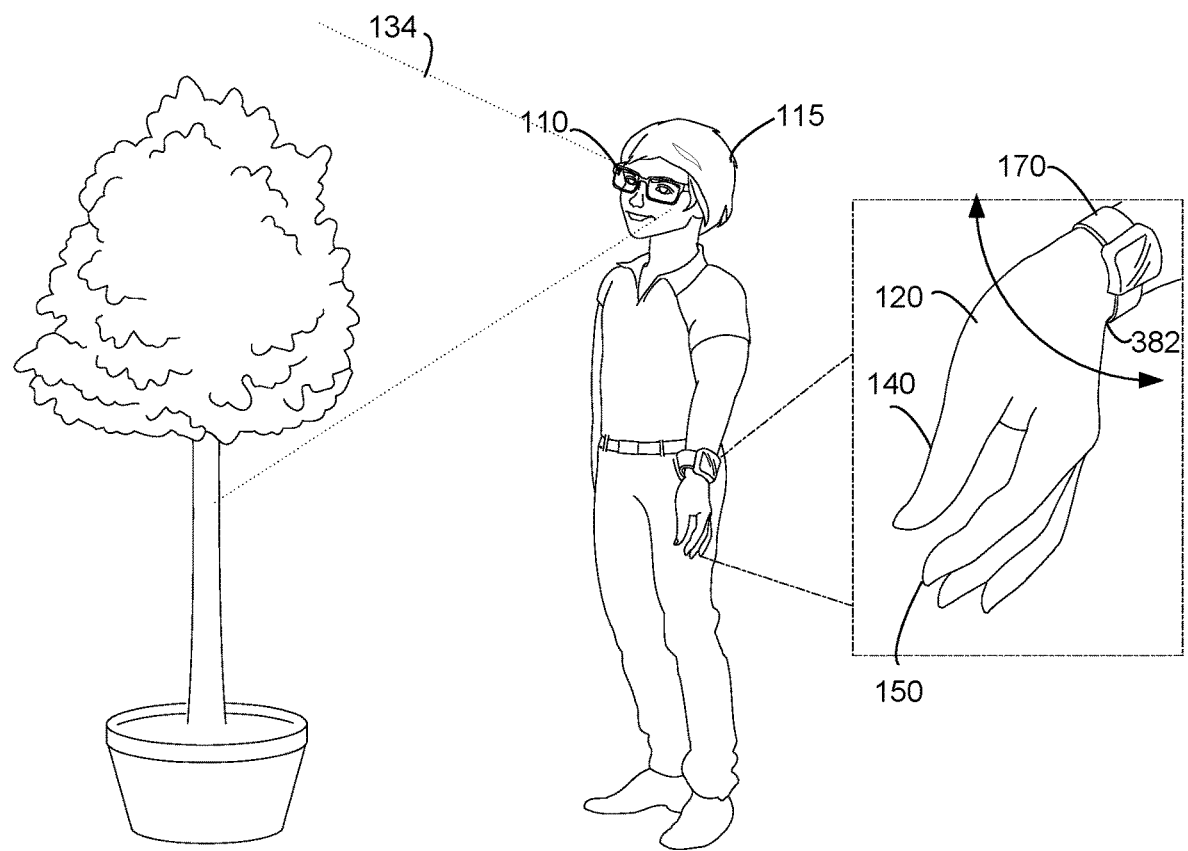
Figure 3R:
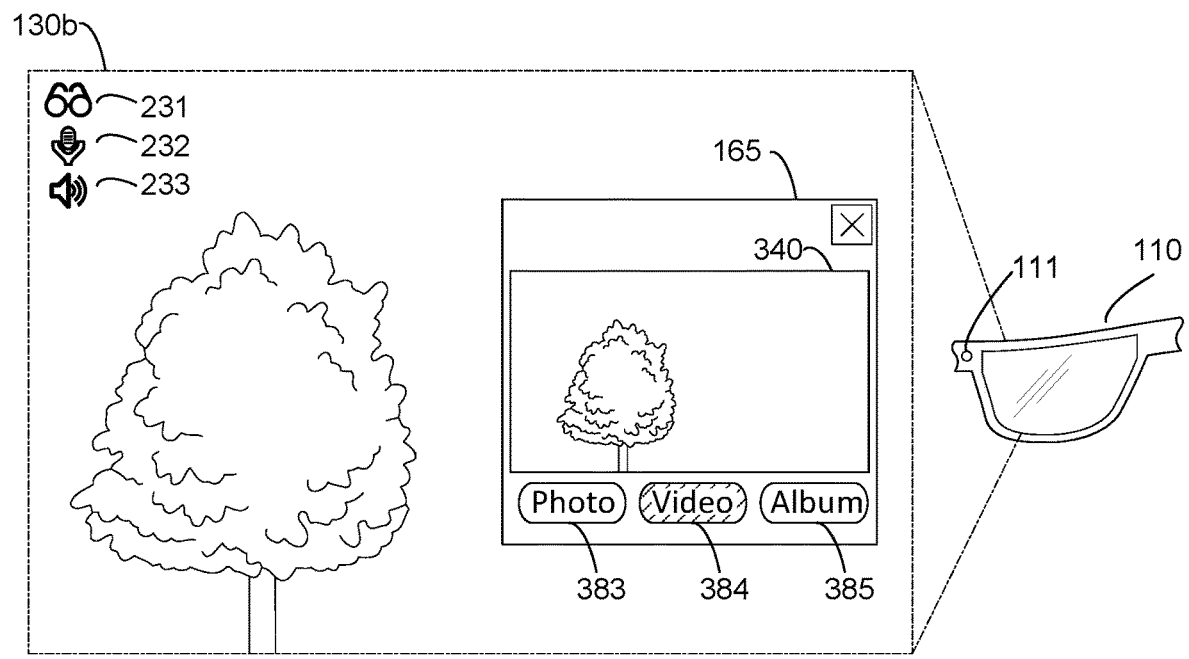

FIG. 3Q illustrates the user 115 navigating between the different affordances for selecting a capture mode and/or viewing an image data gallery. In some embodiments, the user can navigate between the different affordances for selecting a capture mode and/or viewing an image data gallery via an additional hand gesture, such as moving their wrist 382 up and down, or left and right.

FIG. 3R illustrates a field of view 134 of the user 115 in FIG. 3C. In particular, in accordance with a determination the additional hand gesture for navigating through the different affordances for selecting a capture mode and/or viewing an image data gallery is performed, the wrist-wearable device 170 and/or the head-wearable device 110 cycle through the different affordances. For example, as shown in FIG. 3R, the image data capture affordance 383 is no longer highlighted and the video data capture affordance 384 is highlighted. Selection of a particular capture mode causes the head-wearable device 110 to capture corresponding image data. For example, selection of the image data capture affordance 383, causes the head-wearable device 110 to capture image data as discussed above in reference to FIGS. 1A-3N. Alternatively, selection of the video data capture affordance 384, causes the head-wearable device 110 to capture video data as discussed below. Selection of the album affordance 385 causes the head-wearable device to display one or more captured images and/or videos.

Figure 3S:
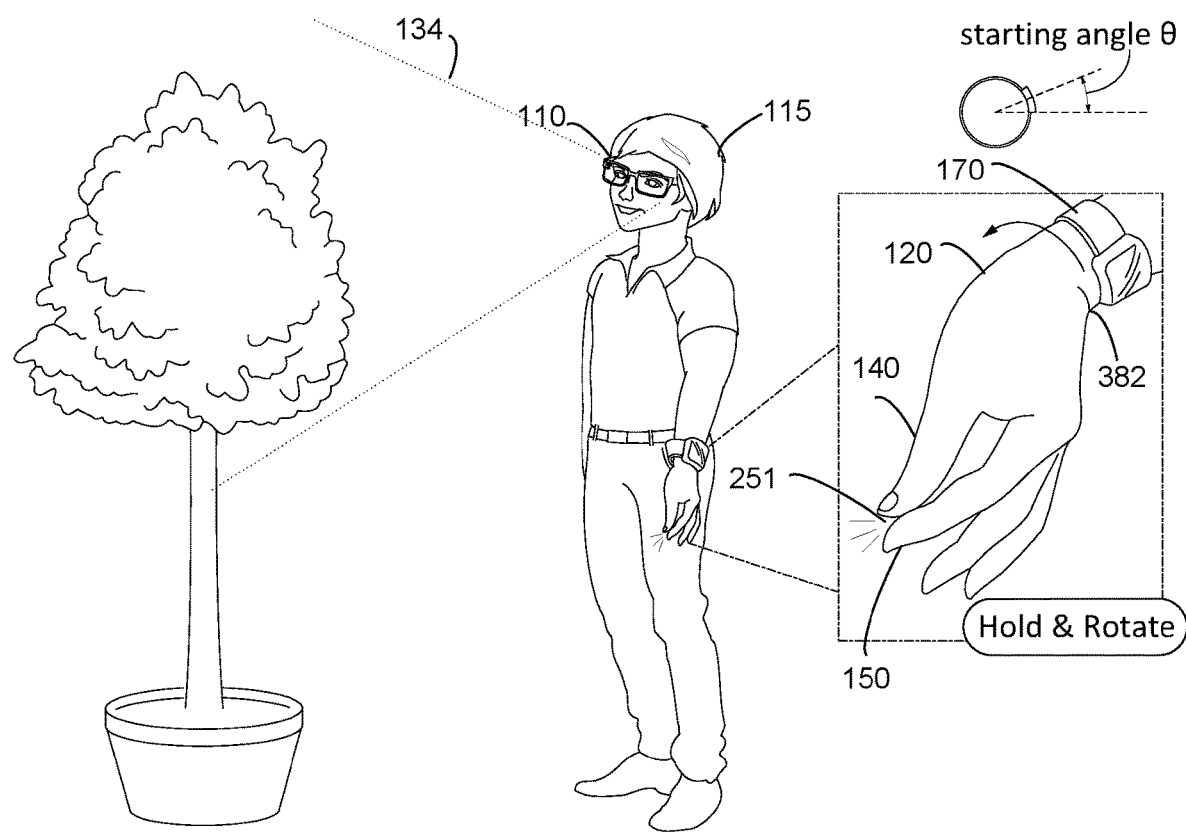
Figure 3T:
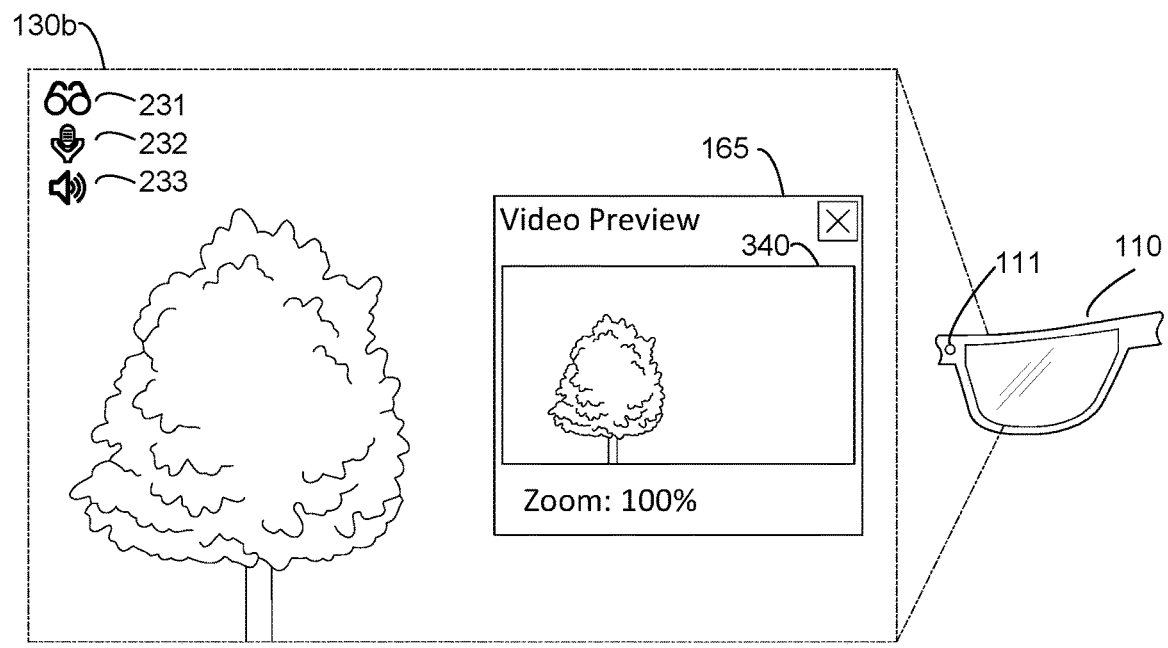

In FIGS. 3S and 3T the user has selected the video data capture affordance 384, via one or more hand gestures (e.g., a pinch gesture 351). The wrist-wearable device 170, in response to determining that the video data capture affordance 384 is selected via one or more hand gestures, causes the head-wearable device 110 to capture video data via imaging device 111. The video data captured by the head-wearable device 110 includes a portion of the user 115's field of view 134. The head-wearable device 110 continues to capture video data until the user 115 provides another hand gesture associated with another camera-control gesture for terminating the video capture. The head-wearable device 110 can present, via display 130, the preview 340 of the captured video data to the user 115. While the head-wearable device 110 captures the video data, the user 115 can perform additional hand gestures to adjust the capture of the video data. For example, the user 115 can perform one or more hand gestures for controlling the zoom of the video data capture as discussed above in reference to FIGS. 3A-3N.

Figure 3U:
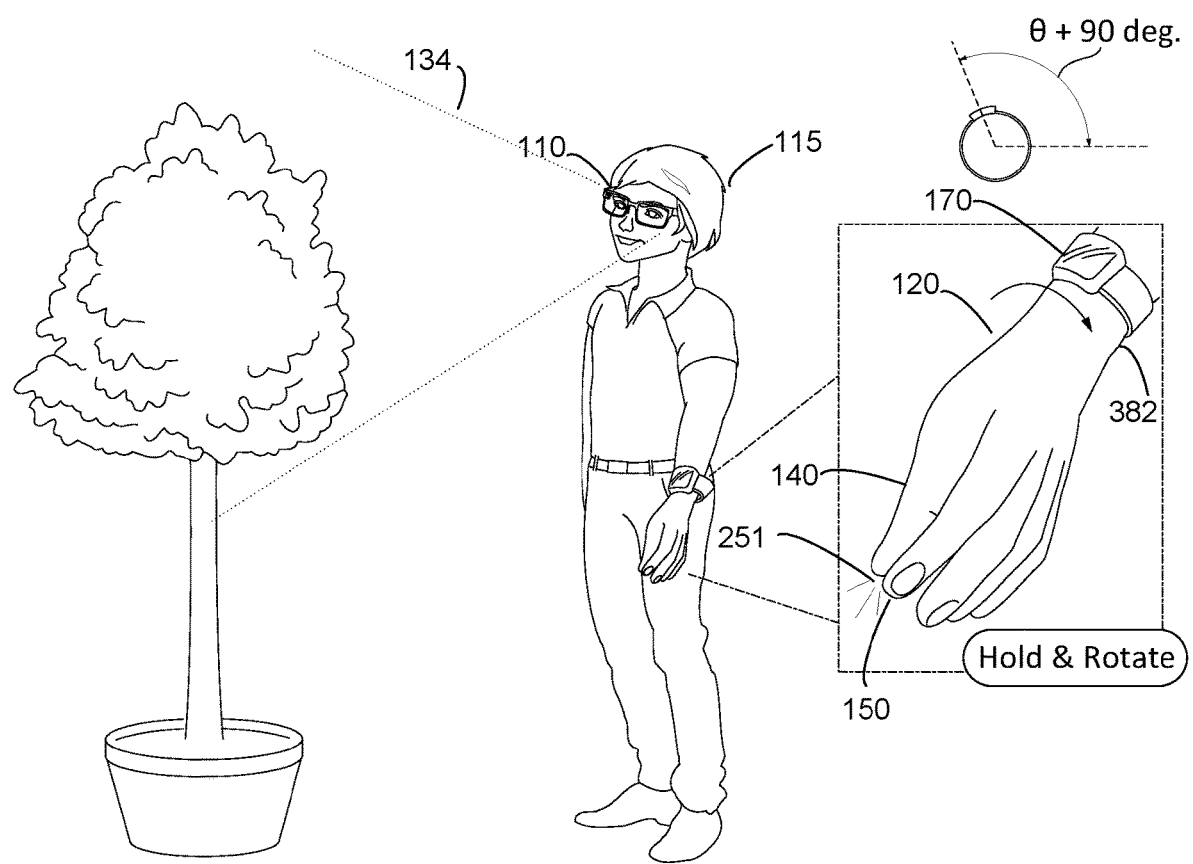
Figure 3V:
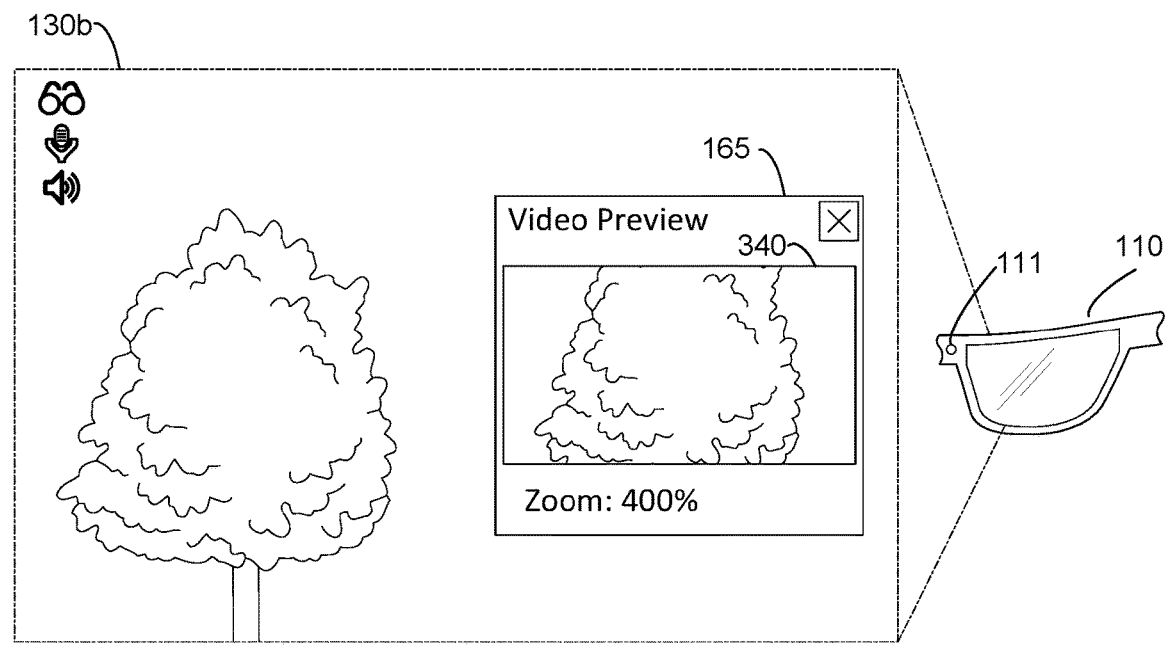

FIGS. 3U-3V illustrates adjustments to the video data when one or more camera-control gestures performed by the user 115 are detected. In particular, while the user 115 performs the pinch and hold gesture 251 and rotates their wrist 382, the head-wearable device 110 is caused to zoom in on a portion of the user 115's field of view 134 (e.g., from 100% to 400% as shown in preview 340) causes the camera data captured by the imaging device 111 of head-wearable device to update.

Figure 3W:
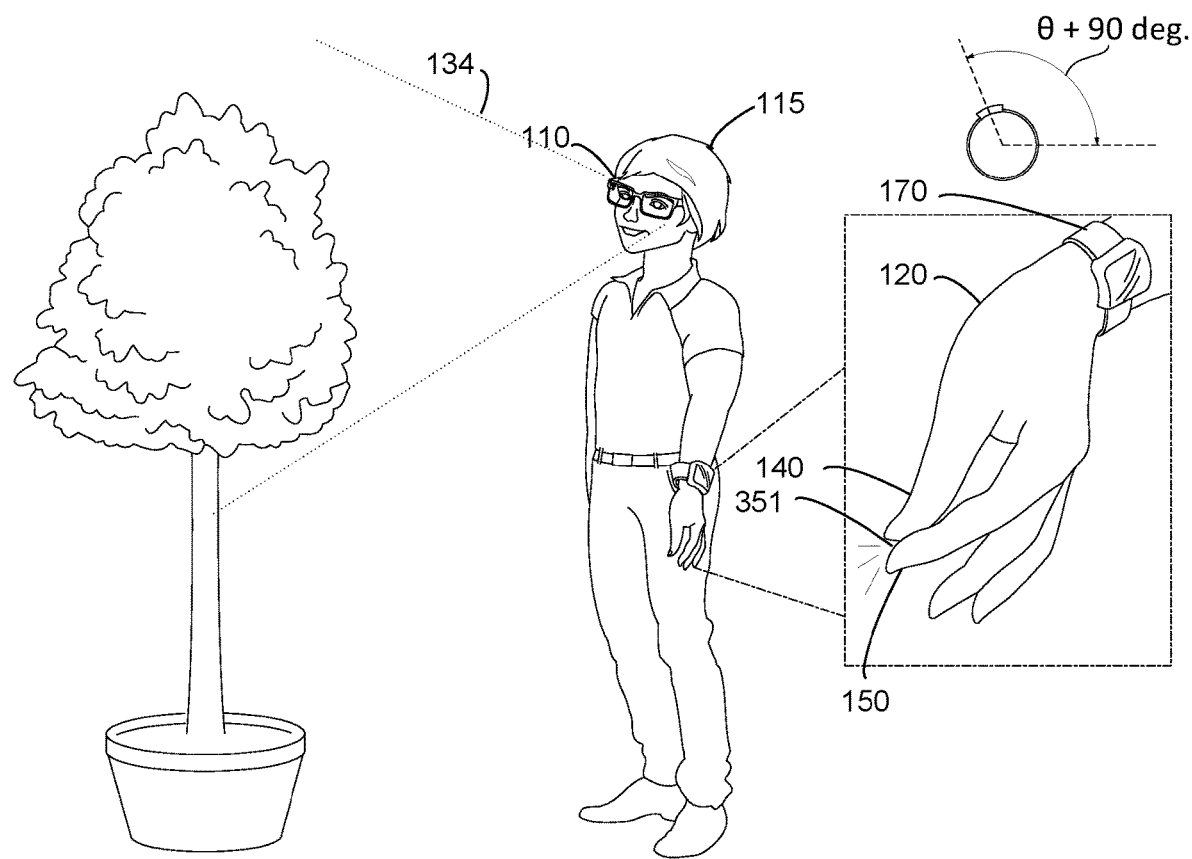
Figure 3X:
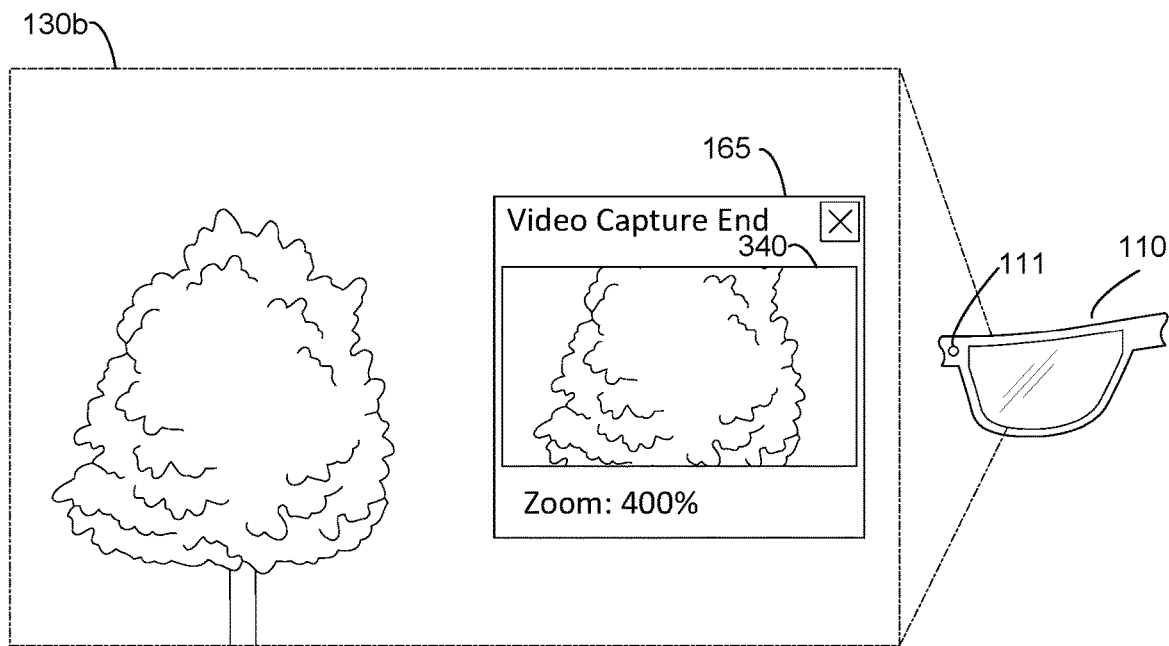

FIGS. 3W-3X illustrates the user 115 performing an additional hand gesture to end the video capture. In particular, the user 115 can perform another pinch gesture 351 that when detected by the wrist-wearable device 170 causes the head-wearable device to cease capturing video data. When the head-wearable device 110 ceases to capture vide data, it displays a notification to the user that the video capture session has ended (e.g., "Video Capture End). Additionally or alternatively, the head-wearable device 110 can also cease presenting the glasses icon 231, the mic icon 232, and/or the speaker icon 233 such that the user 115 is aware that the head-wearable device 110 is not actively capturing audio and/or camera data. In some embodiments, the glasses icon 231, the mic icon 232, and/or the speaker icon 233 can be presented with a strikethrough to further make clear to the user 115 that data is not being captured.

Figure 3Y:
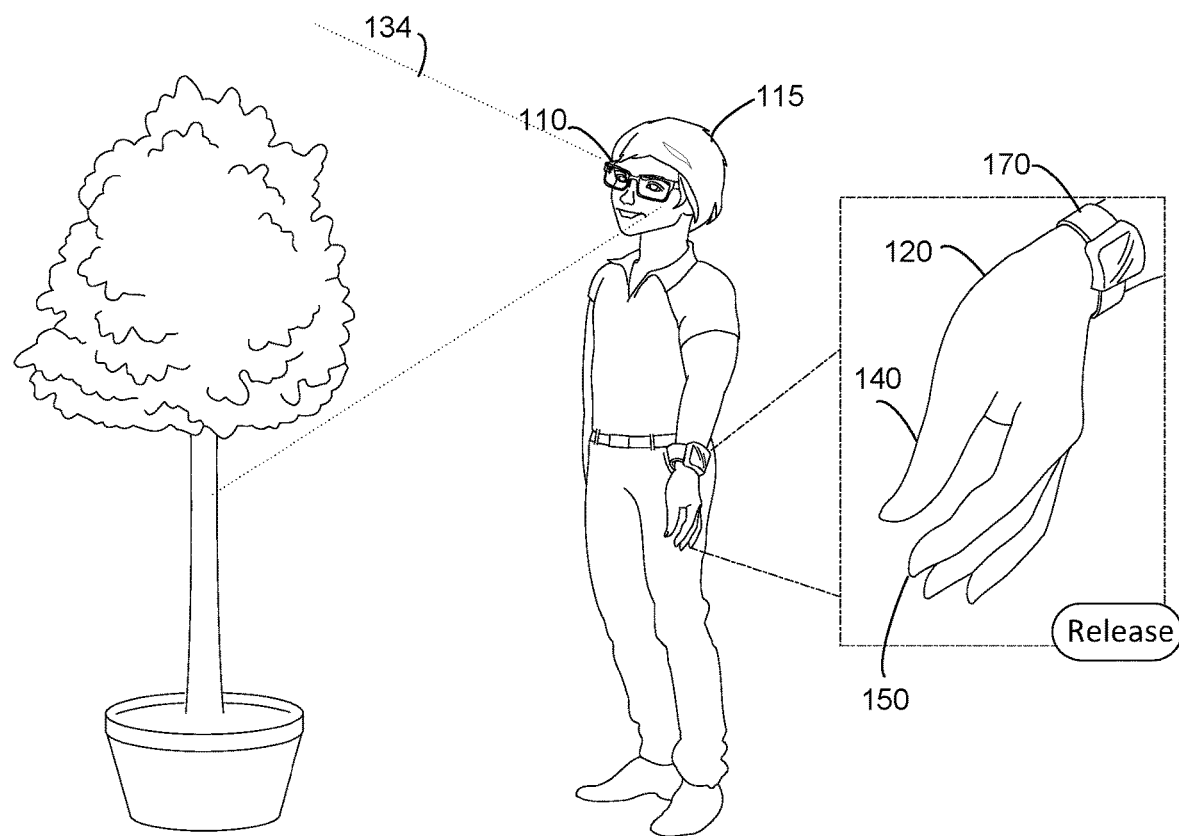
Figure 3Z:
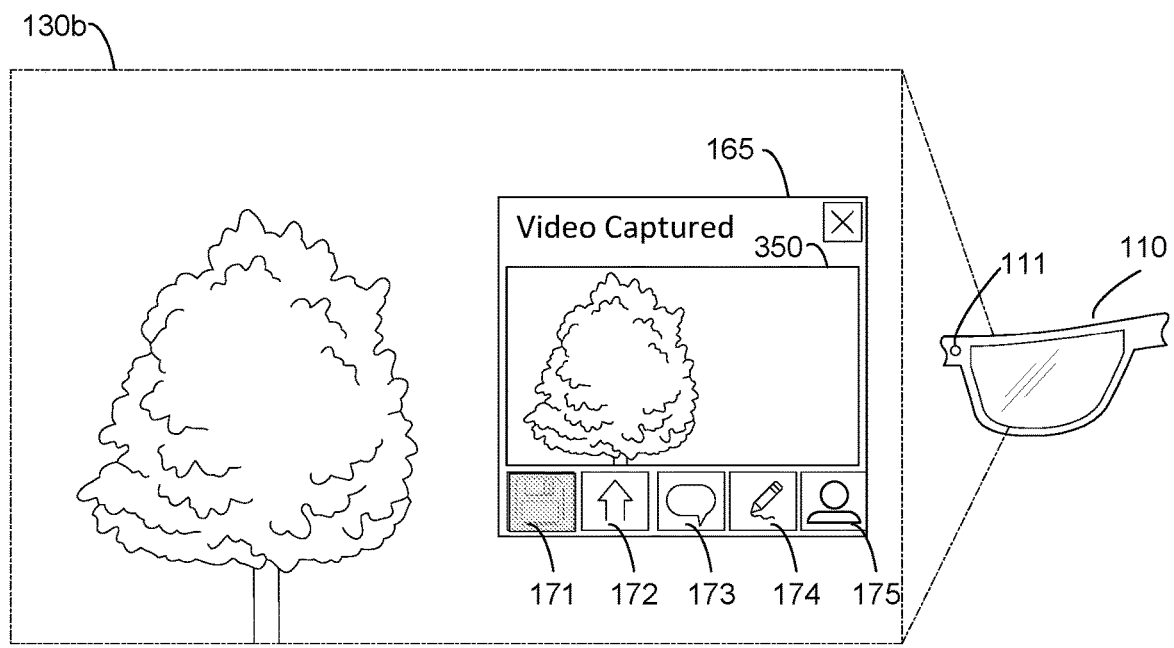

FIG. 3Y illustrates the user 115 no longer performing a hand gesture (e.g., releasing the pinch gesture 351). As described above in FIGS. 2A-3N, in some embodiments, when the user 115 releases the hand gesture, the camera control-gesture associated with the hand gesture is completed or a follow-on action is performed. In FIG. 3Y, releasing the pinch gesture 351 causes the head-wearable device 110 to present a user interface for interacting with the captured video 350. For example, as shown in FIG. 3Z, the head-wearable device 110 presents, via display 130, the captured vide data 350 and one or more affordances for interacting with the captured video data 350, such as a save affordance 171, a share affordance 172, a messaging affordance 173, an editing affordance 174, and a contacts affordance 175. Additional information on the one or more affordances for interacting with the captured video data 350 (of capture image data 160) is provide above in reference to FIGS. 1A-3N.

FIG. 4A-4J illustrate different surface-contact gestures performed by a user 115, in accordance with some embodiments. In particular, surface-contact gestures that are determined by a wrist-wearable device 170 to be one or more camera-control gestures. As described above in reference to FIGS. 1A-3J, gestures are determined to be one or more camera control-gestures based on sensor data obtained by one or more sensors 1121 (FIG. 11) of the wrist-wearable device 170.

Figure 4B:
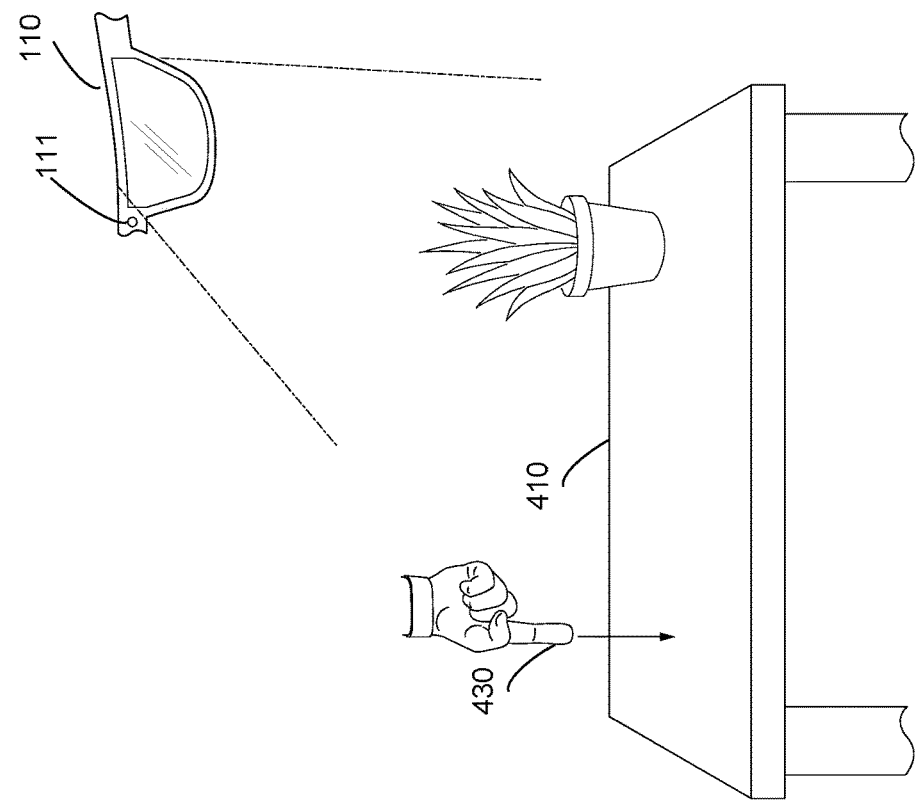
Figure 4A:
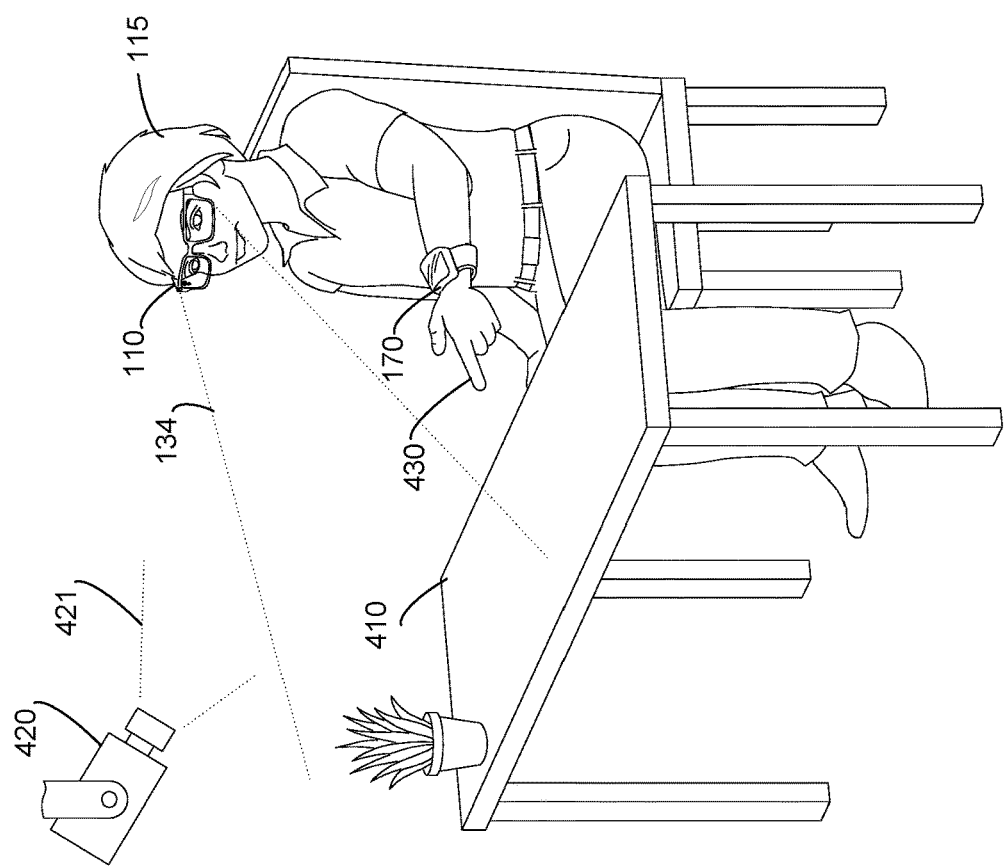

In FIG. 4A, a user 115 is viewing a physical environment including one or more objects while wearing the head-wearable device 110 and the wrist-wearable device 170. While wearing the wrist-wearable device 170, sensor data is monitored to sense a surface-contact gesture performed by user 115. The data used to detect and determine a surface-contact gesture can also be data from an imaging device 111 that is able to see the user 115's hand to use computer vision to detect gestures. One or all of the sensors can be utilized to provide data for detecting and determining a hand gesture. The sensed surface-contact gestures are further determined as a particular control gesture (e.g., a camera-control gesture) based, in part, on the sensor data. For example, when the user 115 moves a portion of his hand or intends to move a portion of his hand (e.g., phalanges 140, 150, etc.), the wrist-wearable device 170 detects position and/or orientation data as well as neuromuscular signals generated by the user 115's hand movement and contact with a surface 410 (e.g., a table). The wrist-wearable device 170, using the one or more processors 1150, determines the type of hand movements performed or intended to be performed by the user 115 as well a control command associated with the surface-contact gesture based on the detected position and/or orientation data and neuromuscular signals. As described below, the wrist-wearable device 170 provides one or more commands associated with the surface-contact gesture to another device, such as the head-wearable device 110, to perform a corresponding action. Alternatively, in some embodiments, the wrist-wearable device 170 provides sensor data associated with the surface-contact gesture to another device such that the other device can determine the type of surface-contact gesture performed by the user 115.

FIG. 4B illustrates the field of view 134 of the user 115 in FIG. 4A. In particular, the user 115's view before any surface-contact gesture is performed and detected by the wrist-wearable device 170. The user 115 can move around freely without having their field of view 134 obstructed. For example, as the user 115 moves their head the field of view 134 of the user 115 changes based on the user 115's movements. As described above, in some embodiments, the display 130 is coupled with a lens or both lenses. In some embodiments, the display 130 is positioned over a portion of the lens without obstructing the user 115's view. Alternatively, in some embodiments, the display 130 makes up all or a substantial portion of the lens or lenses.

Figure 4D:
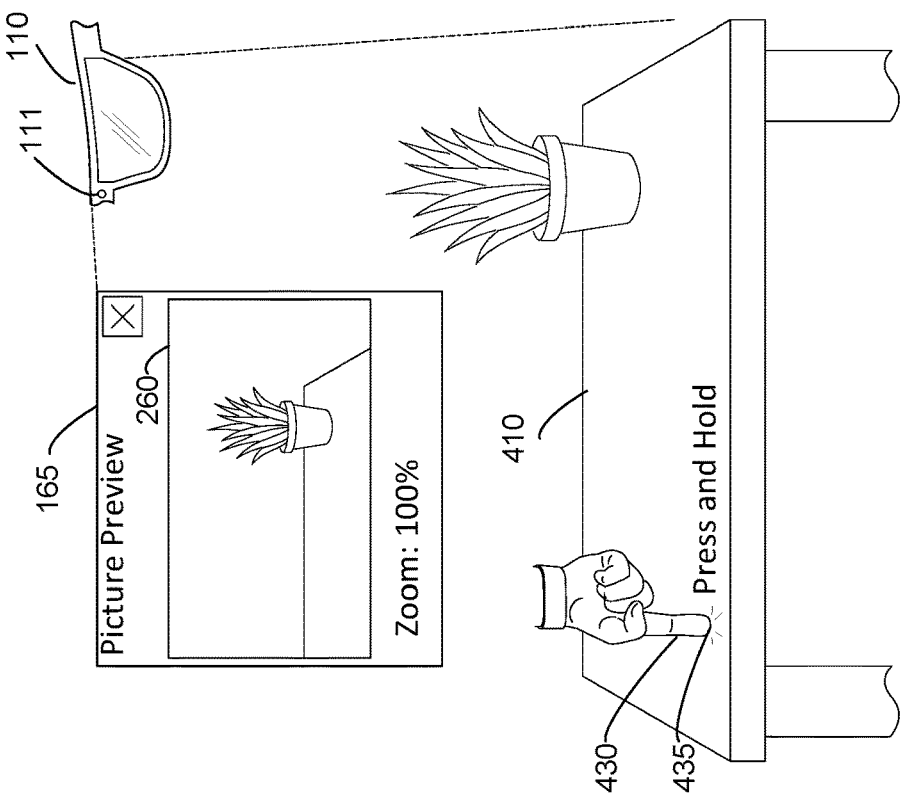
Figure 4C:
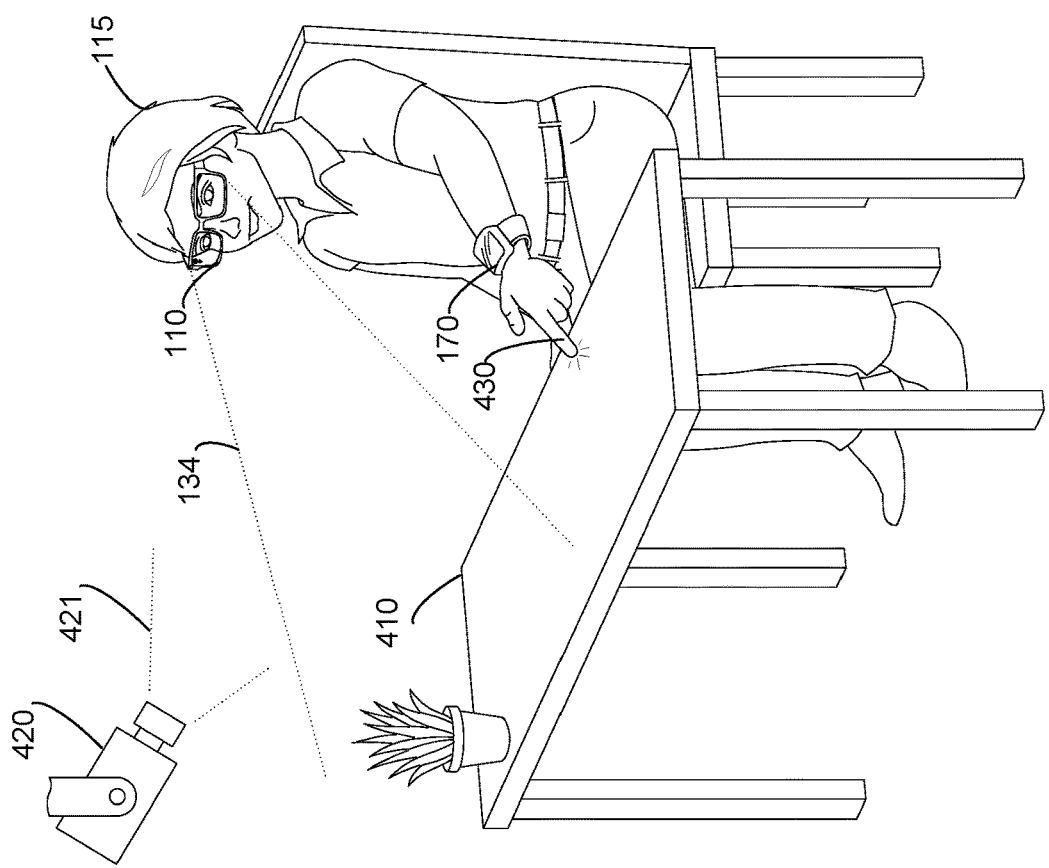

In FIG. 4C, the user 115 performs and maintains a surface-contact gesture (e.g., pressing and holding phalange 430 on a surface). In some embodiments, maintaining a surface-contact gesture can include holding a phalange or phalanges pressed against a surface for a predetermined period of time (e.g., two or more seconds). Alternatively or additionally, in some embodiments, maintaining a surface-contact gesture can include applying a predetermined threshold pressure between at least one phalange and a surface (e.g., a table, wall, palm, leg, etc.) for a predetermined period of time (e.g., at least two seconds). The surface-contact gesture performed by the user 115 generates sensor data (e.g., EMG data, IMU data, etc.) that is used by the wrist-wearable device 170 to determine, using the one or more processors 1150 (FIG. 11), a camera control-gesture.

In FIG. 4C, a press and hold gesture 435 is performed by the user 115. In some embodiments, similar to the camera-control gesture described above in reference to FIGS. 2A-2D, the press and hold gesture 435 is associated with a camera control-gesture for displaying a preview of a representation of camera data captured by an imaging device 111. The camera control-gesture for displaying a preview of a representation of camera data captured by an imaging device 111, when detected by the wrist-wearable device 170, causes the head-wearable device 110 to present, via a display 130, a representation of the camera data captured by an imaging device 111.

FIG. 4D illustrates a field of view 134 of the user 115 in FIG. 4C. In some embodiments, in accordance with a determination the hand gesture is a camera control-gesture for displaying a preview of a representation of camera data captured by an imaging device 111 (e.g., the press and hold surface-contact gesture 435), the head-wearable device 110 presents a preview 260 to the user 115. The preview 260 includes a representation of camera data captured within a field of view 134 of the user 115. In some embodiments, the preview 260 includes a subset of the field of view 134 or of the entire field of view 134 of the user 115. The preview 260 can be a live feed (e.g., simultaneous capture and presentation) of what the camera is viewing while the hand gesture is maintained. Alternatively, the preview 260 can be a recording of a field of view 134 captured by the user 115. In some embodiments, a plurality of previews from one or more cameras can be displayed on the head-wearable device 110. In some embodiments, the preview 260 is presented to the user 115 via a user interface 165 as described above in reference to FIGS. 1A-3J.

Figure 4F:
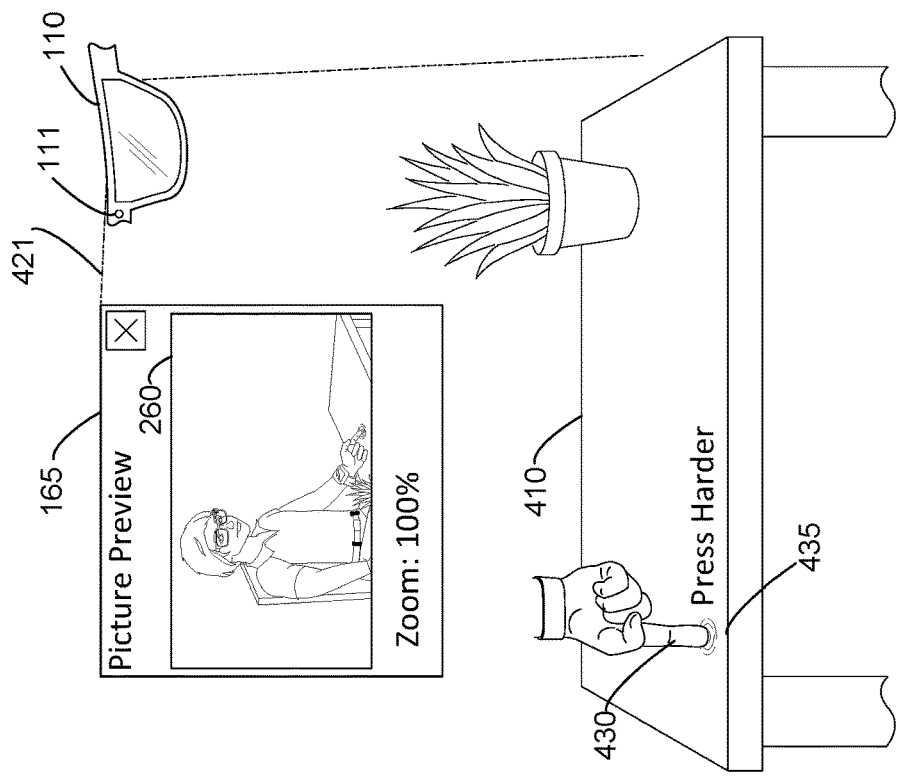
Figure 4E:
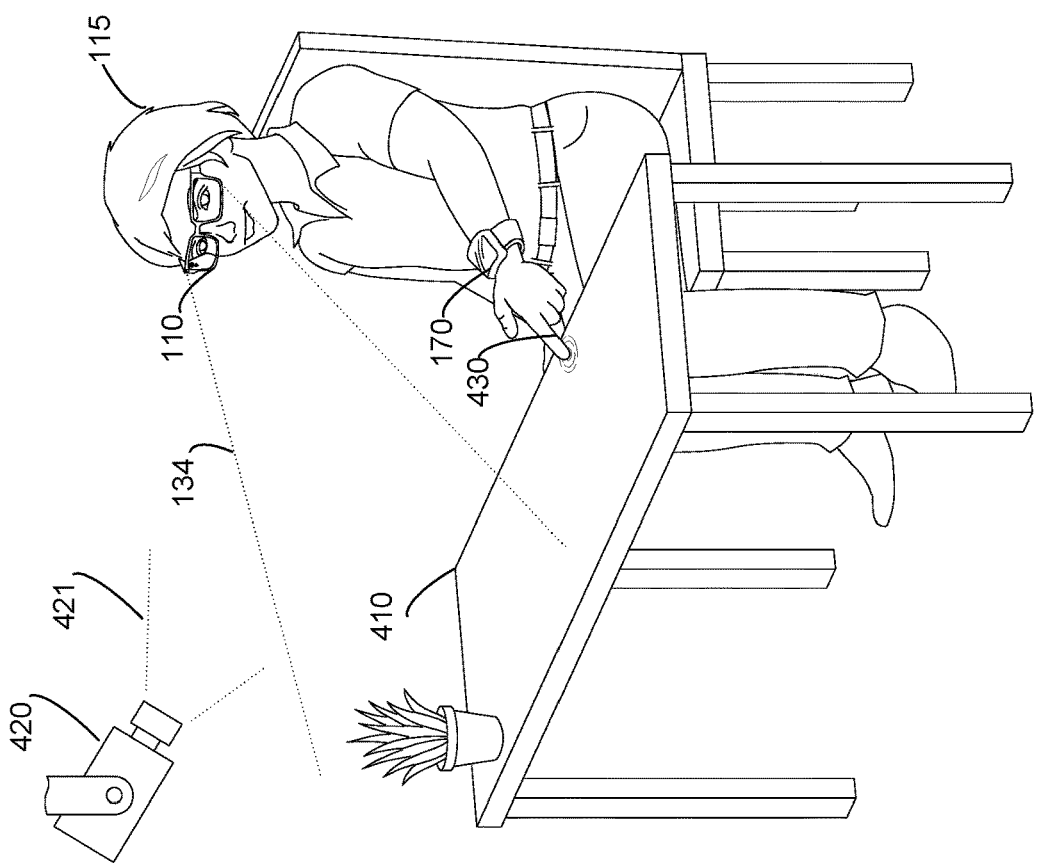

FIG. 4E illustrates the user 115 performing a surface-contact camera-control gesture intended to switch to a second coupled imaging device, that is detected by the wrist-wearable device 170. In some embodiments, the camera-control gesture is associated with instructions to cause an imaging device 111 to switch between different cameras (e.g., a second imaging device 420, such as a security camera; a secondary camera embedded in a head-wearable device; a wrist-wearable camera, etc.) coupled to the head-wearable device, wrist-wearable device 170, or other intermediary device.

In some embodiments, the camera-control gesture intended to switch between devices is based on a characteristic of the hand gesture. In some embodiments, in accordance with a determination that one or more characteristics of the hand gesture are within a first threshold, the wrist-wearable device 170 causes a first camera to capture the camera data for presentation at the display of the head-wearable device that is worn by the user; and in accordance with a determination that the one or more characteristics of the hand gesture are within a second threshold, the wrist-wearable device 170 causing a second camera to capture the camera data for presentation at the display of the head-wearable device that is worn by the user. In some embodiments, the method 700 includes determining, based at least on the received data from the one or more sensors, one or more characteristics of the hand gesture and performing a different action (e.g., camera-control gesture) based on the characteristics of the performed hand gestures. In some embodiments, the one or more characteristics of the in-air hand gesture include one or more of a force, a duration, a number of contacts, and a pattern (e.g., sequence of taps).

In some embodiments, in accordance with a determination, by the wrist-wearable device 170 that the sensor data indicates that the surface-contact gesture is a camera-control gesture for switching to an alternate camera source to display different camera data, the wrist-wearable device 170 provides one or more commands or instructions associated with the camera-control gesture to another device including or communicatively coupled with an imaging device 111, such as the head-wearable device 110. The commands or instructions associated with the camera-control gesture cause the second imaging device 420 of the other device to capture camera data. For example, when the user 115 presses phalange 430 onto a surface with additional force (e.g., press harder), the surface-contact gesture is detected by the wrist-wearable device 170, the head-wearable device 110 is caused to display camera data from the imaging device 420 (as shown by preview 260). More specifically, the camera-control gesture demonstrated in FIG. 4E is the user 115's pointer finger (e.g., phalange 430) pressing harder on a surface 410 which ultimately results in the preview of the camera data from the second imaging device 420 (e.g., the preview 260 now shows the user 115 which is in the field of view 421 of a second imaging device 420). The user can switch to any number of imaging devices coupled to the head-word device, wrist-wearable device 170, smartphone or any other intermediary device. The head-wearable device can also display multiple representations of multiple different camera's (e.g., could have one or more security cameras and see each of them displayed in the display of the head-wearable device, or rotate through them to see one image representation at a time.) The user 115 can also combine a combination of in-air hand gestures and surface-contact gestures to control the cameras.

The above examples are non-limiting; the user 115 could perform a press and hold gesture 435 with other phalanges and is not only limited to the pointer finger (phalange 150) (e.g., could also be a thumb (phalange 140), middle finger, ring finger, pinky, two other fingers, etc.). Similarly, the different characteristics of a hand gesture (e.g., force, duration, number of contacts, etc.) can apply to surface-contact gestures, in-air contact gestures, and/or any other gestures detectable by the wrist-wearable device 170.

FIG. 4F illustrates the field of view 421 of the user 115 in FIG. 4E. More specifically, FIG. 4F shows the user 115's view after the camera-control gesture (e.g., the press and hold surface-contact gesture 435) is detected by the wrist-wearable device 170. The wrist-wearable device 170, in response to determining that the surface-contact gesture is a camera-control gesture for switching to an alternate camera, causes the head-wearable device 110 to display the camera data from the second imaging device 420. In some embodiments, the camera-control gesture for switching to a separate camera also causes the head-wearable device 110 to present a representation of the camera data (e.g., preview 260). In some embodiments, the representation of the camera data from 420 is displayed over a portion of the user 115's field of view 134 as described above in reference to FIGS. 1A-1F.

Figure 4H:
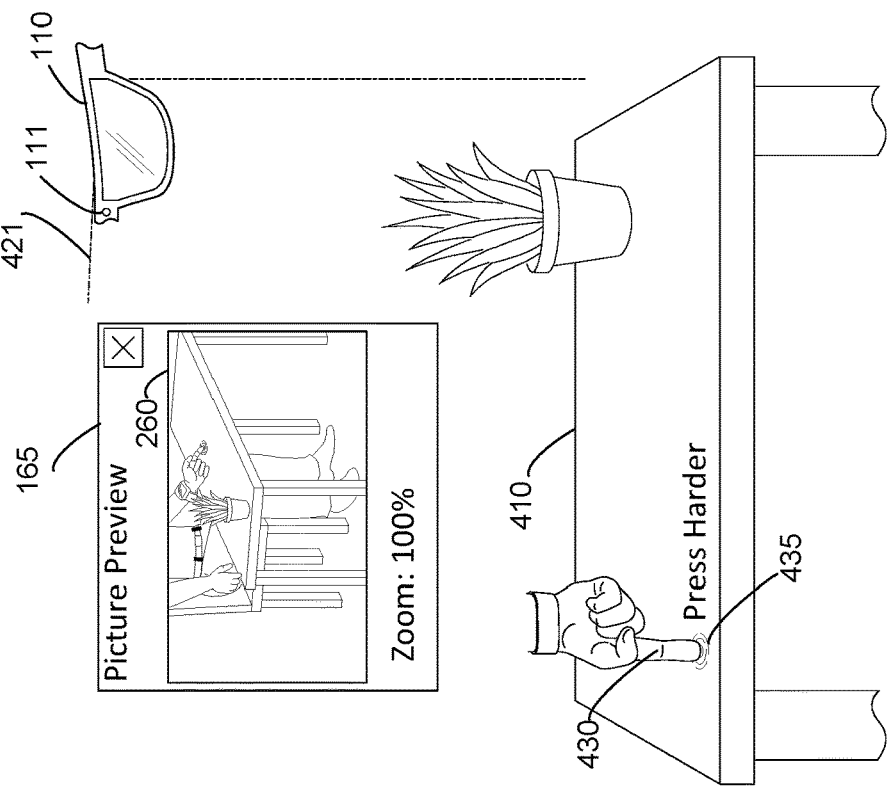
Figure 4G:
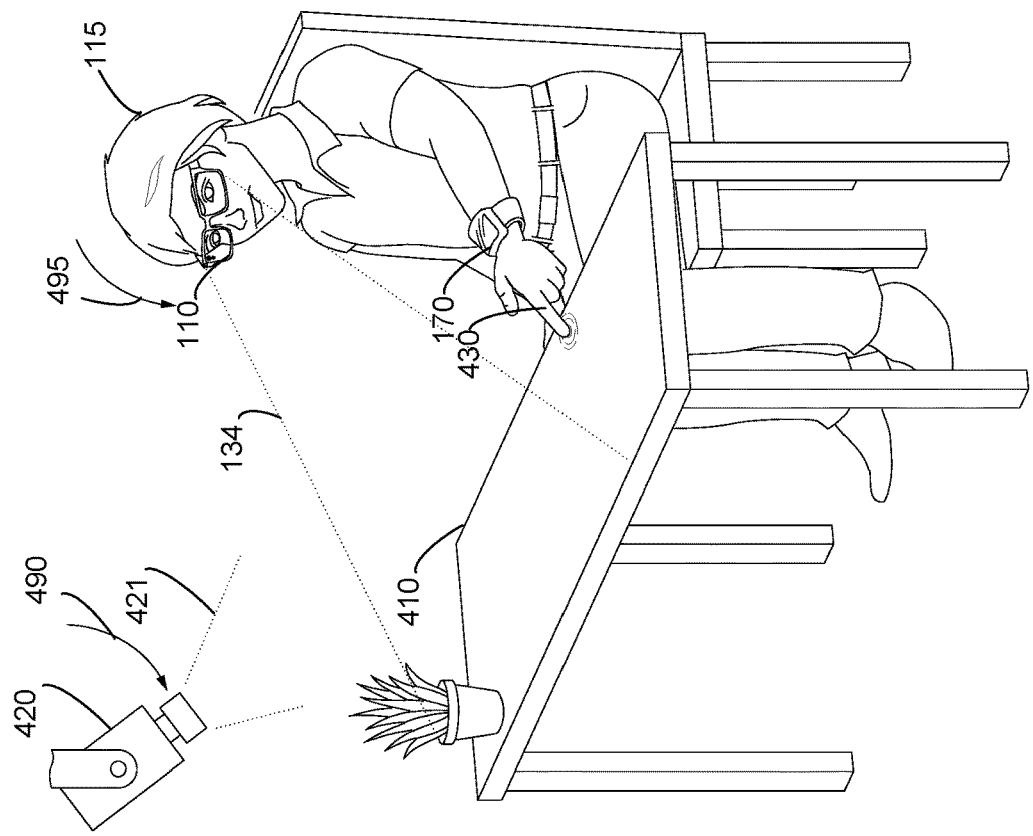

FIG. 4G illustrates adjustments to the camera data from an imaging device 420 while the user 115 performs and maintains a surface-contact gesture. In particular, while the user 115 performs the press and hold gesture 435 with a greater among of force (e.g., the camera control-gesture for displaying a preview of a representation of camera data from an imaging device 420), the camera data captured by the second imaging device 420 of a second camera updates in accordance with changes to the user 115's movements. For example, while the user 115 performs and maintains the press and hold gesture 435 with greater force, the second imaging device 420 captured camera data reflecting changes in the user 115's head movement (e.g., moving side-to-side up and down, etc.). Alternatively or in addition, in some embodiments, while the user 115 performs and maintains the press and hold gesture 435, movement of the user 115's wrist can be interpreted to cause changes in the field of view 421 of the camera (e.g., panning the camera side-to-side, up and down, etc.).

FIG. 4H illustrates a field of view 421 of the user 115 in FIG. 4G. In particular, in accordance with a determination the press and hold gesture 435 is performed and maintained, the preview 260 presented via a display 130 of the head-wearable device is updated to show a representation of the camera data reflective of the second imaging device's 420 field of view 421 as they move their head. For example, as the user 115 moves their head down, the preview 260 is updated to show the second imaging device's 420 field of view 421 (e.g., the bottom of the user 115 as opposed to the top). The changes to the preview 260 are presented to the user while the press and hold gesture 435 is performed and maintained. In this way, the user 115 has a visual representation of the camera data that is being captured or about to be captured by the imaging device 420 which is displayed the head-wearable device 110.

Figure 4J:
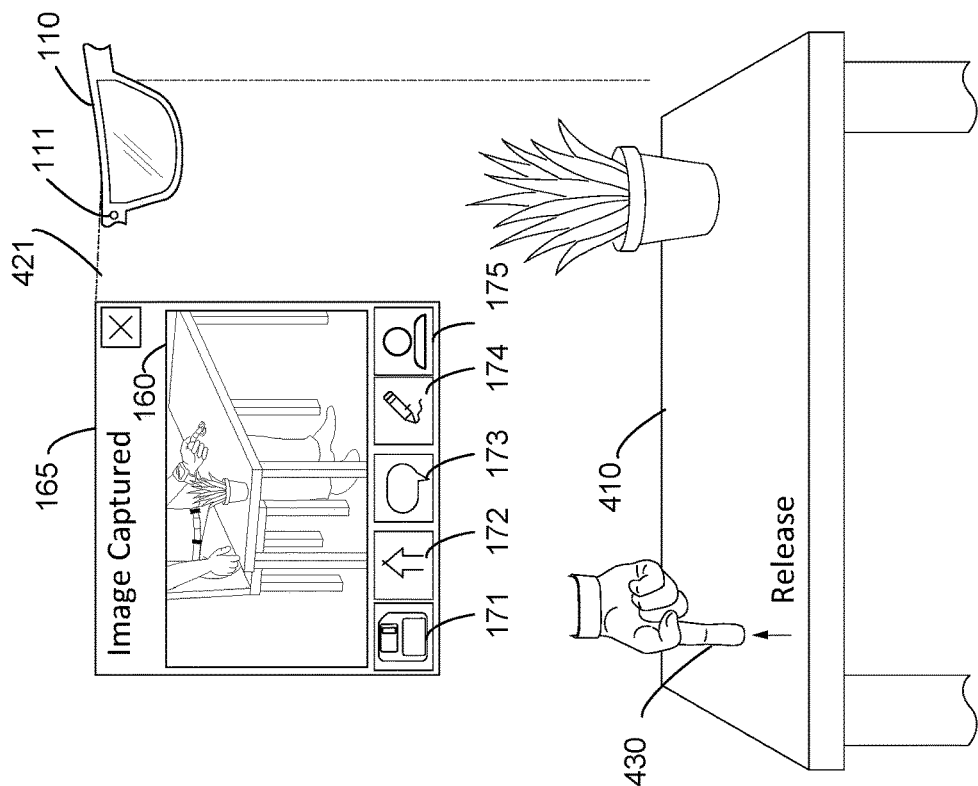
Figure 4I:
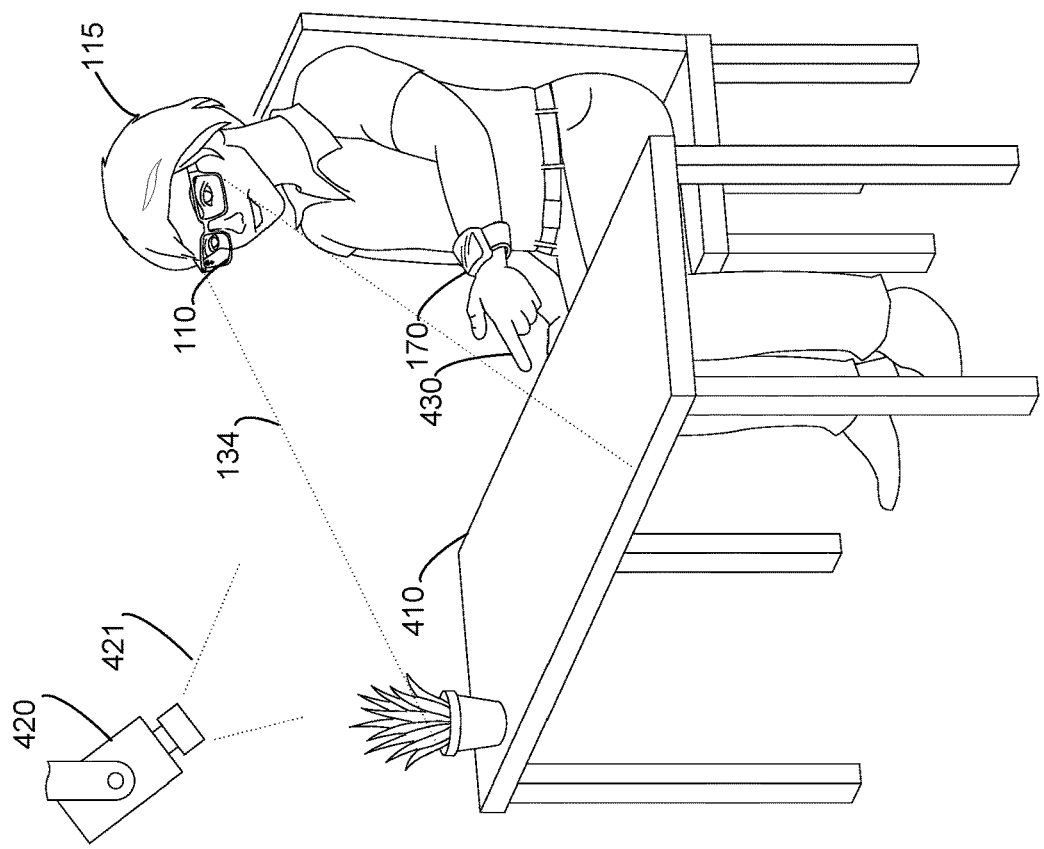

FIG. 4I illustrates the user 115 no longer performing and maintaining a surface-contact gesture (e.g., releasing the surface-contact gesture). Releasing a surface-contact gesture can include moving a phalange from a surface that was held still for a predetermined period of time; separating at least two phalanges that were contacting a surface such that they are no longer in contact with the surface; moving a phalange or phalanges contacting a surface such that the phalange or phalanges are no longer contacting the surface; and/or removing (e.g., no longer applying) a predetermined threshold pressure between at least one phalange and a surface. The wrist-wearable device 170 determines that the user 115 releases the surface-contact gesture (e.g., press and hold gesture) based on sensor data obtained by the one or more sensors 1121. In some embodiments, when the user 115 releases the hand gesture, the camera control-gesture associated with the surface-contact gesture is completed or a follow-on action is performed. For example, releasing the press and hold gesture can cause the head-wearable device to capture camera data, via an imaging device of the head-wearable device, of the user 115's field of view when the press and hold gesture 251 is released. In some embodiments, a representation of the captured image data is presented to the user 115 via the display 130 of the head-wearable device 110.

FIG. 4J illustrates a field of view 134 of the user 115 in FIG. 4I. Specifically, the head-wearable device 110 presents, via display 130, a field of view of the user 115 when the press and hold gesture is released. As described above, in some embodiments, when the press and hold gesture is released, the imaging device 111 of the head-wearable device captures camera data of the user 115's field of view. Further, in some embodiments, when the press and hold gesture is released, a representation of the captured camera data is presented to the user 115.

Although the above-examples reference surface-contact gestures, difference in-air gestures and/or other gestures that do not contact a wrist-wearable device 170 are also contemplated for performing the different operations described in reference to FIGS. 4A-4J.

Figure 5A:
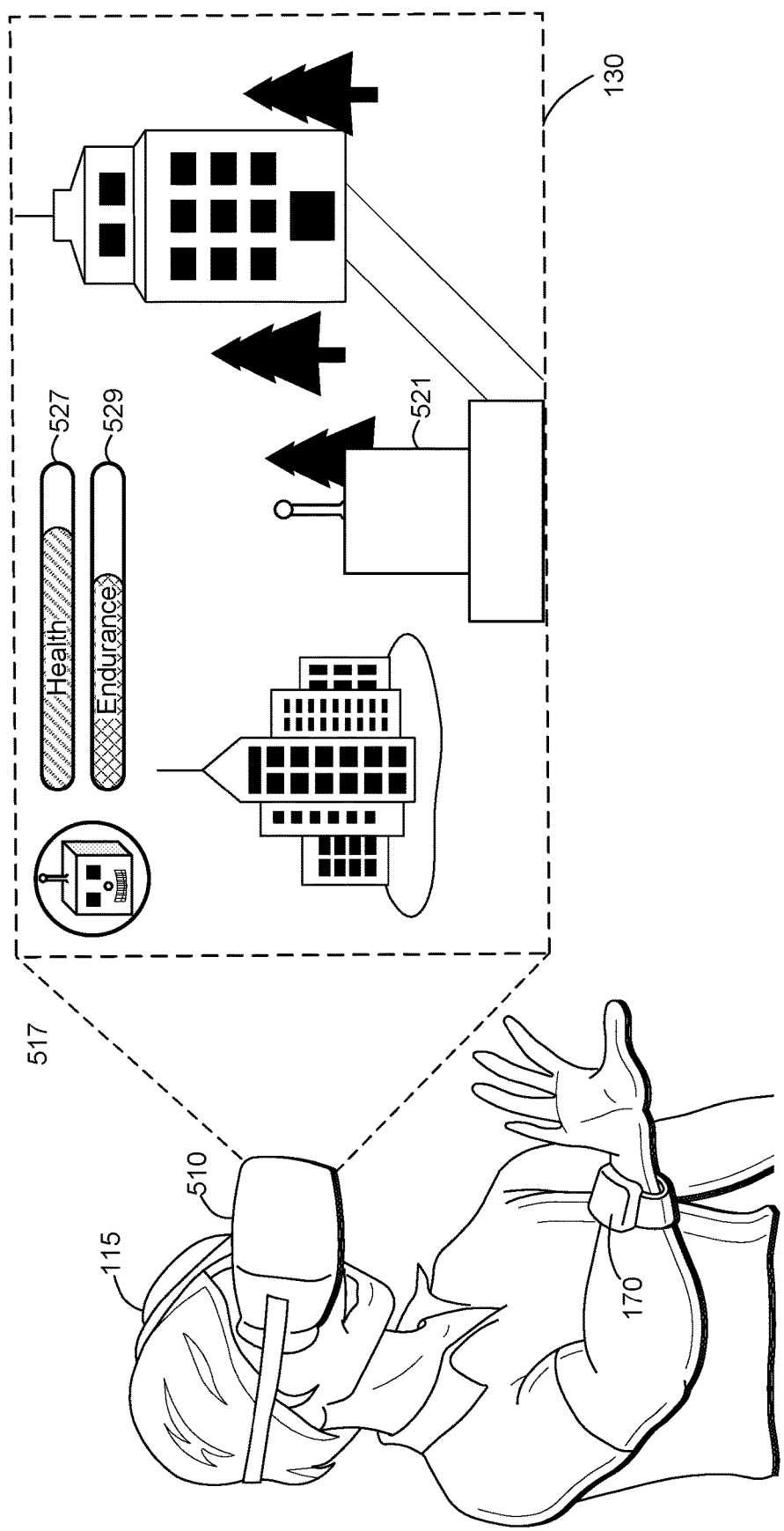
Figure 5B:
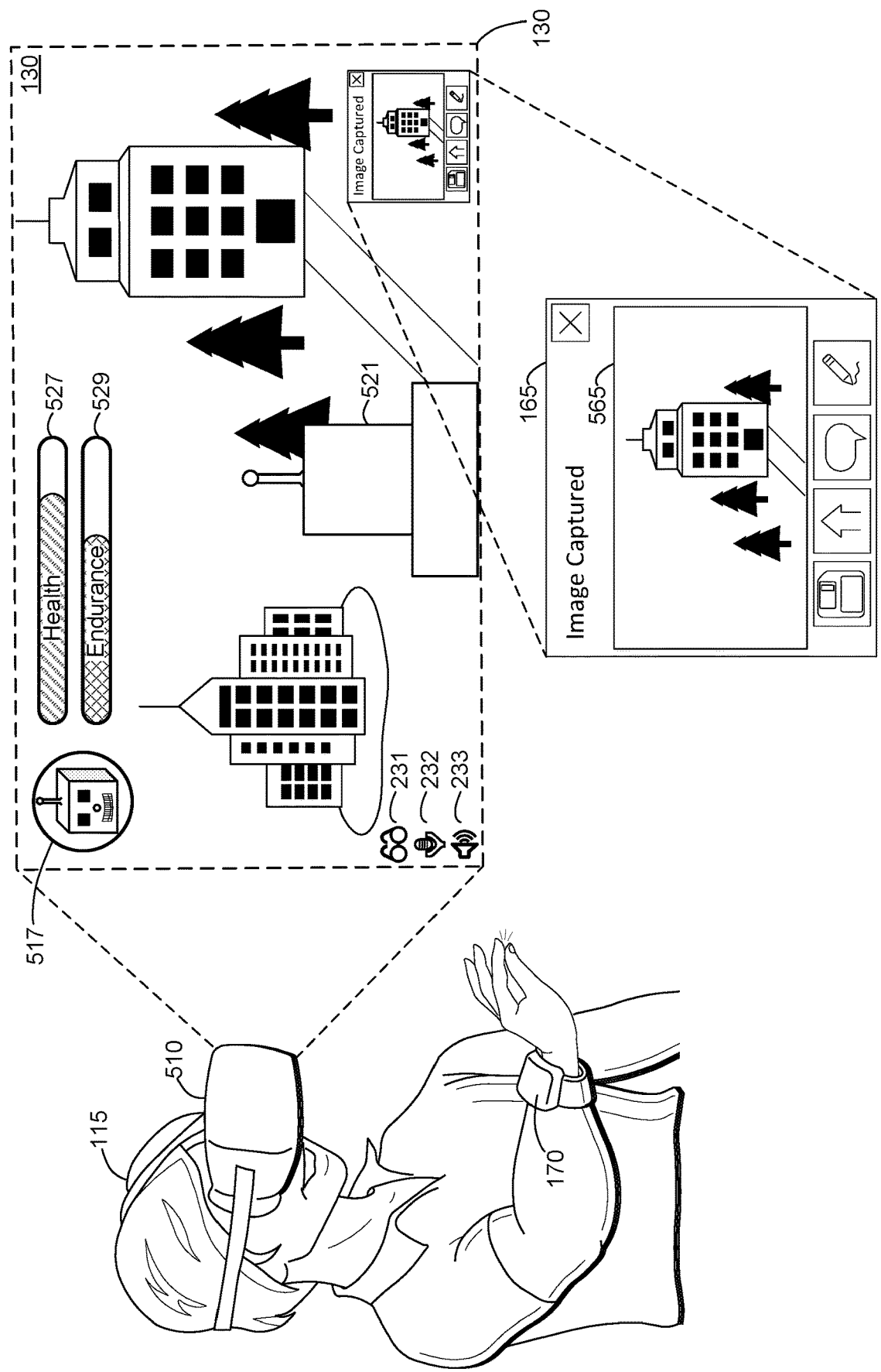
Figure 5C:
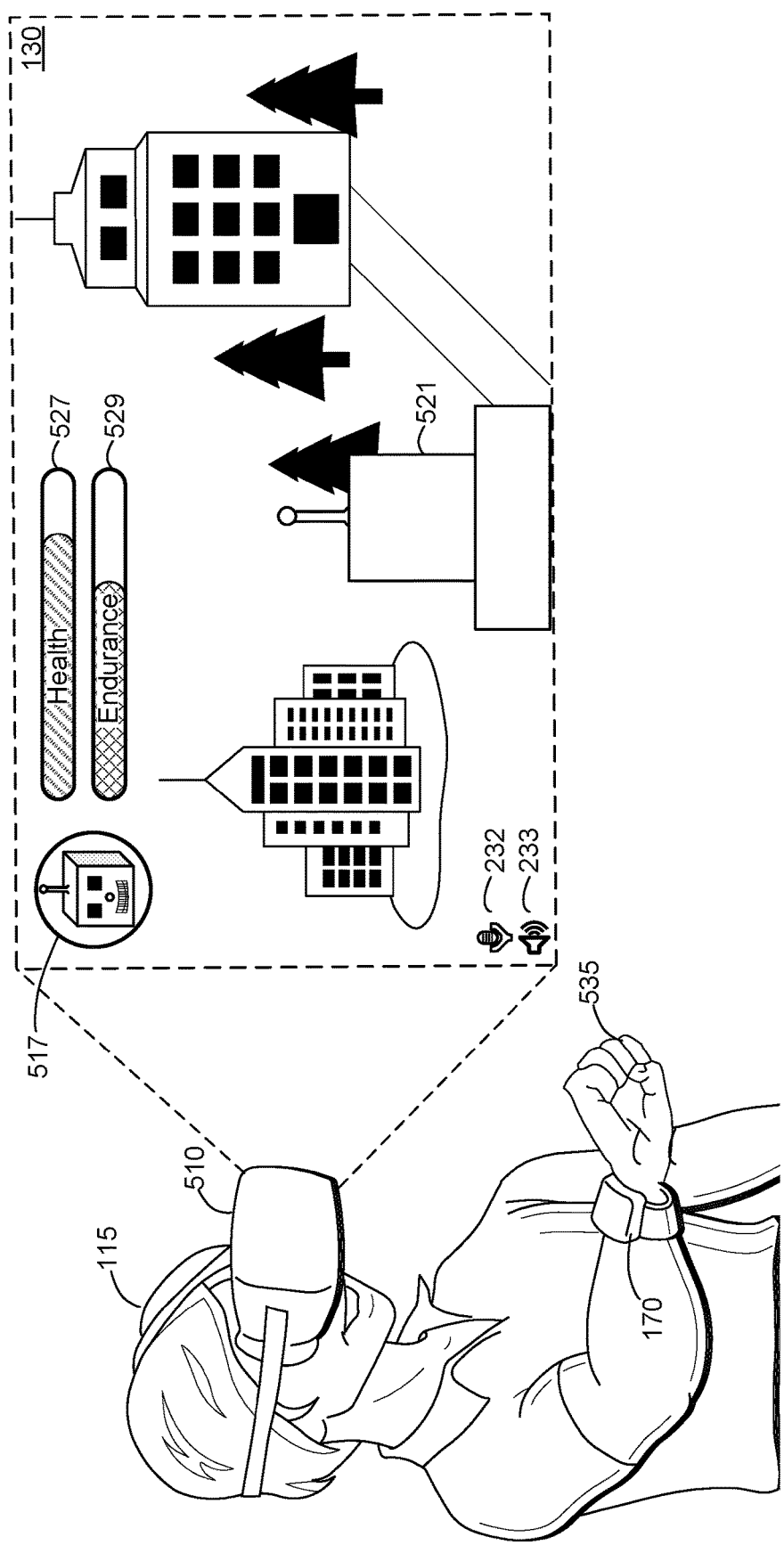

FIGS. 5A-5C illustrate coordination of a wrist-wearable device 170 and a head-wearable device 510 to cause presentation of camera data in an AR environment, in accordance with some embodiments. In particular, using gestures detected at a wrist-wearable device 170 to cause presentation of a representation of virtual environment presented by a head-wearable device 510. In some embodiments, the wrist-wearable device 170 is communicatively coupled with the head-wearable device 510 (e.g., by way of a Bluetooth connection between the two devices, and/or the two devices can also both be connected to an intermediary device such as a smartphone that provides instructions and data to and between the two devices).

As described above in reference to FIGS. 1A-4J, while the user 115 wears the wrist-wearable device 170, sensor data is monitored to sense a hand gesture performed by user 115. The sensor data is used detect and determine a hand gesture performed by the user 115. In FIG. 5A, the head-wearable device 510 presents, via its display 130, a virtual environment seen by the user 115 (e.g., the user 115's character 521, avatar 517, health bar 527, and endurance bar 529). The wrist-wearable device 170 and the head-wearable device 510 are configured to perform one or more operations described above in reference to FIGS. 1A-4J.

In FIG. 5B, the user 115 performs a camera-control gesture that is detected by the wrist-wearable device 170. In accordance with a determination, by the wrist-wearable device 170 that the sensor data indicates that the hand gesture is a camera-control gesture for capturing camera data, the wrist-wearable device 170 causes the head-wearable device 510 to capture a captured image 565 of the virtual environment as seen by the user 115's character 521. As described above in reference to FIGS. 1A-1F, the captured image 160 can be presented to the user via the display of the head-wearable device 510. The captured image 565 can be included in a user interface 165 that includes one or more affordances for sharing, editing, and saving the captured image. In some embodiments, the head-wearable device 510 presents to the user 115 one or more indications that notify the user 115 that the head-wearable device 510 is capturing imaging data (e.g., glasses icon 231), capturing audio (e.g., mic icon 232), and/or the presenting audio data (e.g., speaker icon 233).

FIG. 5C illustrates an example gesture performed by the user 115 that is not recognized as a camera-control gesture. In some embodiment, the wrist-wearable device receives, from one or more sensors 1121 (FIG. 11), additional data generated based on performance of a hand gesture by the user, and determines, based on the additional data, that the hand gesture is not a camera-control gesture. The wrist-wearable device 170, in accordance with the determination that the hand gesture is not a camera-control gesture, forgoes causing presentation of camera data via the display of the head-wearable device 510 and activates another (non-camera related) operation of the head-wearable device 510. For example, in FIG. 5C, the hand gesture 535 causes a microphone of the head-wearable device to activate (as indicated by the mic icon 232). In addition or alternatively, in some embodiments, the non-camera-control gesture activates the microphone to allowing the user to provide a voice command to a digital assistant. In some embodiments, the non-camera related operation remains active as long as the additional data indicates that the hand gesture 535 is maintained. For example, as long as the user 115 maintains the hand gesture 535, the microphone of the head-wearable device 510 remains active. When the additional data indicates that the hand gesture 535 is no longer maintained (e.g., released), the non-camera related operation is terminated or deactivated. For example, when the user 115 no longer maintains the hand gesture 535, the microphone of the head-wearable device 510 is deactivated. The above example is non-limiting; additional non-camera related operations can be performed, such as opening and closing one or more applications, initiating an audio call, and/or other device and application specific controls.

Figure 6A:
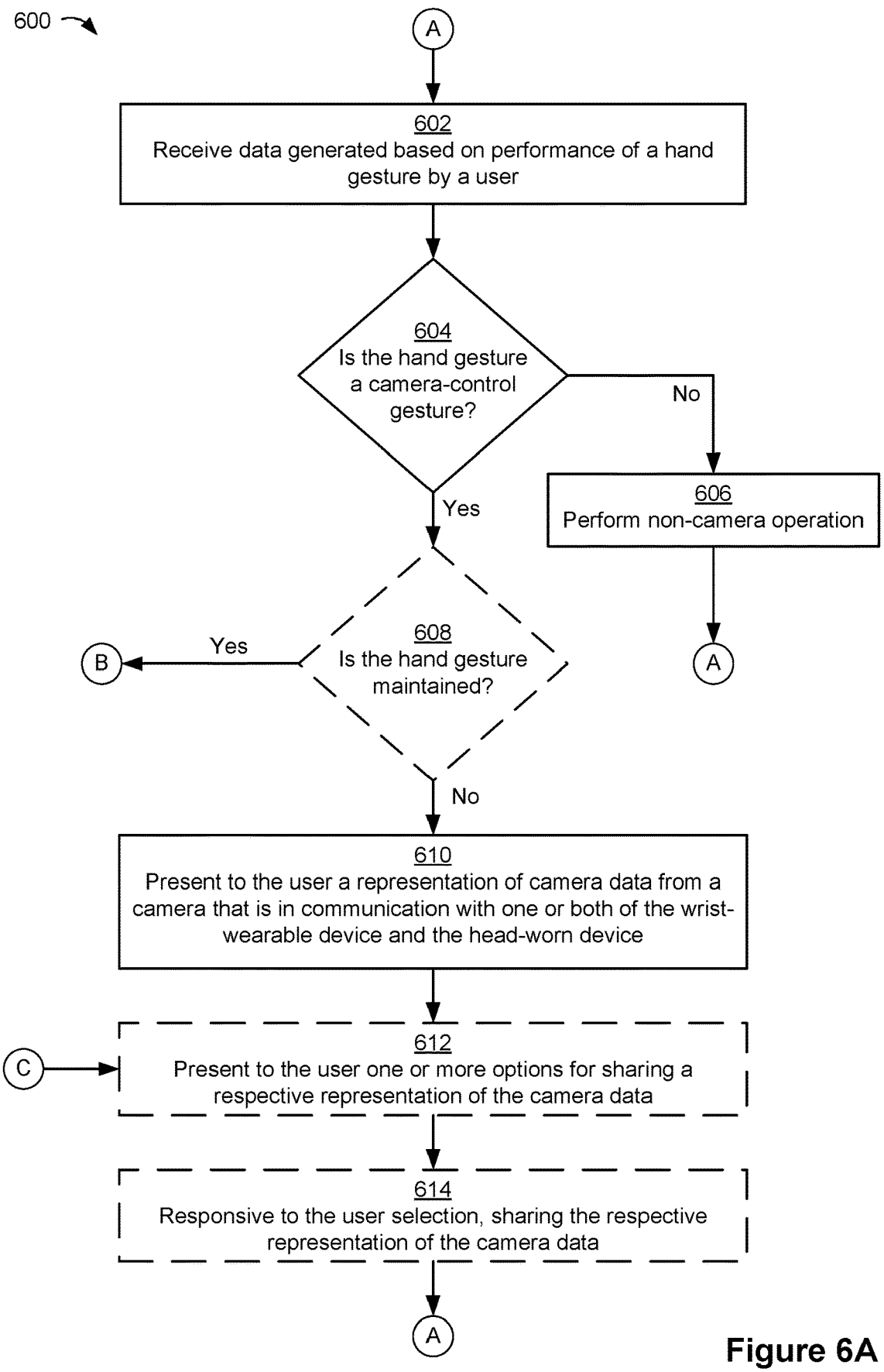
Figure 6B:
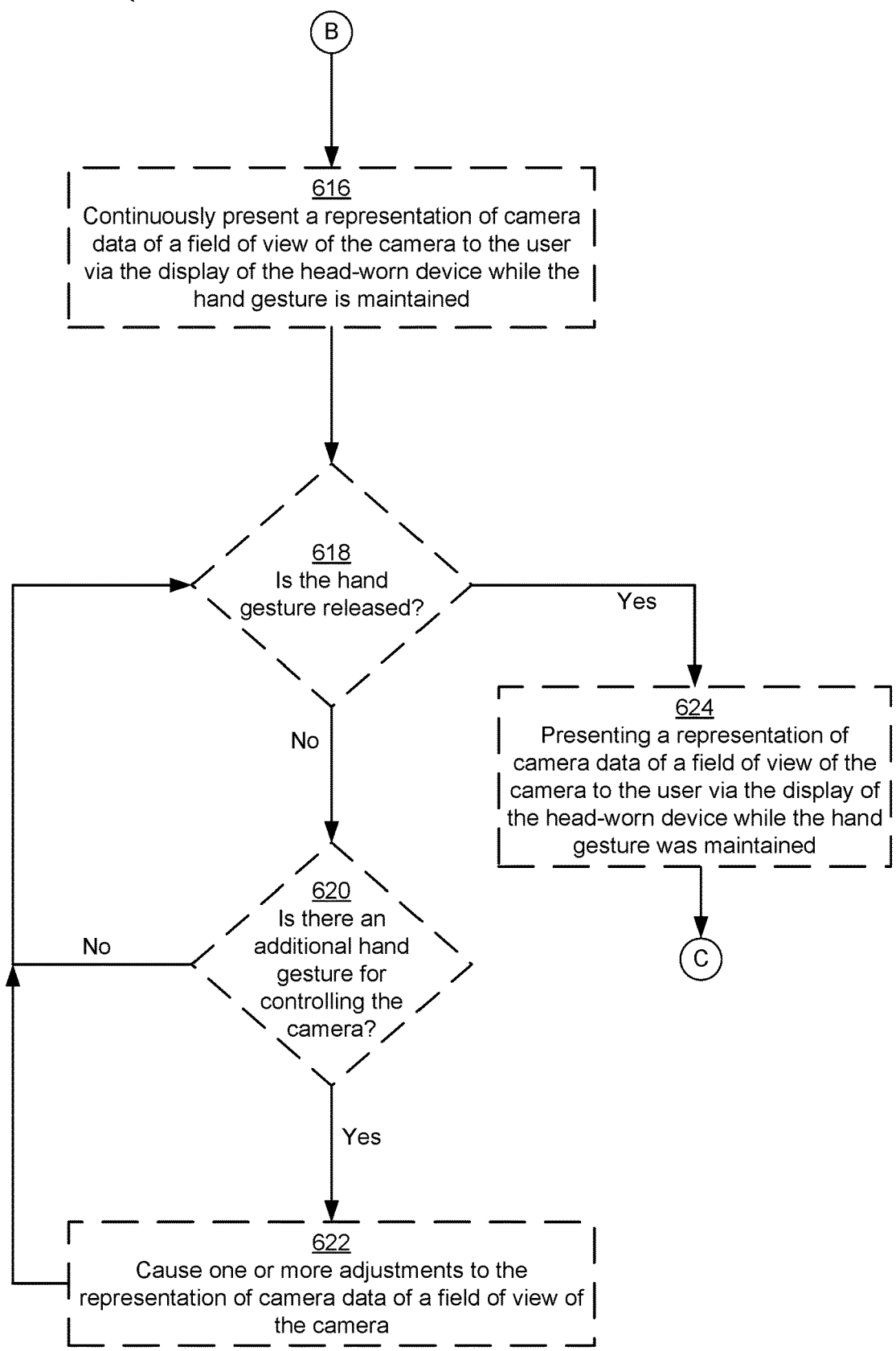

FIGS. 6A-6B illustrates a flow diagram of a method for detecting an in-air hand gesture and determining if the in-air hand gesture is a camera-control gesture, according to some embodiments. Operations (e.g., steps) of the method 600 can be performed by one or more processors (e.g., central processing unit and/or MCU; processors 1150, FIG. 11) of a wrist-wearable device 170. In some embodiments, the wrist-wearable device 170 is coupled with one or more sensors (e.g., various sensors discussed in reference to FIG. 11, such as a heart rate sensor, IMU, a neuromuscular-signal sensors (e.g., EMG sensors or other sensors), SpO2 sensor, altimeter, thermal sensor or thermal couple, ambient light sensor, ambient noise sensor), a display, a speaker, an image sensor (e.g., imaging device; FIGS. 2A-2I), and a microphone to perform the one or more operations. At least some of the operations shown in FIGS. 6A and 6B correspond to instructions stored in a computer memory or computer-readable storage medium (e.g., storage, ram, and/or memory, FIG. 11). Operations of the method 600 can be performed by the wrist-wearable device 170 alone or in conjunction with one or more processors and/or hardware components of another device communicatively coupled to the wrist-wearable device 170 (e.g., a head-wearable device 110, a smartphone, a laptop, a tablet, etc.) and/or instructions stored in memory or computer-readable medium of the other device communicatively coupled to the wrist-wearable device 170.

The method 600 includes receiving (602) data generated based on performance of a hand gesture by a user. For example, in some embodiments the hand gesture by the user 115 can be a pinch action where two of the user's phalanges including but not limited to the user's thumb (phalange 140) and pointer finger (phalange 150) squeeze together in a pinching action. Another example of a hand gesture is where the user presses their thumb (phalange 140) and pointer finger (phalange 150) together maintaining the pinch motion for a period of time before releasing. For these gestures, the user 115 can use any phalange or even other parts of the body. For example, in some embodiments the user 115 can use their pointer finger (phalange 150) to press on a surface 410 such as a table for a short or longer period of time to make the hand gesture. Example gestures are shown and described above in reference to FIGS. 1A-5C The method 600 further determining (604) whether the hand gesture performed by the user 115 is a camera-control gesture. A camera-control gesture can be assigned to a hand gesture by the user or automatically assigned by a user device. An example of a camera-control gesture is described in FIG. 2A, where the user 115 performs an in-air hand gesture by performing a pinch and hold gesture 251 which controls the camera by providing the user with a picture preview displayed on the head-wearable device 110. However, if the user is not performing a camera-controlling hand gesture ("No" at operation 604), then the method 600 includes performing (606) a non-camera operation. Examples of a non-camera operation are turning on the microphone on a device (e.g., the wrist-wearable device 170, head-wearable device, smartphone, etc.) to allow the user to provide an audio input as shown in FIGS. 5A-5C.

In accordance with a determination that the user is performing a camera-control gesture ("Yes" at operation 604), the method further includes determining (608) whether the hand gesture is maintained. As described above in reference to FIGS. 2A-3J, a hand gesture is maintained if it is held still for a predetermined period of time, a force is applied for a predetermined period of time, at least two phalanges or at least a phalange and a surface are in contact for a period of time. Alternatively, as shown in FIGS. 1A-1F, a hand gesture is not maintained when it is released immediately (e.g., less than a second) after being performed.

In accordance with a determination (608) that the hand gesture is not maintained ("No" at operation 608), the method 600 includes causing (610) presentation of a representation of camera data from a camera to a user via a display that is in communication with one or both of the wrist-wearable device 170 and the head-wearable device. In some embodiments, the representation of camera data is an image. In some embodiments, the method 600 further includes causing (612) the presentation one or more options for sharing a respective representation of the camera data to the user. Additional options can include saving the image, sending the image to a contact via a messaging application, editing the image in an application or directly through the presenting interface, or sharing it with a contact directly. Additional examples of the options (also referred to as "affordances") are provided above in reference to FIGS. 3A-3J. In some embodiments, repulsive to the user selection, the method 600 includes sharing (614) the respective representation of the camera data. For example, in some embodiments, if the user 115 selects sharing the image via a messaging application (e.g., selection of messaging affordance 173), then a messaging application will open on the heads-up display, wrist-wearable device 170, smart phone, or other intermediary device, which allows the user 115 to select a contact to send the image to. After the respective representation of the camera data is shared, the method 600 returns to operation 602 and waits to receive additional data generated by the performance of a hand gesture by the user.

Returning to operation 608, in accordance with a determination that the hand gesture is maintained ("Yes" at operation 608), the method 600 includes continuously causing (616) presentation of a representation of camera data of a field of view of the camera to the user via the display of the head-wearable device (while the hand gesture is maintained). In some embodiments, as long the camera controlling hand gesture is maintained (e.g., holding the pinch motion for some period of time), the presentation of camera data acts as a live feed and will display whatever the camera that is coupled to the wrist-wearable device 170 and/or head-wearable device is seeing. For example, if the active camera is integrated with the head-wearable device, then as the user moves around or as the user moves their head up or down the picture preview will continue to update immediately to where the camera is pointed or moved. For example, FIG. 2D illustrates the new preview 260 as a result of the user's head movement. For example, as shown in FIG. 2D the user 115 moved their head down so the preview 260 now shows the bottom of the object as opposed to the top. In other embodiments, the user could be looking in an alternate location and have moved their head or wrist in any desired direction by the user 115 and the picture preview would update immediately.

In some embodiments, the method 600 further includes determining (618) whether the hand gesture is released. In accordance with a determination that the hand gesture is released ("Yes" at operation 618), the method includes causing (624) the presentation of a representation of camera data of a field of view of the camera to the user via the display of the head-wearable device while the hand gesture was maintained. In other words, an image of the representation of the camera data was capture at the moment that the user releases the hand gesture. As illustrated in FIG. 2F, once the user releases the gesture, an image is captured (e.g., captured image 160) and presented to the user via a display 130 of a head-wearable device 110. The method 600 further proceeds to perform at least operations 612 and 614.

Returning to operation 618, in accordance with a determination that the hand gesture is not released ("No" at operation 618), the method 600 includes determining (620) whether an additional hand gesture for controlling the camera is detected. In accordance with a determination that an additional hand gesture for controlling the camera is detected ("Yes" at operation 620), the method 600 includes causing (622) one or more adjustments to the representation of the camera data of a field of view of the camera. For example, as described above in reference to FIGS. 3A-3J, while the user 115 maintains a pinch gesture (e.g., with their pointer finger (phalange 150) and thumb (phalange 140)), if the user rotates their wrist 382, an additional camera-control gesture is detected, which causes the representation of the camera data to zoom-in or zoom-out. After one or more adjustments to the representation of the camera data of a field of view of the camera have been performed, the method 600 returns to operation 618. Returning to operation 620, in accordance with a determination that an additional hand gesture for controlling the camera is not detected ("No" at operation 620), the method 600 returns to operation 618.

Figure 7B:
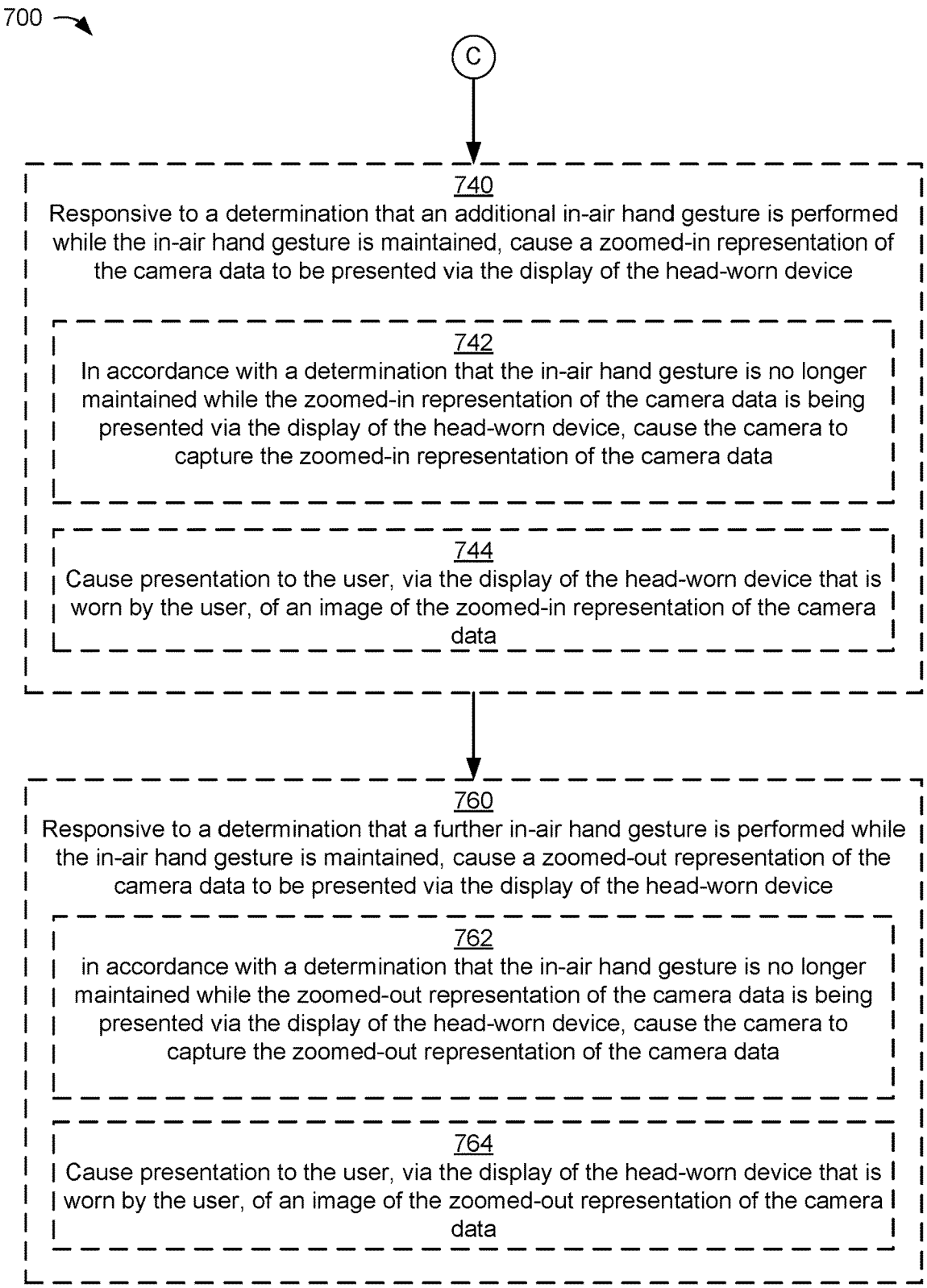

FIGS. 7A and 7B illustrates a detailed flow diagram of a method of using a gesture detected based on data from a wrist-wearable device 170 to cause presentation of camera data at a head-wearable device, according to some embodiments. Similar to method 600 of FIGS. 6A and 6B, operations of the method 700 can be performed by one or more processors of a wrist-wearable device 170. At least some of the operations shown in FIGS. 7A and 7B correspond to instructions stored in a computer memory or computer-readable storage medium. Operations of the method 700 can be performed by the wrist-wearable device 170 alone or in conjunction with one or more processors and/or hardware components of another device (e.g., a head-wearable device 110 and/or an intermediary device described below in reference to FIG. 11) communicatively coupled to the wrist-wearable device 170 and/or instructions stored in memory or computer-readable medium of the other device communicatively coupled to the wrist-wearable device 170.

Method 700 includes receiving (710) data generated based on performance of an in-air hand gesture by a user that is wearing a wrist-wearable device. The wrist-wearable device can include one or more sensors for detecting the data generated based on performance of an in-air hand gesture. The data can be neuromuscular signal and/or IMU data. In some embodiments, the data can also be data from a camera that is able to see the user's hand to use computer vision to detect gestures. One or all of the sensors of the wrist-wearable device 170 can be utilized to receive data on the performance of an in-air hand gesture.

In some embodiments, "in-air" means, in some embodiments, that the user's hand does not contact a portion of the device. In other words the gesture is performed in open air in 3D space and without contacting the wrist-wearable device 170. The in-air gestures are performed without a glove, without contacting a glove surface, or without the wrist-wearable device 170 being coupled to a glove. In some embodiments, the in-air hand gesture can include a single contact between a distal phalange (distal, proximal, middle) phalange portion of the user's thumb (phalange 140) and a distal phalange portion of the user's index finger, which causes selection of a first camera (e.g., a camera of the head-wearable device), or the in-air hand gesture includes two or more contacts between a distal phalange portion of the user's thumb (phalange 140) and a distal phalange portion of the user's index finger, which can cause selection of a second camera distinct from the first camera (e.g., a security camera located near (e.g., within a distance that allows for short-range communication) the wrist-wearable device 170). Such in-air finger-contact gestures are non-limiting examples of the in-air gestures contemplated herein, other examples include gestures in which two fingers (and phalange portions thereof) are moved to make contact with a thumb (phalange 140) (and a phalange portion thereof), multi-step gestures in which a first digit can make contact with a thumb and remain in contact and then another digit can make contact with the first digit while the first digit remains in contact with the thumb. Rotational in-air hand gestures are also contemplated, in which a user can rotate their wrist in various directions.

Surface-contact gestures (contacts at surfaces other than the wrist-wearable device 170) more generally are also contemplated in which neuromuscular signals (or other types of data from other sensors, such as proximity sensors, time-of-flight sensors, sensors of an IMU, etc.) can be used to detect a contact (or an intention to contact) a surface (e.g., a single or double finger tap on a table, on a user's leg, a couch, etc.). Thus, while the primary example herein is an in-air gesture, the disclosure is not limited to those in-air gestures, as other gestures that do not contact a wrist-wearable device 170 are also contemplated, including the surface-contact gestures just described. In some embodiments, the one or more sensors of the wrist-wearable device 170 detect data generated by one handed gestures performed by the user (e.g., detected from the hand wearing the wrist-wearable device 170). Examples of the different gestures are described above in reference to FIGS. 1A-5B.

The method 700 includes, in accordance with a determination (720) that the data indicates that the in-air hand gesture is a camera-control gesture, causing (722) presentation to the user, via a display of a head-wearable device that is worn by the user and that is in communication with the wrist-wearable device 170, of a representation of camera data from a camera that is in communication with one or both of the wrist-wearable device 170 and the head-wearable device 110. For example, the wrist-wearable device 170 can send an instruction to the head-wearable device to cause the display of the head-wearable device to begin presenting the representation of the camera data. Alternatively or in addition, an intermediary device (that receives the data generated based on performance of an in-air hand from the wrist-wearable device) can send the instruction, or the head-wearable device can receive the data generated based on performance of an in-air hand gesture, process the data generated based on performance of the in-air hand gesture, and then make the determination that a camera-control gesture performed to then cause its display to begin presenting the representation of the camera data. In some embodiments, the display of the head-wearable device is a heads-up display integrated with one or more lenses of the head-wearable device. In some embodiments, the head-wearable device is caused to present the representation of camera data directly and immediately in response to the in-air gesture, which means that no other input is received from the user to trigger the presentation of the representation of camera data. Examples of the representation of the camera data displayed by a head-wearable device are provided above in reference to FIGS. 1A-5C.

Non-limiting examples of the camera-control gestures include a double pinch gesture performed when at least two phalanges of a user's hand make contact with one another, at least two phalanges of a user's hand contacting one another in succession, at least two phalanges of a user's hand making contact with one another and remaining in contact, wrist rotations, wrist movements, and other hand movements.

In some embodiments, the camera-control gesture causes capturing of an image using the camera, and the causing presentation to the user includes causing presentation, via the display of the head-wearable device, of the image captured by the camera. In some embodiments, the image is one of a plurality of images, each respective image caused to be captured in accordance with the determination that the data indicates that the in-air hand gesture is the camera-control gesture, and the causing presentation to the user includes causing presentation of respective representations of each respective image of the plurality of images. The presentation of the image can occur at a display of the head-wearable device or at a display of the wrist-wearable device 170. The device selected to present the image can be based on whether or not the user is determined to be looking at the wrist-wearable device 170 or not (e.g., if the user is determined to be looking at the wrist-wearable device 170, then the presentation can occur at the display of that device; if not, then the display of the head-wearable device can be used).

In some embodiments, after the image is captured, the method 700 includes causing presentation of one or more options for sharing the image; and responsive to a user selection of a first option of the one or more options for sharing the image, causing the image to be sent to another electronic device. In some embodiments, the method 700 further includes responsive to a user selection of a second option, distinct from the first option, of the one or more options for sharing the image with a specific contact, causing the image to be send to an electronic device associated with the specific contact. In some embodiments, a messaging application can be used to facilitate sharing of the image, which can include sending the image, using the messaging application, directly to a particular contact. The application can be an application that is executing on one or both of the wrist-wearable device 170 and the head-wearable device.

Presentation of options for sharing the image is one example but is a non-limiting example. In some embodiments, the user is able to perform other in-air hand gestures to allow for quick sharing of captured images without the need to display the one or more options (in other embodiments, both in-air hand gestures and presented options can be utilized to share captured images). As one specific example, the user can contact a particular phalange portion of their middle finger to share with different contacts, e.g., if a distal phalange portion is contacted (e.g., using a user's thumb), then the image is shared with a first contact, if a middle phalange portion is contacted (e.g., using a user's thumb), then the image is shared with a second contact distinct from the first contact, and if a proximal phalange portion is contacted (e.g., using a user's thumb), then the image is shared with a third contact that is distinct from the first and second contacts. In some embodiments, the in-air gesture that causes capturing of the image can be a multi-step in-air gesture such that a first portion of the gesture (e.g., thumb contacting index finger) can cause capturing of the image and a second portion of the gesture (e.g., a pressing force between the thumb and index finger exceeding a force threshold) can cause sharing of the image with a specific contact (e.g., different contacts can be associated with different force thresholds to allow for easy sharing of images using such multi-step in-air gestures). Different examples of options for sharing and editing an image are provided above in reference to FIG. 3A-3J.

In some embodiments, the method 700 further includes selecting the camera from among one or more available cameras that are communicatively coupled to the wrist-wearable device 170 and/or the head-wearable device 110 based on a characteristic of the in-air hand gesture. In some embodiments, in accordance with a determination that one or more characteristics of the in-air hand gesture are within a first threshold, the method 700 includes causing a first camera to capture the camera data for presentation at the display of the head-wearable device that is worn by the user; and in accordance with a determination that the one or more characteristics of the in-air hand gesture are within a second threshold, the method further includes causing a second camera to capture the camera data for presentation at the display of the head-wearable device that is worn by the user. In some embodiments, the method 700 includes determining, based at least on the received data from the one or more sensors, one or more characteristics of the in-air hand gesture and performing a different action (e.g., camera-control gesture) based on the characteristics of the performed hand gestures. In some embodiments, the one or more characteristics of the in-air hand gesture include one or more of a force, a duration, a number of contacts, and a pattern (e.g., sequence of taps, morse code, etc.).

In some embodiments, the user can control the cameras camera concurrently or separately. In some embodiment, the first camera is in proximity to the user and the second camera is remote to the user. In some embodiments, proximity means within 3-5 feet of the user, and remote means at least more than 5 feet away from the user. Alternatively, in some embodiments, the first and second camera are remote from the user, or in proximity to the user. Control of devices other than imaging devices is also contemplated. In some embodiments, different in-air hand gestures detected by the wrist-wearable device 170 can cause the performance of different operations. For example, in-air hand gestures detected by the wrist-wearable device 170 can be used to control a communicatively coupled tablet or computer. In some embodiments, in-air hand gestures detected by the wrist-wearable device 170 can be used to open applications, using the wrist-wearable device 170 as a controller for the head-wearable device, and number of other operations.

In some embodiments, the data is generated using, in part, one or more sensors of the wrist-wearable device, and while data generated by the one or more sensors of the wrist-wearable device 170 indicates that the in-air hand gesture is maintained, continuing (730) to cause the presentation of the representation of the camera data via the display of the head-wearable device. Maintaining the in-air hand gesture means, in some embodiment, that phalange portions of the user's fingers remaining in contact with one another, which can be detected by analyzing signal information from neuromuscular-signal sensors of the wrist-wearable device 170. The maintaining can also, or alternatively, include a certain amount of applied pressure being maintained in conjunction with the in-air hand gesture (a pressing force applied by one or both of the phalange portions against each other), which can force also be detected by analyzing signal information from neuromuscular-signal sensors of the wrist-wearable device 170. In some embodiments, the continuing to cause the presentation of the representation of the camera data via the display of the head-wearable device includes causing presentation of a representation of a field of view of the camera to the user via the display of the head-wearable device. In some embodiments, while the in-air hand gesture is maintained, movement of the user's head or movement of the user's wrist can be interpreted to causes changes in the field of the view of the camera (e.g., side-to-side movement of the head or side-to-side movements of the wrist can cause the camera's field of view to change, which then is immediately updated on the display of the head-wearable device).

In some embodiments, the method 700 further includes, in accordance with a determination that the in-air hand gesture is no longer maintained, causing (732) the presentation of the representation of the camera data via the display of the head-wearable device to cease. For example, when the in-air hand gesture is released such that the phalange portions are no longer in contact with one another or such that a threshold amount of force is no longer applied by the phalange portions against one another, the method includes ceasing to cause presentation of the camera data. In some embodiments, the wrist-wearable device 170 can send an instruction to the head-wearable device to cause the display of the head-wearable device to cease presenting the representation of the camera data. Alternatively or in addition, an intermediary device can send the instruction, or the head-wearable device can process the data generated based on performance of the in-air hand gesture to determine that the in-air hand gesture is no longer maintained, and then cease presenting the representation of the camera data. In some embodiments, the method 700 includes in accordance with a determination (734) that data generated by the one or more sensors of the wrist-wearable device 170 indicates that the in-air hand gesture is no longer maintained causing (735) a capture of an image within the field of view using the camera, and cause presentation of a representation of the image via the display of the head-wearable device. Different examples for maintaining and releasing a gesture are provided above in reference to FIGS. 2A-4J.

In some embodiments, the method 700 includes, responsive to a determination that an additional in-air hand gesture is performed while the in-air hand gesture is maintained, causing (740) a zoomed-in representation of the camera data to be presented via the display of the head-wearable device. In some embodiments, in accordance with a determination that the in-air hand gesture is no longer maintained while the zoomed-in representation of the camera data is being presented via the display of the head-wearable device, causing (742) the camera to capture the zoomed-in representation of the camera data. In some embodiments, causing (744) presentation to the user, via the display of the head-wearable device that is worn by the user, of an image of the zoomed-in representation of the camera data In some embodiments, the method 700 includes, responsive to a determination that a further in-air hand gesture is performed while the in-air hand gesture is maintained, causing (760) a zoomed-out representation of the camera data to be presented via the display of the head-wearable device. In some embodiments, the method 700 includes in accordance with a determination that the further in-air hand gesture is no longer maintained while the zoomed-out representation of the camera data is being presented via the display of the head-wearable device, causing (762) the camera to capture the zoomed-out representation of the camera data. In some embodiments, causing (764) presentation to the user, via the display of the head-wearable device that is worn by the user, of an image of the zoomed-out representation of the camera data.

Examples of the zoomed-in and zoomed-out captures are provided above in reference to FIG. 3A-3J. While some embodiments can require the first in-air hand gesture to be maintained to activate the zoom-in and zoom-out in-air hand gestures, other embodiments can instead (or additionally) allow for activating the camera control/presentation features, then allow for a release of the first in-air hand gesture, followed by then detecting the second in-air hand gesture to allowing for controlling zoom features of the camera. In such other embodiments, a second detection of the first in-air hand gesture (e.g., at a point in time after the first detection of the in-air hand gesture that originally triggered activation of the camera control/presentation features) can cause the camera control/presentation features to then cease.

In some embodiments, the in-air hand gesture is a maintained contact between at least two phalanges of a user's hand, the additional in-air hand gesture is an in-air rotational movement of the user's wrist in a first direction, and the further in-air hand gesture is an in-air rotational movement of the user's wrist in a second direction distinct from the first direction.

In some embodiments, the method 700 further includes receiving additional data generated based on performance of yet another additional in-air hand gesture by the user while the user is wearing the wrist-wearable device. The additional data generated based on performance of yet another additional in-air hand gesture can be detected by one or more sensors of the wrist-wearable device 170. The method also includes, in accordance with a determination that the additional data indicates that the other additional in-air hand gesture is not a camera-control gesture, forgo causing presentation of camera data via the display of the head-wearable device and cause activation of a microphone for allowing the user to provide a voice command to a digital assistant. The microphone is in communication with one or both of the wrist-wearable device and the head-wearable device. In other words, certain in-air gestures can command camera controls, while other in-air hand gestures can command other actions at the head-wearable device. In some embodiments, the microphone of the head-wearable device remains active as long as the other additional in-air hand gesture is maintained. In some embodiments, the method 700 includes, upon determining that further data indicates that the other additional in-air hand gesture is no longer maintained, causing deactivation of the microphone that is in communication with one or both of the wrist-wearable device 170 and the head-wearable device. In other words, the method includes deactivating the microphone upon receiving data indicating that the in-air hand gesture was released.

In some embodiments, the captured camera data and images include at least 10 megapixels (MP) or at least 12 MP. In some embodiments, the camera data and images are captured in full high definition (e.g., 1080p). In some embodiments, the camera data and images are captured in 1440p or higher. The resolution of the captured camera data and images allow the user to zoom-in and zoom-out as desired. In some embodiments, the camera data and images are scaled for the respective display that presents the camera data and images.

Although the above examples show the head-wearable device 110 displaying the captured camera data and/or one or more user interface, in some embodiments, the wrist-wearable device 170 can also display the camera data and/or one or more user interfaces.

Figure 8A:
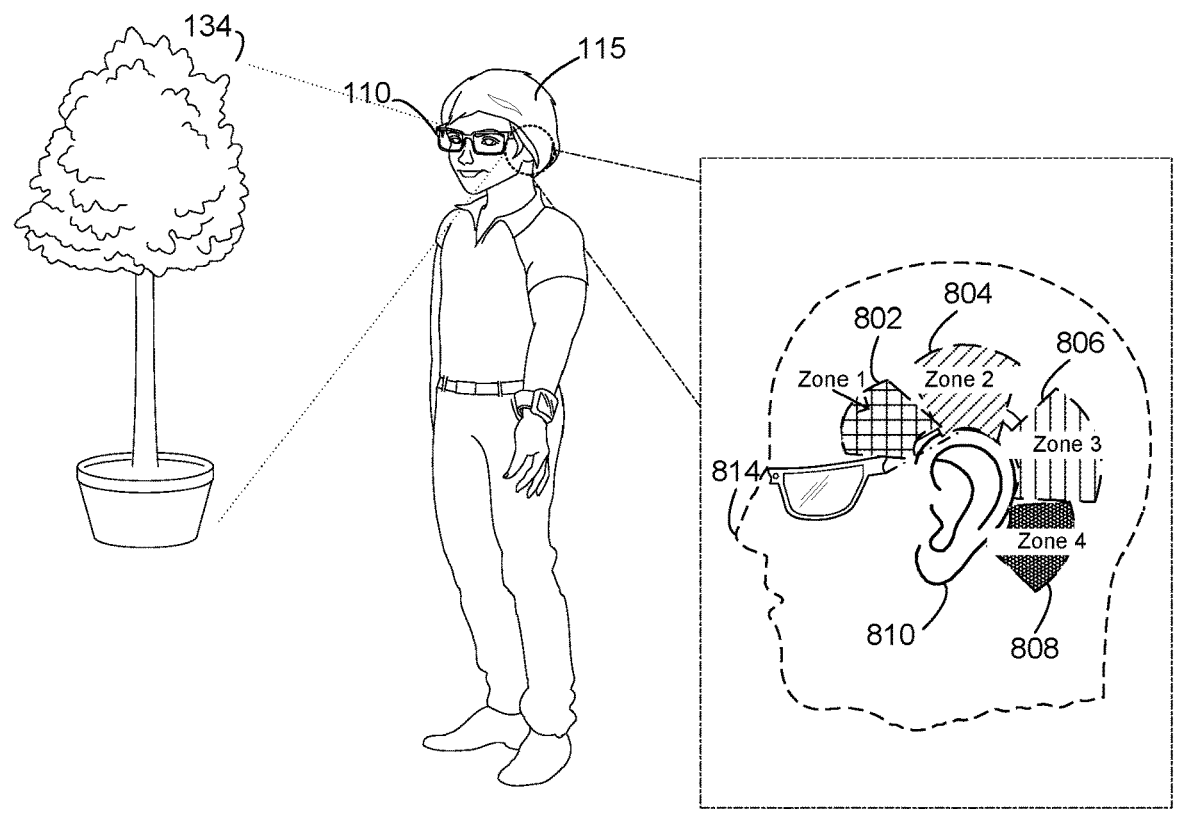
FIG. 8A-8H illustrate a head-wearable device including a vestigial muscle training mode for training a user to use their vestigial ear muscles to perform vestigial ear muscle gestures that are detectable by the head-wearable device, according to some embodiments.

FIGS. 8A-8H illustrate a head-wearable device including a vestigial muscle training mode for training a user to use their vestigial ear muscles to perform vestigial ear muscle gestures that are detectable by the head-wearable device. In FIG. 8A, a user 115 wearing a head-wearable device 110 provides a request to enable vestigial ear muscle detection via the head-wearable device 110. Responsive to the user 115's request, a vestigial muscle training mode of the head-wearable device 110 is initiated to train the user 115 to use their vestigial ear muscles to perform vestigial ear muscle gestures. In some embodiments, the request to initiate the vestigial muscle training mode is a verbal command, a hand gesture, and/or a touch input detected by the head-wearable device 110, a wrist-wearable device 170, and/or an intermediary device. For example, the user 115, can navigate via one or more user interfaces and/or user interface elements presented by the head-wearable device 110 and/or wrist-wearable device 170 and provide a user input via the user interfaces and/or user interface elements to initiate the vestigial muscle training mode. Alternatively or in addition, in some embodiments, the head-wearable device 110 automatically initiates the vestigial muscle training mode when the head-wearable device 110 is worn by the user 115. For example, for example, when the user 115 first wears the head-wearable device 110, the head-wearable device 110 can initiate the vestigial muscle training mode and prompt the user 115 with an option to enable vestigial ear muscle detection.

In some embodiments, vestigial muscle training mode assesses the user's ability to move their ears via one or more vestigial ear muscles (e.g., vestigial muscles associated with moving one's ears, such as ear 810). As described below, depending on the user's ability to move their vestigial ear muscles, the vestigial muscle training mode can provide suggestions to the user 115 on how the user 115 can isolate and effectively use different vestigial ear muscles to perform one or more vestigial ear muscle gestures. For example, the vestigial muscle training mode can provide the user 115 with instructions to strengthen one or more vestigial ear muscles such that they are easier to identify and/or move. This allows the user 115 learn one or more vestigial ear muscle gestures by using vestigial ear muscles as well as strengthen their vestigial ear muscles such that performing vestigial ear muscle gestures becomes second nature. Further, the vestigial muscle training mode can prompt the user 115 to move one or more vestigial ear muscles in a first direction and/or second direction to improve the range of motion of the vestigial ear muscle gesture. The vestigial muscle training mode can be used to teach the user to move each ear independently and or both ears together.

For the purposes of training the user 115 to use their vestigial ear muscles, the systems and methods disclosed herein separate the vestigial ear muscles into 4 zones around an ear. For example, ear 810 is associated with the vestigial ear muscles in zone 1 802, zone 2 804, zone 3 806, and zone 4 808. While FIGS. 8A-8H illustrate training the user 115 to perform vestigial ear muscle gestures using the vestigial ear muscles in zone 2 802, the vestigial muscle training mode can train the user 115 to perform vestigial ear muscle gestures using any vestigial ear muscles in zones 1 802, zone 2 802, zone 3 806, and zone 4 808 and/or a combination thereof. Further, as the skilled artisan will appreciate upon reading the descriptions provided herein, the vestigial muscles can be separated is more or less than four zones to train a user to perform vestigial ear muscle gestures.

In some embodiments, the head-wearable device 110 includes one or more sensors (e.g., EMG sensors as described below in reference to FIG. 11) to capture the vestigial ear movements and facial muscle movements performed by the user 115. In some embodiments, the sensors are located within the head-wearable device 110 such that the sensors are adjacent to temporal, parietal, and/or occipital portions of the user 115's head. In this way, the sensors are in the closest proximity to the vestigial ear muscles to sense the user 115's movements and obtain accurate data. In some embodiments, the sensors are integrated into the head-wearable device 110. Alternatively, in some embodiments, the sensors are physically coupled to the head-wearable device 110 (e.g., coupled to an exterior surface), but operate independently of the head-wearable device 110.

Figure 8B:
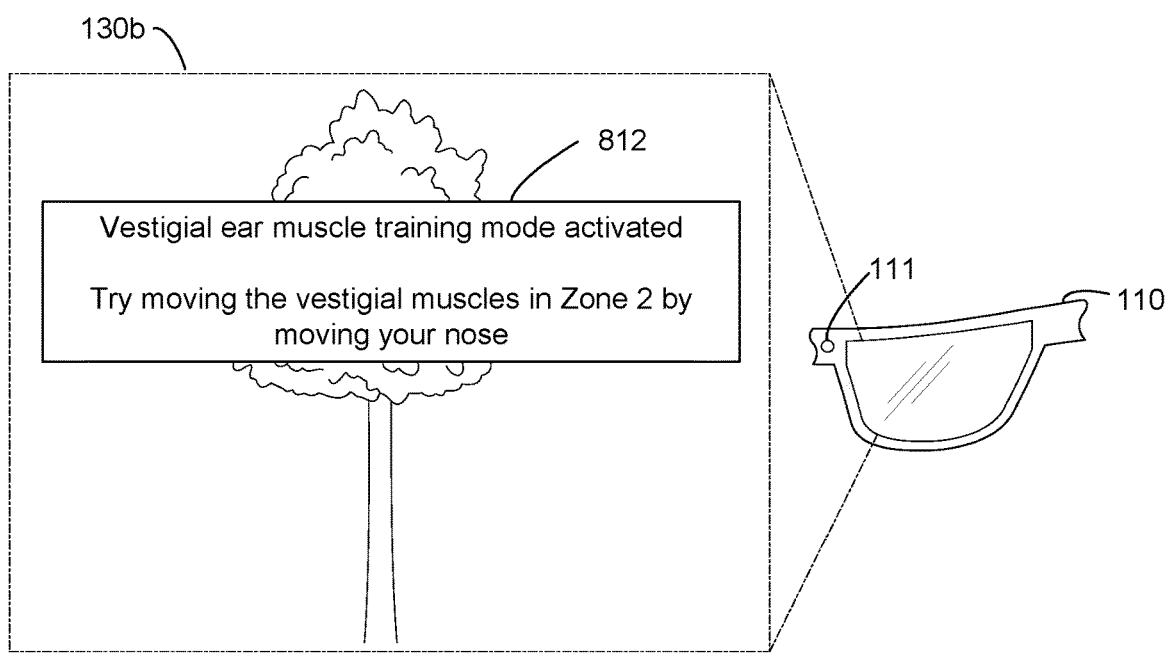

Turning to FIG. 8B, the head-wearable device 110 presents via a display 130 (e.g., a heads-up display 130b) a user interface and/or user interface elements of the vestigial muscle training mode. For example, the head-wearable device 110 present to the user 115 a vestigial muscle training mode prompt 812 that notifies the user 115 that the vestigial muscle training mode is activate. The vestigial muscle training mode prompt 812 includes instructions to guide the user 115 through a training process. For example, the vestigial muscle training mode prompt 812 can instruct the user 115 to try moving the vestigial ear muscles in zone 2 804 by moving their nose 814 muscles. In some embodiments, to further guide the user 115, the vestigial muscle training mode prompt 812 can present to the user 115 an outline of the one or more zones of the vestigial ear muscles, which provides a visual aid to the user 115 to assist them in performing the suggested actions.

In some embodiments, the vestigial muscle training mode instructions presented to the user 115, via the head-wearable device 110, train the user 115 to target and use one or more vestigial ear muscles within one or more zones. Alternatively, in some embodiments, the vestigial muscle training mode instructions train the user 115 to target one or more vestigial ear muscles in one zone. The vestigial muscle training mode can teach the user 115 to identify vestigial ear muscles by instructing the user 115 to perform one or more facial movements and/or move muscles close to or connected with respective vestigial ear muscles such that the user 115 is able to feel or sense vestigial ear muscles within a zone moving. For example, as shown in FIG. 8B, the vestigial muscle training mode prompt 812 instructs the user to move their nose 814, which is a facial movement that can trigger or activate one or more vestigial ear muscles for performing a vestigial ear muscle gesture. In some embodiments, facial muscles and/or muscle movements close to or connected with vestigial ear muscles include the movement of any part of the face. Non-limiting examples of facial movements and/or muscle movements close to or connected with vestigial ear muscles include eyebrows movement, nose movement, cheek movement, lip and/or mouth movement, etc. Additionally, in some embodiments, the head-wearable device 110 can present or highlight one or more zones that are being sensed by the one or more sensors as the user performs the instructions presented while the vestigial muscle training mode is active.

Figure 8C:
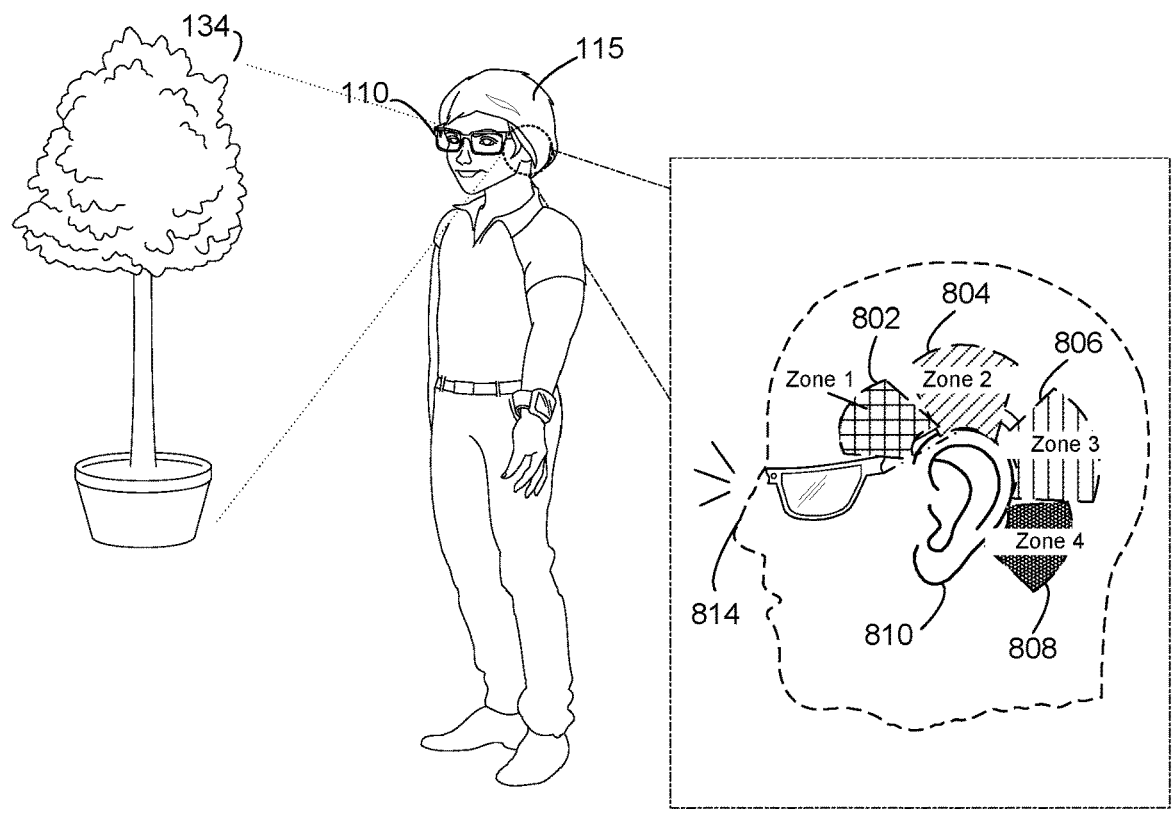

In FIG. 8C, the user 115 performs the nose 814 movement suggested by the vestigial muscle training mode in order to move the vestigial ear muscles in zone 2 804. Even though the user 115 performs the suggested facial muscles and/or muscle movements close to or connected with vestigial ear muscles, the targeted vestigial ear muscles may not be triggered or activated (e.g., the sensor data obtained by the head-wearable device 110 indicates that the one or more vestigial ear muscles were not moved). In such situations, the vestigial muscle training mode can provide additional instructions to assist the user 115 in identifying and/or moving the targeted vestigial ear muscles. For example, the performed nose 814 movement can generate facial movement related data, sensed by the sensors of the head-wearable device 110, that detects movement of vestigial ear muscles in a zone other than zone 2 804 or does not detect any movement of vestigial ear muscles, and additional instructions can be presented by the head-wearable device 110 to further assist the user 115 in triggering or activating the vestigial ear muscles in zone 2 804. Additionally, if the user 115 is unable to perform the suggested facial muscles and/or muscle movements close to or connected with vestigial ear muscles, the vestigial muscle training mode can provide alternative instructions to assist the user 115 in identifying and/or moving the targeted vestigial ear muscles.

Figure 8D:
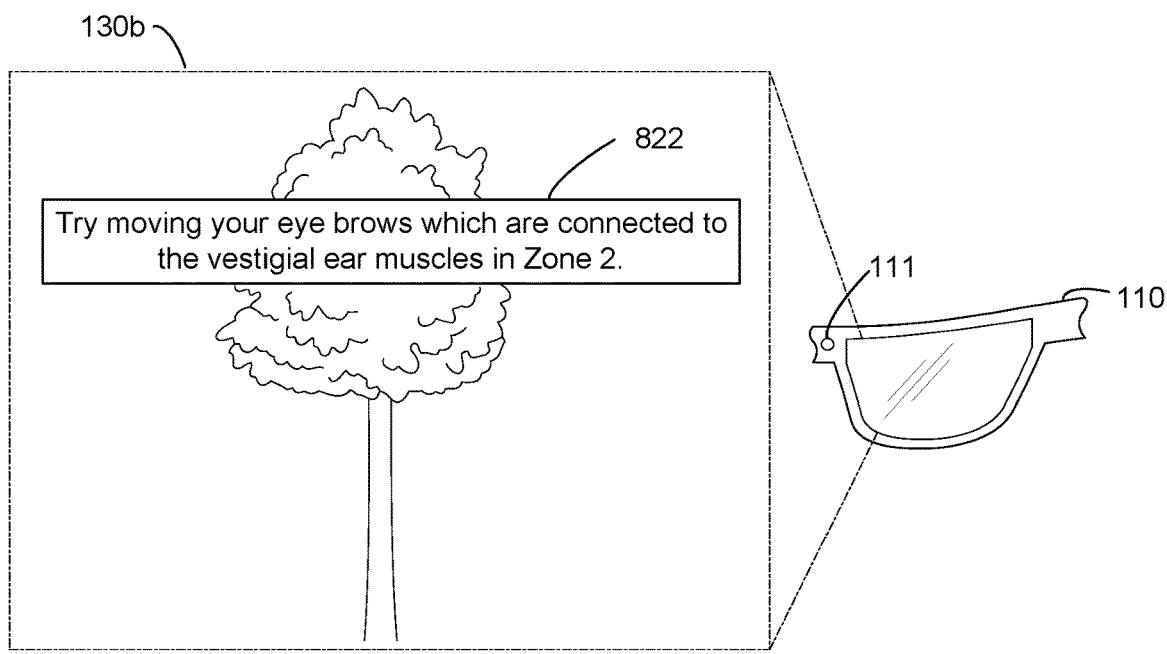

FIG. 8D shows an example of additional or alternative instructions provided to the user 115 in accordance with a determination that the initial instructions did not generate facial movement related data that can be used to detect movement of vestigial ear muscles in a targeted zone. For example, an updated vestigial muscle training mode prompt 822 presented to the user 115 via the display 130 instructs the user 115 to move their eyebrows 816 instead of their nose 114 in order to move the vestigial ear muscles in zone 2 804. In some embodiments, the user 115 will continue to receive instructions on how to move the respective vestigial ear muscles until they are successful. In some embodiments, the user 115 receives feedback on whether they are moving their vestigial ear muscles correctly or incorrectly. During training, the user 115 can select the method in which they prefer to receive the feedback such as visual feedback on the display 130 (e.g., a guided video, an outline of the targeted vestigial ear muscles and/or the currently moved muscles, etc.), haptic feedback (e.g., a vibration identifying the muscle to be moved), and/or auditory feedback (e.g., audible instructions). Feedback can be provided through the head-wearable device 110 or any other coupled device such as a wrist-wearable device 170, an intermediary device, etc.

Figure 8E:
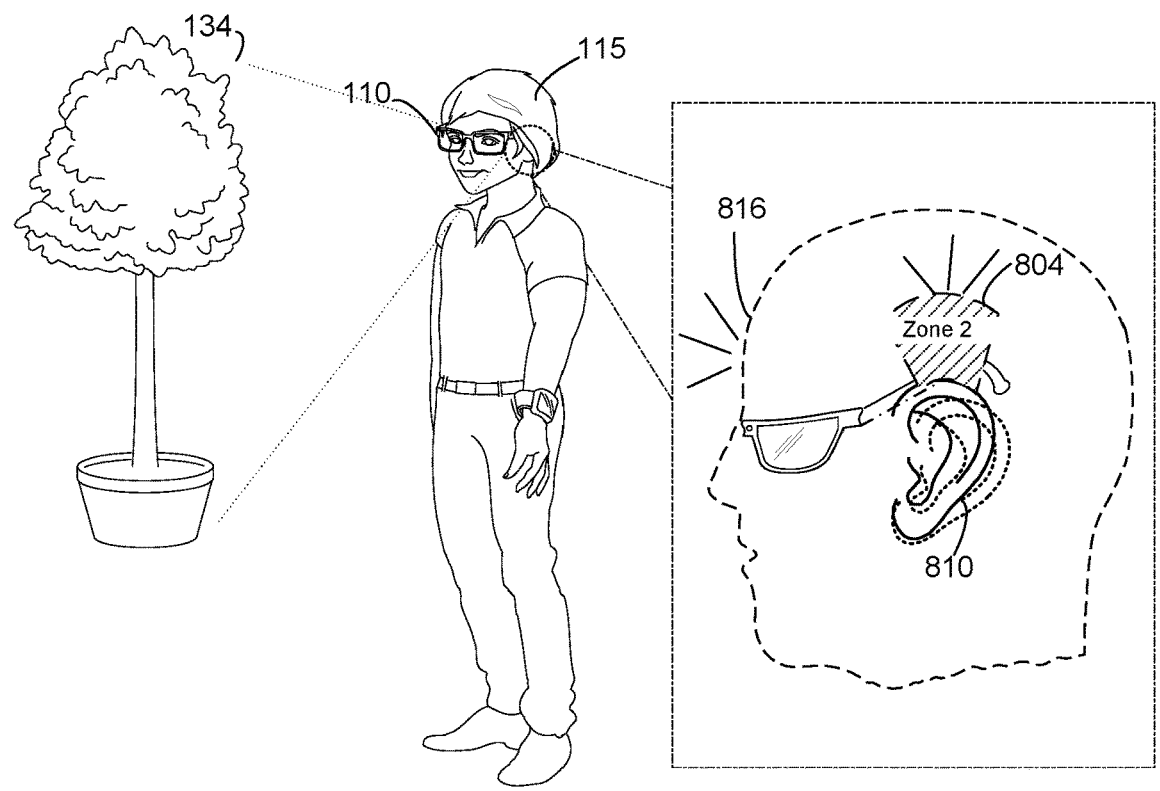

Turning to FIG. 8E, the user 115 is shown moving their eyebrows 816, which results in the user 115 successful activating the vestigial ear muscles in zone 2 804 (which is detected by the sensor of the head-wearable device 110). As further shown in FIG. 8E, successful activation of the vestigial ear muscles in zone 2 804 also results in the user 115 moving ear 810. As the user 115 becomes more accustomed to moving targeted vestigial ear muscles, the vestigial muscle training mode can continue to provide additional instructions to further reduce excess movements performed by the user 115. For example, after the user 115 successfully activates the vestigial ear muscles in zone 2 804 and moves their ear 810, the vestigial muscle training mode can provide additional instructions to reduce or eliminate the facial muscle movements and/or muscle movements close to or connected with vestigial ear muscles performed by the user 115 (e.g., the user's eyebrows 816 in FIG. 8E) to initially activates the vestigial ear muscles. In the example shown in FIGS. 8E and 8F, the user 115 receives additional instructions to train the user 115 to move their ear 810 without using additional facial muscles and/or muscle movements close to or connected with vestigial ear muscles such as the user's nose 814 or eyebrows 816.

Figure 8F:
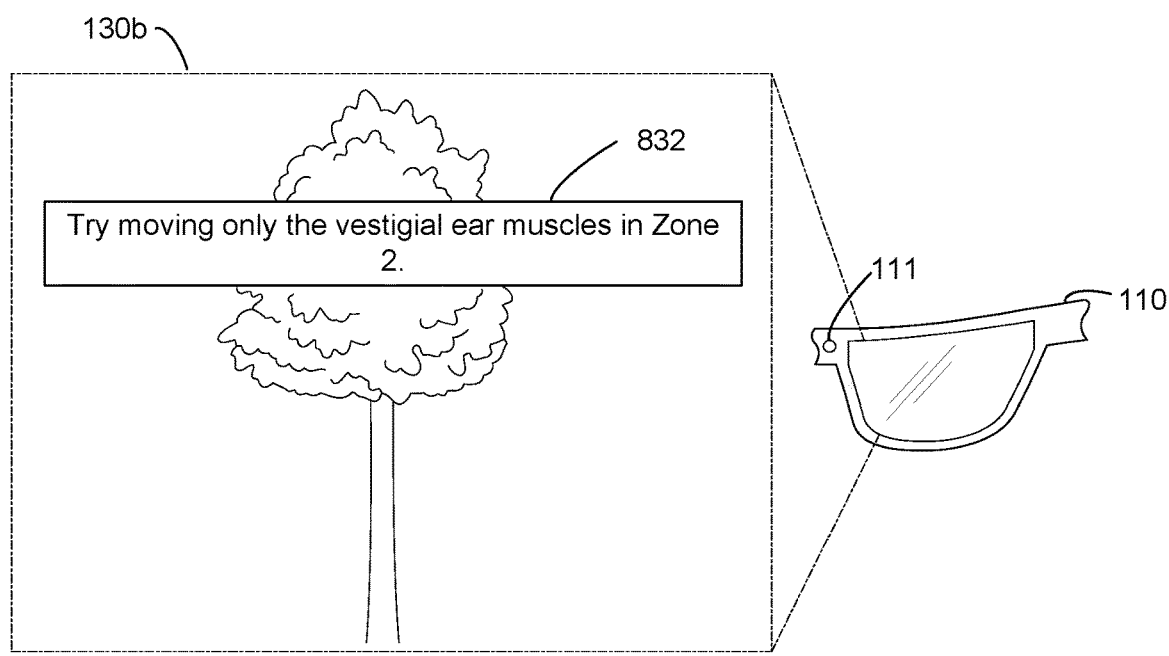

FIG. 8F illustrates an additional vestigial muscle training mode prompt 832 presented on the display 130, which instructs the user 115 to try moving the respective vestigial ear muscles in zone 2 804 without using additional facial muscles and/or muscle movements close to or connected with vestigial ear muscles. The vestigial muscle training mode provides instructions to progressively assist the user 115 in identifying and isolating the targeted vestigial ear muscles. For example, in FIG. 8F, the user 115 was able to move the respective vestigial ear muscles in zone 2 804 and, as such, is further instructed to minimize facial muscle movements and/or muscle movements close to or connected with vestigial ear muscles (e.g., as the user 115 is now familiar with the feeling and sensation a particular vestigial ear muscle movement).

Figure 8G:
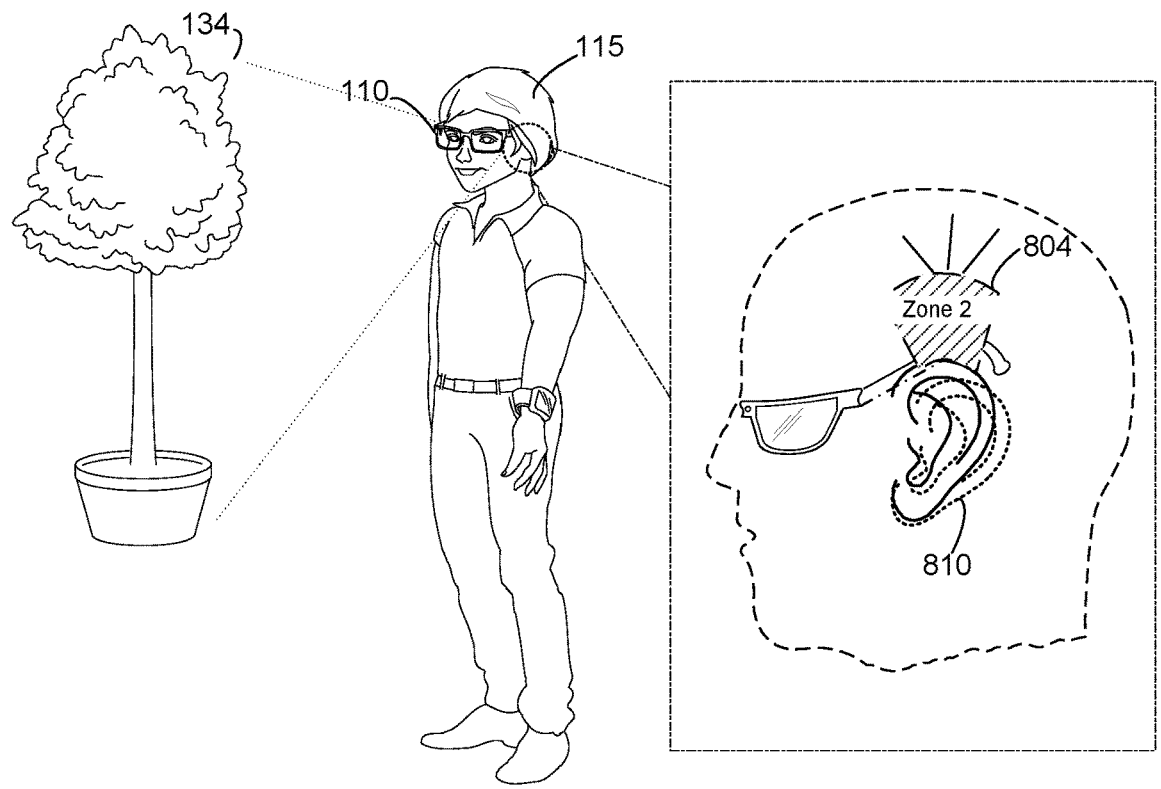

FIG. 8G illustrates the user 115 successfully moving the vestigial ear muscles in zone 2 804 and moving their ear 810 without the use of additional facial muscle movements and/or muscle movements close to or connected with vestigial ear muscles. In some embodiments, the user 115 can record or store facial movement related data associated with vestigial ear muscle movement and assign it to a specific navigation or control gesture (e.g., defining or creating a vestigial ear muscle gesture). For example, as described above in reference to FIGS. 1E-1F, the user 115 can capture an image 160 using a vestigial ear muscle gesture. In some embodiments, the user 115 can perform multiple vestigial ear muscle gestures (concurrently or sequentially) to perform the desired navigation or other controls. Additionally, the user 115 can also record or store facial movement related data associated with one or more vestigial ear muscle movements and assign them to different control/navigation gestures. Facial movement related data, in some embodiments, includes data associated with vestigial ear muscle movement, facial movement, muscle movements close to or connected with vestigial ear muscles, and/or any combination thereof.

Figure 8H:
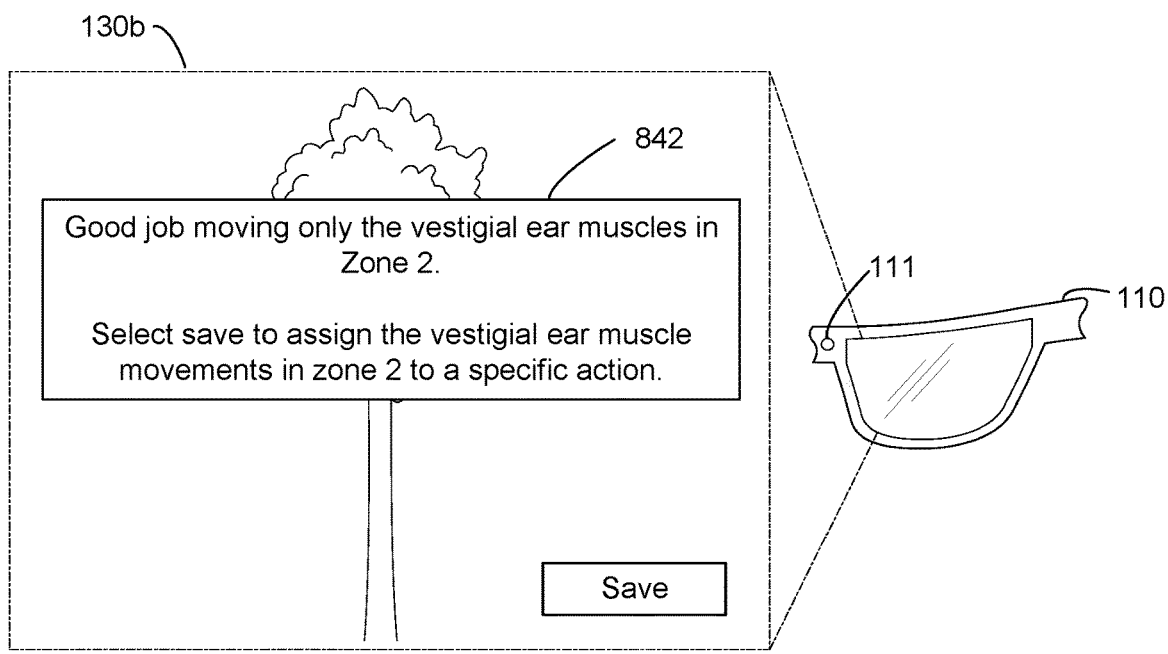

FIG. 8H illustrates a successful vestigial muscle training mode prompt 842 presented by the display 130 of the head-wearable device 110, which notifies the user 115 that they have successfully moved the vestigial ear muscles in zone 2 804 independent of moving other facial muscles. The successful vestigial muscle training mode prompt 842 further informs the user 115 that they can save their newly learned vestigial ear muscle movement to a specific action such as taking a picture, video, etc. (e.g., to define or create a vestigial ear muscle gesture).

FIG. 9 illustrates a detailed flow diagram of a method of detecting vestigial ear movements at a head-wearable device, according to some embodiments. Operations of the method 900 can be performed by one or more processors of a head-wearable device 110. At least some of the operations shown in FIG. 9 correspond to instructions stored in a computer memory or computer-readable storage medium. Operations of the method 900 can be performed by the head-wearable device 110 alone or in conjunction with one or more processors and/or hardware components of another device (e.g., a wrist-wearable device 170 and/or an intermediary device described below in reference to FIG. 11) communicatively coupled to the head-wearable device 110 and/or instructions stored in memory or computer-readable medium of the other device communicatively coupled to the head-wearable device 110.

Method 900 includes being responsive (902) to an indication that a user wearing a head-wearable device requests to enable vestigial ear muscle detection and initiating a vestigial muscle training mode. As described in FIG. 8A, the user 115 can manually enable the vestigial muscle training mode or the vestigial training mode can be automatically activated when the head-wearable device is first worn. In some embodiments, vestigial muscle training mode is used to train the user to use one or more vestigial ear muscles located in one or more zones as described above in reference to FIGS. 8A-8H.

The method 900 includes while in a vestigial muscle training mode, presenting (904) instructions to the user to perform a facial movement to move a respective vestigial ear muscle of one or more vestigial ear muscles. In some embodiments, the instructions presented to the user include one or more facial movements connected to the respective vestigial ear muscle. As described above in reference to FIGS. 8A-8H, the vestigial muscle training mode uses one or more facial movements to teach the user to move one or more vestigial ear muscles.

The method 900 further includes, in accordance with a determination (906) that facial movement related data (based on the facial movement performed by the user), detected via sensors of the head-wearable device, satisfies detectable vestigial ear muscle movement criteria associated with movement of the respective vestigial ear muscle, providing (908) an indication that a vestigial ear muscle movement was detected. In some embodiments, as explained in FIGS. 8A, 8B, and 8C, during training the user can perform facial movements in order to move vestigial ear muscles connected to facial muscles. In some embodiments, facial movement related data is produced when the user moves either or both facial muscles and/or vestigial ear muscles. The head-wearable device is able to use the facial movement related data to distinguish between facial movements and vestigial ear muscle movements in order to determine whether the instructions provided to the user were able to assist the user in identifying and/or isolating vestigial ear muscles. In some embodiments, detectable vestigial ear muscle movement criteria is satisfied when the facial movement related data indicates that the user is able to move their vestigial ear muscles with a predetermined magnitude (e.g., neuromuscular signals detected based on the vestigial ear muscles are above a predetermined threshold (e.g., 50 μv, 1 mv, etc.), the user is able to move their ear a predetermined distance (e.g., 0.5 mm, 1 mm, 2 mm, etc.), the user is able to move their ear at a predetermined frequency, user is able to move their ear at a predetermined speed, etc. For example, if the user is only moving their facial muscles and not the vestigial ear muscles, the movements will not meet the threshold for vestigial ear muscle movement criteria. In another example as illustrated in FIGS. 8C and 8D, the user can move both their facial muscles and their vestigial ear muscles to satisfy the detectable vestigial ear muscle movement criteria.

In some embodiments, the indication shared with the user that the vestigial ear muscle movement was detected can be provided via auditory, haptic, or visual feedback. FIGS. 8C-8H illustrate example visual feedback presented to the user via a display of the head-wearable device. In some embodiments, auditory, haptic, or visual feedback can be provided via the head-wearable device or other coupled devices such as a wrist-wearable device 170 or an intermediary device.

The method 900 further includes receiving (910) a user input to assign a vestigial ear muscle gesture to the vestigial ear muscle movement. In some embodiments, the user input can include an auditory input to the head-wearable device or a coupled device, a physical input to a coupled device (e.g., a wrist-wearable device, smartphone, etc.), or another input to the head-wearable device. In some embodiments, after the facial movement related data corresponding to the vestigial ear muscle movement is determined to satisfy the detectable vestigial ear muscle movement criteria, the user can assign a particular vestigial ear muscle gesture to the vestigial ear muscle movement (and/or the facial movement related data). The user can further associate the vestigial ear muscle gesture with a particular control action or navigation action. For example, as shown in FIGS. 8A-8H, after learning to activate or move the vestigial ear muscles in zone 2 804, the user can assign a vestigial ear muscle gesture to the learned movement (e.g., capturing an image as described above in reference to FIGS. 1E-1F). In some embodiments, the user can perform one or more the vestigial ear muscle movements to create or define a vestigial ear muscle gesture associated with a particular action or set of actions. More specifically, the vestigial ear muscle gesture can be one or more vestigial ear muscle movements, a pattern of one or more vestigial ear muscle movements, etc.

The method 900 further includes, storing (912) the facial movement related data associated with the vestigial ear muscle gesture. In other words, the vestigial ear muscle gesture and the associated data related to the vestigial ear muscle gesture can be stored such that the user can perform the vestigial ear muscle gesture to perform one or more control actions or other actions via the head-wearable device.

Figure 10:
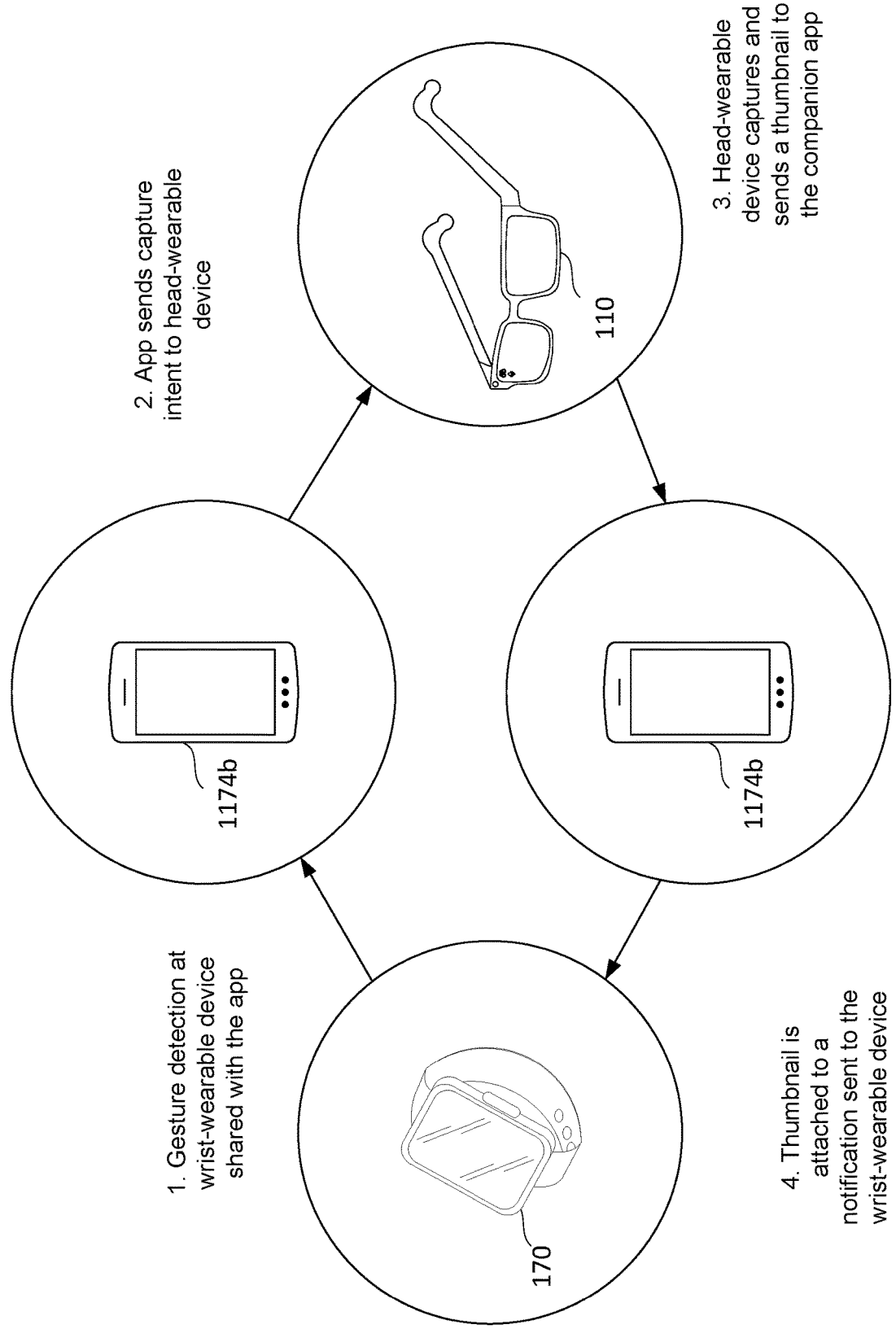
FIG. 10 illustrates an example system for capturing and presenting camera data, in accordance with some embodiments.

FIG. 10 illustrates an example system for capturing and presenting camera data as described above in reference to FIGS. 1A-9. System 1000 includes a wrist-wearable device 170 communicatively coupled with an intermediary device (such as a smartphone 1174b) and a head-wearable device 110. In some embodiments, the wrist-wearable device 170, the intermediary device, and the head-wearable device 110 are connected via a shared application. The shared application can facilitate the data transfer between the different devices. For example, the shared application can facilitate the transfer of sensor data, gesture data, camera data, instructions, etc.

Initially, one or more hand gestures are detected by the wrist-wearable device 170. The wrist-wearable device 170 can, upon detecting a camera-control gesture for capturing camera data, provide instructions for initiating the capture of camera data via a communicatively coupled device, such as the head-wearable device 110. In some embodiments, the instructions are provided to the intermediary device for facilitating the capture of camera data at the desired device. For example, as shown in system 1000, the wrist-wearable device 170, upon detecting a camera-control gesture for capturing camera data, provides instructions to the smartphone 1174b (e.g., via the shared application) requesting an intent to capture camera data via the head-wearable device 110. The instructions provide by the wrist-wearable device 170 can specify the device that the user 115 would like to capture camera data from (e.g., the smartphone 1174b, the wrist-wearable device 170 itself, and/or any other communicatively coupled device).

The head-wearable device 110 upon receiving instructions from the intermediary device begins to capture camera data (e.g., via its imaging device 111). The head-wearable device 110 after capturing camera data sends the captured camera data to the intermediary device (or the shared application). The camera data sent to the intermediary device (or the shared application) is received at the wrist-wearable device 170, which can then present the captured camera data to the user 115 (e.g., via the display of the wrist-wearable device 170). The captured camera data can include full images, full videos, thumbnails, clips or portions of the video, etc.

FIG. 11 illustrates a system 1100 of one or more devices for capturing and presenting camera data, in accordance with some embodiments. For example, a wrist-wearable device 170 is configured to detect one or more hand gestures performed by a user 115 and, based on a determination that a hand gesture performed by the user is a camera-control gesture, cause another device (e.g., head-wearable devices 110 and 510) to capture camera data via an imaging device 111, as well as cause the presentation of the camera data via a display 130. The system 1100 can include one or more of servers 1170, electronic devices 1174 (e.g., a computer, 1174a, a smartphone 1174b, a controller 1174c, and/or other devices), head-wearable devices 110, and/or wrist-wearable devices 170. In some embodiments, the one or more of servers 1170, electronic devices 1174, head-wearable devices 110, and/or wrist-wearable devices 170 are communicatively coupled via a network 1172. In some embodiments, the wrist-wearable device 170 is configured to cause one or more operations to be performed by a communicatively coupled head-wearable device 110, and/or the two devices can also both be connected to an intermediary device, such as a smartphone 1174b, a controller 1174c, or other device that provides instructions and data to and between the two devices. In some embodiments, the wrist-wearable device 170 is configured to cause one or more operations to be performed by multiple devices in conjunction with the head-wearable device 110. In some embodiments, instructions to cause the performance of one or more operations are controlled via an artificial reality (AR) processing module 1145. The AR processing module 1145 can be implemented in one or more devices, such as the one or more of servers 1170, electronic devices 1174, head-wearable devices 110, and/or wrist-wearable devices 170. In some embodiments, the one or more devices perform operations of the AR processing module 1145, using one or more respective processors, individually or in conjunction with at least one other device as described herein.

In some embodiments, the wrist-wearable device 170 includes one or more components such as a communication interface 1115a, one or more sensors 1121a, one or more haptic generators 1125a, an AR processing module 1145a, one or more imaging devices 111a (e.g., a camera), one or more processors 1150a, and memory 1160a. In addition, in some embodiments, the wrist-wearable device 170 includes a display 130a and one or more applications 1135a. In some embodiments, the memory 1160a is configured to store sensor data 1164a and AR processing data 1163a. Although not show, in some embodiments, the memory 1160a can include application data, device data (e.g., device hardware, device model, etc.), image data, and/or user data (e.g., data collected through use of a device, data collected through use of an application, user preferences, or other information stored by the user). In some embodiments, the one or more components of the wrist-wearable device 170 are housed within a capsule (or watch body) and/or a band of the wrist-wearable device 170.

In some embodiments, the communications interface 1115 (e.g., 1115a, 1115b, and 1115c) is configured to communicatively couple the wrist-wearable device 170 to one or more other devices such as the head-wearable device 110, electronic device 1174 (e.g., a computer 1174a, a smartphone 1174b, a controller 1174c, a tablet, etc.), and/or one or more servers 1170. The communication interface 1115 is used establish wired or wireless connections between the wrist-wearable device 170 and the other devices. In some embodiments, the communication interface 1115 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol.

The one or more sensors 1121 (e.g., 1121a, 1121b, and 1121c) can include heart rate sensors, neuromuscular-signal sensors (e.g., electromyography (EMG) sensors), SpO2 sensors, altimeters, thermal sensors or thermal couples, ambient light sensors, ambient noise sensors, and/or inertial measurement units (IMU)s. Additional non-limiting examples of the one or more sensors 1121 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 1121 are configured to gather additional data about the user (e.g., an impedance of the user's body). Examples of sensor data output by these sensors includes body temperature data, infrared rangefinder data, positional information, motion data, activity recognition data, silhouette detection and recognition data, gesture data, heart rate data, and other wearable device data (e.g., biometric readings and output, accelerometer data). The one or more sensors 1121 can include location sensing devices (e.g., GPS) configured to provide location information. In some embodiment, the data measured or sensed by the one or more sensors 1121 is stored in memory 1160. In some embodiments, the sensor data is used by the wrist-wearable device 170 for detecting one or more hand gestures and determining one or more control gesture types, such as a camera-control gesture.

The one or more haptic generators 1125 (e.g., 1125a and 1125b) can include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 1125 are hydraulic, pneumatic, electric, and/or mechanical actuators. In some embodiments, the one or more haptic generators 1125 are part of a surface of the wrist-wearable device 170 that can be used to generate a haptic response (e.g., a thermal change at the surface, a tightening or loosening of a band, increase or decrease in pressure, etc.). For example, the one or more haptic generators 1125 can apply vibration stimulations, pressure stimulations, squeeze simulations, shear stimulations, temperature changes, or some combination thereof to the user. In addition, in some embodiments, the one or more haptic generators 1125 include audio generating devices (e.g., speakers and other sound transducers) and illuminating devices (e.g., light-emitting diodes (LED)s, screen displays, etc.). The one or more haptic generators 1125 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 1135 (e.g., 1135a, 1135b, and 1135c) include social-media applications, banking applications, health applications, messaging applications, web browsers, gaming application, streaming applications, media applications, imaging applications, productivity applications, social applications, etc. In some embodiments, the one or more applications 1135 include artificial reality applications. The one or more applications 1135 can be configured to provide data to the head-wearable device 110 that can be used to determine variable light-based representations. In some embodiments, the one or more applications 1135 can be displayed via an optional display of the head-wearable device 110.

In some embodiments, the AR processing module 1145 (e.g., 1145a, 1145b, and 1145c) is configured to detect and determine one or more gestures performed by the user 115 based at least on sensor data. In some embodiments, the AR processing module 1145 is configured detect and determine one or more gestures performed by the user 115 based on camera data received that captures at least a portion of the user 115's hand. For example, the wrist-wearable device 170 can receive EMG data and/or IMU data from one or more sensors 1121 based on the user 115's performance of a hand gesture and provide the sensor data to the AR processing module 1145 for gesture detection and identification. The AR processing module 1145, based on the detection and determination of a gesture, causes a device communicatively coupled to the wrist-wearable device 170 to perform an operation (or action). For example, a hand gesture performed by the user and determined to be a camera-control gesture, based on the sensor data received at the wrist-wearable device 170, causes a head-wearable device 110 or 510 to capture image data as well as the presentation of a representation of the image data at a coupled display (e.g., display 130). In some embodiments, the AR processing module 1145 determines different characteristics between the hand gestures performed by the user based on the sensor data, and performs one or more operations or actions based on the characteristics of the hand gesture satisfying one or more thresholds (e.g., force thresholds, duration thresholds, contact number thresholds, etc.).

In some embodiments, the one or more imaging devices 111 (e.g., 111a and 111b) can include an ultra-wide camera, a wide camera, a telephoto camera, a depth-sensing cameras, or other types of cameras. In some embodiments, the one or more imaging devices 111 are used to capture image data and/or video data via the wrist-wearable device 170. The captured image data can be processed and stored in memory and then presented to a user for viewing. The one or more imaging devices 111 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 111 is stored in memory 1160 (which can include volatile and non-volatile memory such that the image data and/or video data can be temporarily or permanently stored, as needed depending on the circumstances).

The one or more processors 1150 (e.g., 1150a, 1150b, and 1150c) can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 1160. The memory 1160 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the wrist-wearable device 170 and the processor 1150. The memory 1160 also provides a storage area for data and instructions associated with applications and data handled by the processor 1150.

In some embodiments, the memory 1160 (e.g., 1160a, 1160b, and 1160c) stores at least user data 1162 including sensor data 1164 and AR processing data 1163. The sensor data 1164 includes sensor data monitored by one or more sensors 1121 of the wrist-wearable device 170 and/or sensor data received from one or more devices communicative coupled with the wrist-wearable device 170, such as a head-wearable device 110, smartphone 1174b, etc. The sensor data 1164 can include sensor data collected over a predetermined period of time that can be used by the AR processing module 1145. The AR processing data 1163 can include one or more one or more predefined camera-control gestures, user defined camera-control gestures, predefined non-camera-control gestures, and/or user defined non-camera-control gestures. In some embodiments, the AR processing data 1163 further includes one or more predetermined threshold for different gestures.

The head-wearable devices 110 and 510 can include a communication interface 1115a, a display 130b, one or more sensors 1121b, one or more haptic generators 1125b, one or more imaging devices 111b (e.g., a camera), one or more applications 1135b, one or more processors 1150b, and memory 1160b. In some embodiments, the wrist-wearable device 170 includes smart glasses (e.g., the augmented-reality glasses), artificial reality headsets (e.g., VR/AR headsets), or other head worn device. In some embodiments, one or more components of the head-wearable device 110 are housed within a body of the head-wearable device 110 (e.g., frames of smart glasses, a body of an AR headset, etc.). In addition, in some embodiments, one or more components of the head-wearable device 110 are stored within or coupled with lenses of the head-wearable device 110. The wrist-wearable device 170 is configured to communicatively couple with the head-wearable devices 110 and/or 510 (or other devices (e.g., electronic device 1174)) using communication interface 1115, 1115a, and/or 1115b. In some embodiments, the wrist-wearable device 170 is configured to communicatively couple with the head-wearable device 110 (or other devices (e.g., electronic device 1174)) via an application programming interface (API). In some embodiments, the wrist-wearable device 170 operates in conjunction with the head-wearable device 110 to perform one or more operations, such as capturing camera data and presenting a representation of the image data at a coupled display. Similar to the wrist-wearable device 170, the head-wearable device 110 can use the AR processing module 1145b to determine and cause the performance of one or more hand gestures, such as camera-control gestures.

Electronic devices 1174 can also include a communication interface 1115c, a display 130c, one or more sensors 1121c, one or more applications 1135c, an AR processing module 1145c, one or more processors 1150c, and memory 1160c. The electronic devices 1174 are configured to communicatively couple with the wrist-wearable device 170 and/or head-wearable device 110 (or other devices) using communication interface 1115, 1115a, 1115b, and/or 1115c. In some embodiments, the electronic devices 1174 are configured to communicatively couple with the wrist-wearable device 170 and/or head-wearable device 110 (or other devices) via an application programming interface (API). In some embodiments, the electronic devices 1174 operate in conjunction with the wrist-wearable device 170 and/or the head-wearable device 110 to determine a hand gesture and cause the performance of an operation or action at a communicatively coupled device. The electronic devices 1174, like the head-wearable device 110.

Server 1170 includes a communication interface 1115, one or more applications 1135, an AR processing module 1145, one or more processors 1150, and memory 1160. In some embodiments, the server 1170 is configured to receive sensor data from one or more devices, such as the head-wearable device 110, the wrist-wearable device 170, and/or electronic device 1174, and use the received sensor data to determine a hand gesture. The server 1170 can generate instructions that cause the performance of operations and actions associated with a determined hand gesture at communicatively coupled devices, such as the head-wearable device 110.

Further embodiments also include various subsets of the above embodiments including embodiments described with reference to FIGS. 1A-8H combined or otherwise re-arranged.

Example Wrist-Wearable Devices

Figure 12B:
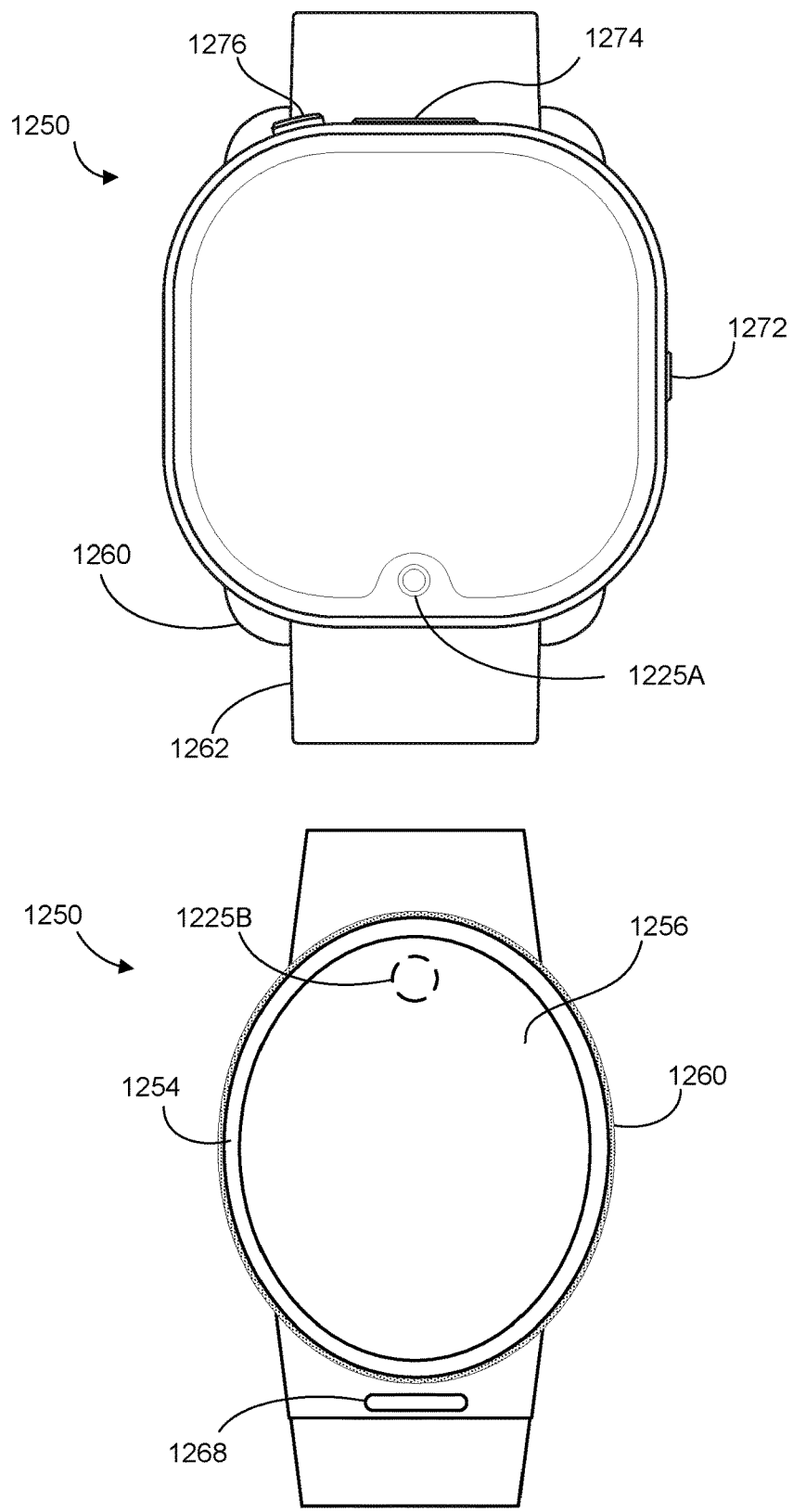

FIGS. 12A and 12B illustrate an example wrist-wearable device 1250, in accordance with some embodiments. The wrist-wearable device 1250 is an instance of the wearable device described herein, such that the wearable device should be understood to have the features of the wrist-wearable device 1250 and vice versa. FIG. 12A illustrates a perspective view of the wrist-wearable device 1250 that includes a watch body 1254 coupled with a watch band 1262. The watch body 1254 and the watch band 1262 can have a substantially rectangular or circular shape and can be configured to allow a user to wear the wrist-wearable device 1250 on a body part (e.g., a wrist). The wrist-wearable device 1250 can include a retaining mechanism 1267 (e.g., a buckle, a hook and loop fastener, etc.) for securing the watch band 1262 to the user's wrist. The wrist-wearable device 1250 can also include a coupling mechanism 1260 (e.g., a cradle) for detachably coupling the capsule or watch body 1254 (via a coupling surface of the watch body 1254) to the watch band 1262.

The wrist-wearable device 1250 can perform various functions associated with navigating through user interfaces and selectively opening applications, as described above with reference to Figures . . . [replace with citation to UI Figures related to watch]. As will be described in more detail below, operations executed by the wrist-wearable device 1250 can include, without limitation, display of visual content to the user (e.g., visual content displayed on display 1256); sensing user input (e.g., sensing a touch on peripheral button 1268, sensing biometric data on sensor 1264, sensing neuromuscular signals on neuromuscular sensor 1265, etc.);

messaging (e.g., text, speech, video, etc.); image capture; wireless communications (e.g., cellular, near field, Wi-Fi, personal area network, etc.); location determination; financial transactions; providing haptic feedback; alarms; notifications; biometric authentication; health monitoring; sleep monitoring; etc. These functions can be executed independently in the watch body 1254, independently in the watch band 1262, and/or in communication between the watch body 1254 and the watch band 1262. In some embodiments, functions can be executed on the wrist-wearable device 1250 in conjunction with an artificial-reality environment that includes, but is not limited to, virtual-reality (VR) environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments. As the skilled artisan will appreciate upon reading the descriptions provided herein, the novel wearable devices described herein can be used with any of these types of artificial-reality environments.

The watch band 1262 can be configured to be worn by a user such that an inner surface of the watch band 1262 is in contact with the user's skin. When worn by a user, sensor 1264 is in contact with the user's skin. The sensor 1264 can be a biosensor that senses a user's heart rate, saturated oxygen level, temperature, sweat level, muscle intentions, or a combination thereof. The watch band 1262 can include multiple sensors 1264 that can be distributed on an inside and/or an outside surface of the watch band 1262. Additionally, or alternatively, the watch body 1254 can include sensors that are the same or different than those of the watch band 1262 (or the watch band 1262 can include no sensors at all in some embodiments). For example, multiple sensors can be distributed on an inside and/or an outside surface of the watch body 1254. As described below with reference to FIGS. 12B and/or 12C, the watch body 1254 can include, without limitation, a front-facing image sensor 1225A and/or a rear-facing image sensor 1225B, a biometric sensor, an IMU, a heart rate sensor, a saturated oxygen sensor, a neuromuscular sensor(s), an altimeter sensor, a temperature sensor, a bioimpedance sensor, a pedometer sensor, an optical sensor (e.g., imaging sensor 12104), a touch sensor, a sweat sensor, etc. The sensor 1264 can also include a sensor that provides data about a user's environment including a user's motion (e.g., an IMU), altitude, location, orientation, gait, or a combination thereof. The sensor 1264 can also include a light sensor (e.g., an infrared light sensor, a visible light sensor) that is configured to track a position and/or motion of the watch body 1254 and/or the watch band 1262. The watch band 1262 can transmit the data acquired by sensor 1264 to the watch body 1254 using a wired communication method (e.g., a Universal Asynchronous Receiver/Transmitter (UART), a USB transceiver, etc.) and/or a wireless communication method (e.g., near field communication, Bluetooth, etc.). The watch band 1262 can be configured to operate (e.g., to collect data using sensor 1264) independent of whether the watch body 1254 is coupled to or decoupled from watch band 1262.

In some examples, the watch band 1262 can include a neuromuscular sensor 1265 (e.g., an EMG sensor, a mechanomyogram (MMG) sensor, a sonomyography (SMG) sensor, etc.). Neuromuscular sensor 1265 can sense a user's intention to perform certain motor actions. The sensed muscle intention can be used to control certain user interfaces displayed on the display 1256 of the wrist-wearable device 1250 and/or can be transmitted to a device responsible for rendering an artificial-reality environment (e.g., a head-mounted display) to perform an action in an associated artificial-reality environment, such as to control the motion of a virtual device displayed to the user.

Signals from neuromuscular sensor 1265 can be used to provide a user with an enhanced interaction with a physical object and/or a virtual object in an artificial-reality application generated by an artificial-reality system (e.g., user interface objects presented on the display 1256, or another computing device (e.g., a smartphone)). Signals from neuromuscular sensor 1265 can be obtained (e.g., sensed and recorded) by one or more neuromuscular sensors 1265 of the watch band 1262. Although FIG. 12A shows one neuromuscular sensor 1265, the watch band 1262 can include a plurality of neuromuscular sensors 1265 arranged circumferentially on an inside surface of the watch band 1262 such that the plurality of neuromuscular sensors 1265 contact the skin of the user. The watch band 1262 can include a plurality of neuromuscular sensors 1265 arranged circumferentially on an inside surface of the watch band 1262. Neuromuscular sensor 1265 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 1262 and/or watch body 1254 can include a haptic device 1263 (e.g., a vibratory haptic actuator) that is configured to provide haptic feedback (e.g., a cutaneous and/or kinesthetic sensation, etc.) to the user's skin. The sensors 1264 and 1265, and/or the haptic device 1263 can be configured to operate in conjunction with multiple applications including, without limitation, health monitoring, social media, game playing, and artificial reality (e.g., the applications associated with artificial reality).

The wrist-wearable device 1250 can include a coupling mechanism (also referred to as a cradle) for detachably coupling the watch body 1254 to the watch band 1262. A user can detach the watch body 1254 from the watch band 1262 in order to reduce the encumbrance of the wrist-wearable device 1250 to the user. The wrist-wearable device 1250 can include a coupling surface on the watch body 1254 and/or coupling mechanism(s) 1260 (e.g., a cradle, a tracker band, a support base, a clasp). A user can perform any type of motion to couple the watch body 1254 to the watch band 1262 and to decouple the watch body 1254 from the watch band 1262. For example, a user can twist, slide, turn, push, pull, or rotate the watch body 1254 relative to the watch band 1262, or a combination thereof, to attach the watch body 1254 to the watch band 1262 and to detach the watch body 1254 from the watch band 1262.

As shown in the example of FIG. 12A, the watch band coupling mechanism 1260 can include a type of frame or shell that allows the watch body 1254 coupling surface to be retained within the watch band coupling mechanism 1260. The watch body 1254 can be detachably coupled to the watch band 1262 through a friction fit, magnetic coupling, a rotation-based connector, a shear-pin coupler, a retention spring, one or more magnets, a clip, a pin shaft, a hook and loop fastener, or a combination thereof. In some examples, the watch body 1254 can be decoupled from the watch band 1262 by actuation of the release mechanism 1270. The release mechanism 1270 can include, without limitation, a button, a knob, a plunger, a handle, a lever, a fastener, a clasp, a dial, a latch, or a combination thereof.

As shown in FIGS. 12A-12B, the coupling mechanism 1260 can be configured to receive a coupling surface proximate to the bottom side of the watch body 1254 (e.g., a side opposite to a front side of the watch body 1254 where the display 1256 is located), such that a user can push the watch body 1254 downward into the coupling mechanism 1260 to attach the watch body 1254 to the coupling mechanism 1260. In some embodiments, the coupling mechanism 1260 can be configured to receive a top side of the watch body 1254 (e.g., a side proximate to the front side of the watch body 1254 where the display 1256 is located) that is pushed upward into the cradle, as opposed to being pushed downward into the coupling mechanism 1260. In some embodiments, the coupling mechanism 1260 is an integrated component of the watch band 1262 such that the watch band 1262 and the coupling mechanism 1260 are a single unitary structure.

The wrist-wearable device 1250 can include a single release mechanism 1270 or multiple release mechanisms 1270 (e.g., two release mechanisms 1270 positioned on opposing sides of the wrist-wearable device 1250 such as spring-loaded buttons). As shown in FIG. 12A, the release mechanism 1270 can be positioned on the watch body 1254 and/or the watch band coupling mechanism 1260. Although FIG. 12A shows release mechanism 1270 positioned at a corner of watch body 1254 and at a corner of watch band coupling mechanism 1260, the release mechanism 1270 can be positioned anywhere on watch body 1254 and/or watch band coupling mechanism 1260 that is convenient for a user of wrist-wearable device 1250 to actuate. A user of the wrist-wearable device 1250 can actuate the release mechanism 1270 by pushing, turning, lifting, depressing, shifting, or performing other actions on the release mechanism 1270. Actuation of the release mechanism 1270 can release (e.g., decouple) the watch body 1254 from the watch band coupling mechanism 1260 and the watch band 1262 allowing the user to use the watch body 1254 independently from watch band 1262. For example, decoupling the watch body 1254 from the watch band 1262 can allow the user to capture images using rear-facing image sensor 1225B.

FIG. 12B includes top views of examples of the wrist-wearable device 1250. The examples of the wrist-wearable device 1250 shown in FIGS. 12A-12B can include a coupling mechanism 1260 (as shown in FIG. 12B, the shape of the coupling mechanism can correspond to the shape of the watch body 1254 of the wrist-wearable device 1250). The watch body 1254 can be detachably coupled to the coupling mechanism 1260 through a friction fit, magnetic coupling, a rotation-based connector, a shear-pin coupler, a retention spring, one or more magnets, a clip, a pin shaft, a hook and loop fastener, or any combination thereof.

In some examples, the watch body 1254 can be decoupled from the coupling mechanism 1260 by actuation of a release mechanism 1270. The release mechanism 1270 can include, without limitation, a button, a knob, a plunger, a handle, a lever, a fastener, a clasp, a dial, a latch, or a combination thereof. In some examples, the wristband system functions can be executed independently in the watch body 1254, independently in the coupling mechanism 1260, and/or in communication between the watch body 1254 and the coupling mechanism 1260. The coupling mechanism 1260 can be configured to operate independently (e.g., execute functions independently) from watch body 1254. Additionally, or alternatively, the watch body 1254 can be configured to operate independently (e.g., execute functions independently) from the coupling mechanism 1260. As described below with reference to the block diagram of FIG. 12A, the coupling mechanism 1260 and/or the watch body 1254 can each include the independent resources required to independently execute functions. For example, the coupling mechanism 1260 and/or the watch body 1254 can each include a power source (e.g., a battery), a memory, data storage, a processor (e.g., a central processing unit (CPU)), communications, a light source, and/or input/output devices.

The wrist-wearable device 1250 can have various peripheral buttons 1272, 1274, and 1276, for performing various operations at the wrist-wearable device 1250. Also, various sensors, including one or both of the sensors 1264 and 1265, can be located on the bottom of the watch body 1254, and can optionally be used even when the watch body 1254 is detached from the watch band 1262.

Figure 12C:
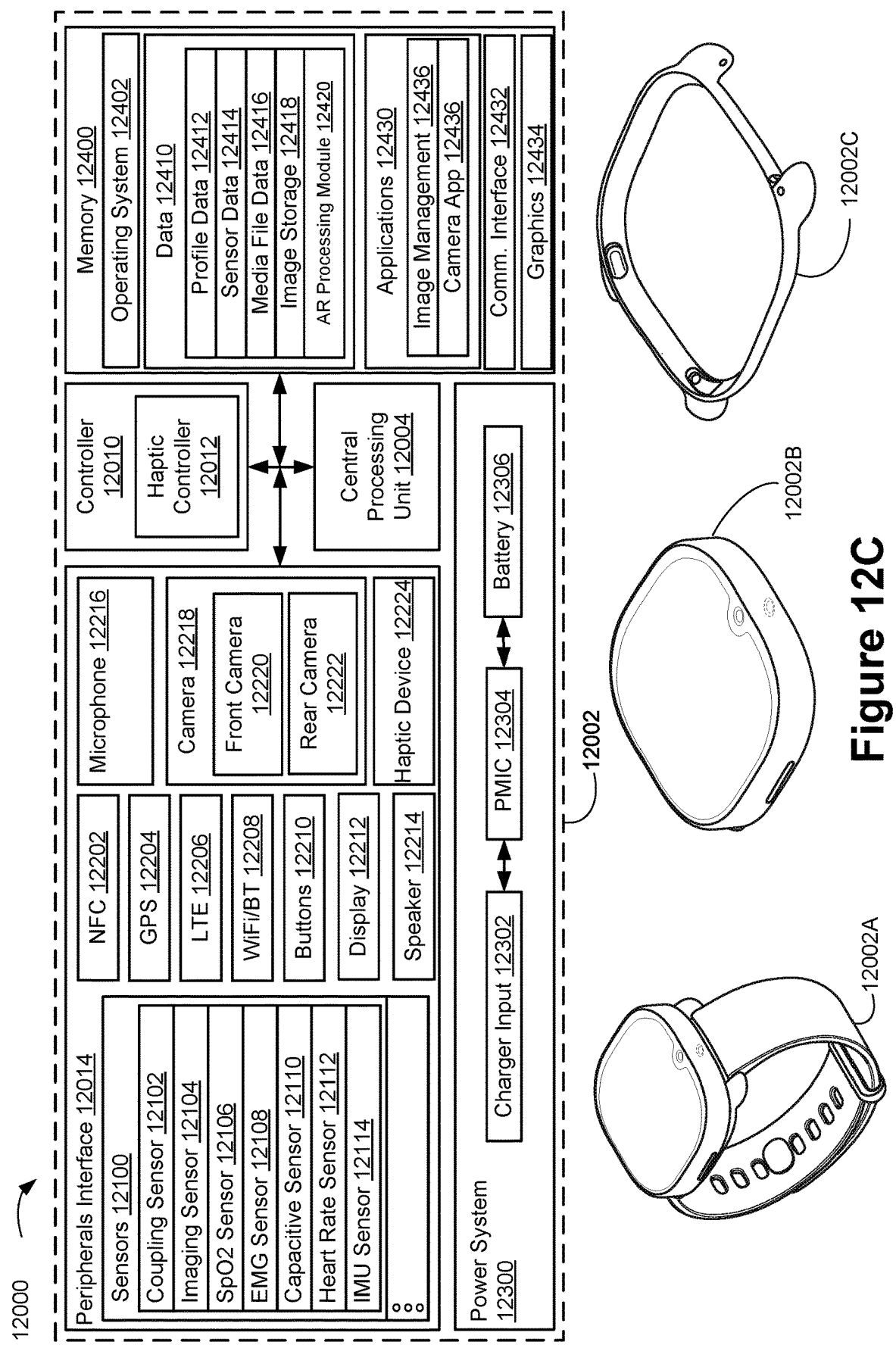

FIG. 12C is a block diagram of a computing system 12000, according to at least one embodiment of the present disclosure. The computing system 12000 includes an electronic device 12002, which can be, for example, a wrist-wearable device. The wrist-wearable device 1250 described in detail above with respect to FIGS. 12A-12B is an example of the electronic device 12002, so the electronic device 12002 will be understood to include the components shown and described below for the computing system 12000. In some embodiments, all, or a substantial portion of the components of the computing system 12000 are included in a single integrated circuit. In some embodiments, the computing system 12000 can have a split architecture (e.g., a split mechanical architecture, a split electrical architecture) between a watch body (e.g., a watch body 1254 in FIGS. 12A-12B) and a watch band (e.g., a watch band 1262 in FIGS. 12A-12B). The electronic device 12002 can include a processor (e.g., a central processing unit 12004), a controller 12010, a peripherals interface 12014 that includes one or more sensors 12100 and various peripheral devices, a power source (e.g., a power system 12300), and memory (e.g., a memory 12400) that includes an operating system (e.g., an operating system 12402), data (e.g., data 12410), and one or more applications (e.g., applications 12430).

In some embodiments, the computing system 12000 includes the power system 12300 which includes a charger input 12302, a power-management integrated circuit (PMIC) 12304, and a battery 12306.

In some embodiments, a watch body and a watch band can each be electronic devices 12002 that each have respective batteries (e.g., battery 12306), and can share power with each other. The watch body and the watch band can receive a charge using a variety of techniques. In some embodiments, the watch body and the watch band can use a wired charging assembly (e.g., power cords) to receive the charge. Alternatively, or in addition, the watch body and/or the watch band can be configured for wireless charging. For example, a portable charging device can be designed to mate with a portion of watch body and/or watch band and wirelessly deliver usable power to a battery of watch body and/or watch band.

The watch body and the watch band can have independent power systems 12300 to enable each to operate independently. The watch body and watch band can also share power (e.g., one can charge the other) via respective PMICs 12304 that can share power over power and ground conductors and/or over wireless charging antennas.

In some embodiments, the peripherals interface 12014 can include one or more sensors 12100. The sensors 12100 can include a coupling sensor 12102 for detecting when the electronic device 12002 is coupled with another electronic device 12002 (e.g., a watch body can detect when it is coupled to a watch band, and vice versa). The sensors 12100 can include imaging sensors 12104 for collecting imaging data, which can optionally be the same device as one or more of the cameras 12218. In some embodiments, the imaging sensors 12104 can be separate from the cameras 12218. In some embodiments the sensors include an SpO2 sensor 12106. In some embodiments, the sensors 12100 include an EMG sensor 12108 for detecting, for example muscular movements by a user of the electronic device 12002. In some embodiments, the sensors 12100 include a capacitive sensor 12110 for detecting changes in potential of a portion of a user's body. In some embodiments, the sensors 12100 include a heart rate sensor 12112. In some embodiments, the sensors 12100 include an inertial measurement unit (IMU) sensor 12114 for detecting, for example, changes in acceleration of the user's hand.

In some embodiments, the peripherals interface 12014 includes a near-field communication (NFC) component 12202, a global-position system (GPS) component 12204, a long-term evolution (LTE) component 12206, and or a Wi-Fi or Bluetooth communication component 12208.

In some embodiments, the peripherals interface includes one or more buttons (e.g., the peripheral buttons 1272, 1274, and 1276 in FIG. 12B), which, when selected by a user, cause operation to be performed at the electronic device 12002.

The electronic device 12002 can include at least one display 12212, for displaying visual affordances to the user, including user-interface elements and/or three-dimensional virtual objects. The display can also include a touch screen for inputting user inputs, such as touch gestures, swipe gestures, and the like.

The electronic device 12002 can include at least one speaker 12214 and at least one microphone 12216 for providing audio signals to the user and receiving audio input from the user. The user can provide user inputs through the microphone 12216 and can also receive audio output from the speaker 12214 as part of a haptic event provided by the haptic controller 12012.

The electronic device 12002 can include at least one camera 12218, including a front camera 12220 and a rear camera 12222. In some embodiments, the electronic device 12002 can be a head-wearable device, and one of the cameras 12218 can be integrated with a lens assembly of the head-wearable device.

One or more of the electronic devices 12002 can include one or more haptic controllers 12012 and associated componentry for providing haptic events at one or more of the electronic devices 12002 (e.g., a vibrating sensation or audio output in response to an event at the electronic device 12002). The haptic controllers 12012 can communicate with one or more electroacoustic devices, including a speaker of the one or more speakers 12214 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 12012 can provide haptic events to that are capable of being sensed by a user of the electronic devices 12002. In some embodiments, the one or more haptic controllers 12012 can receive input signals from an application of the applications 12430.

Memory 12400 optionally includes high-speed random-access memory and optionally also includes non-volatile memory, such as one or more magnetic disk storage devices, flash memory devices, or other non-volatile solid-state memory devices. Access to the memory 12400 by other components of the electronic device 12002, such as the one or more processors of the central processing unit 12004, and the peripherals interface 12014 is optionally controlled by a memory controller of the controllers 12010.

In some embodiments, software components stored in the memory 12400 can include one or more operating systems 12402 (e.g., a Linux-based operating system, an Android operating system, etc.). The memory 12400 can also include data 12410, including structured data (e.g., SQL databases, MongoDB databases, GraphQL data, JSON data, etc.). The data 12410 can include profile data 12412, sensor data 12414, media file data 12414.

In some embodiments, software components stored in the memory 12400 include one or more applications 12430 configured to be perform operations at the electronic devices 12002. In some embodiments, the one or more applications 12430 include one or more communication interface modules 12432, one or more graphics modules 12434, one or more camera application modules 12436. In some embodiments, a plurality of applications 12430 can work in conjunction with one another to perform various tasks at one or more of the electronic devices 12002.

It should be appreciated that the electronic devices 12002 are only some examples of the electronic devices 12002 within the computing system 12000, and that other electronic devices 12002 that are part of the computing system 12000 can have more or fewer components than shown optionally combines two or more components, or optionally have a different configuration or arrangement of the components. The various components shown in FIG. 12C are implemented in hardware, software, firmware, or a combination thereof, including one or more signal processing and/or application-specific integrated circuits.

As illustrated by the lower portion of FIG. 12C, various individual components of a wrist-wearable device can be examples of the electronic device 12002. For example, some or all of the components shown in the electronic device 12002 can be housed or otherwise disposed in a combined watch device 12002A, or within individual components of the capsule device watch body 12002B, the cradle portion 12002C, and/or a watch band.

Figure 12D:
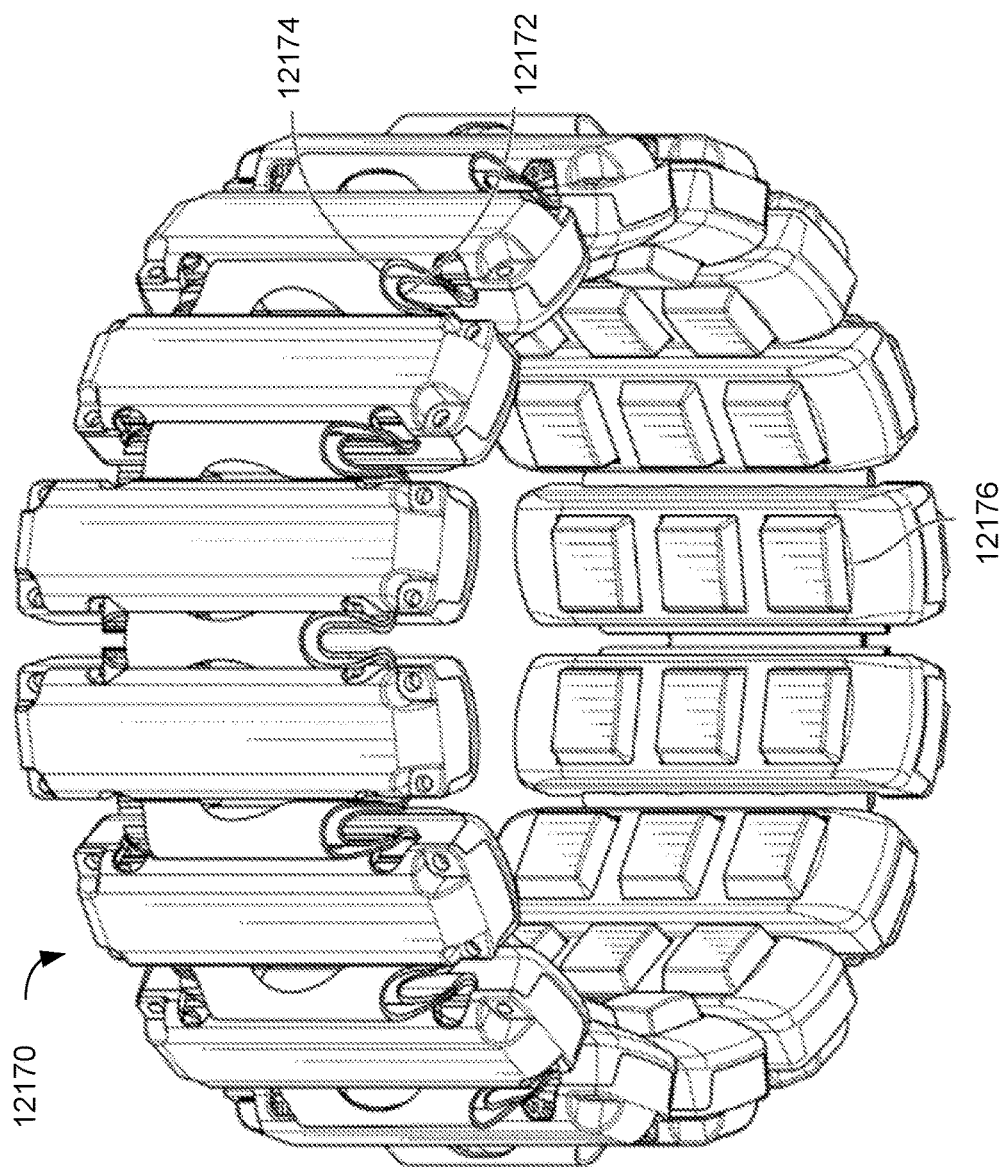

FIG. 12D illustrates a wearable device 12170, in accordance with some embodiments. In some embodiments, the wearable device 12170 is used to generate control information (e.g., sensed data about neuromuscular signals or instructions to perform certain commands after the data is sensed) for causing a computing device to perform one or more input commands. In some embodiments, the wearable device 12170 includes a plurality of neuromuscular sensors 12176. In some embodiments, the plurality of neuromuscular sensors 12176 includes a predetermined number of (e.g., 16) neuromuscular sensors (e.g., EMG sensors) arranged circumferentially around an elastic band 12174. The plurality of neuromuscular sensors 12176 may include any suitable number of neuromuscular sensors. In some embodiments, the number and arrangement of neuromuscular sensors 12176 depends on the particular application for which the wearable device 12170 is used. For instance, a wearable device 12170 configured as an armband, wristband, or chest-band may include a plurality of neuromuscular sensors 12176 with different number of neuromuscular sensors and different arrangement for each use case, such as medical use cases as compared to gaming or general day-to-day use cases. For example, at least 16 neuromuscular sensors 12176 may be arranged circumferentially around elastic band 12174.

In some embodiments, the elastic band 12174 is configured to be worn around a user's lower arm or wrist. The elastic band 12174 may include a flexible electronic connector 12172. In some embodiments, the flexible electronic connector 12172 interconnects separate sensors and electronic circuitry that are enclosed in one or more sensor housings. Alternatively, in some embodiments, the flexible electronic connector 12172 interconnects separate sensors and electronic circuitry that are outside of the one or more sensor housings. Each neuromuscular sensor of the plurality of neuromuscular sensors 12176 can include a skin-contacting surface that includes one or more electrodes. One or more sensors of the plurality of neuromuscular sensors 12176 can be coupled together using flexible electronics incorporated into the wearable device 12170. In some embodiments, one or more sensors of the plurality of neuromuscular sensors 12176 can be integrated into a woven fabric, wherein the fabric one or more sensors of the plurality of neuromuscular sensors 12176 are sewn into the fabric and mimic the pliability of fabric (e.g., the one or more sensors of the plurality of neuromuscular sensors 12176 can be constructed from a series woven strands of fabric). In some embodiments, the sensors are flush with the surface of the textile and are indistinguishable from the textile when worn by the user.

Figure 12E:
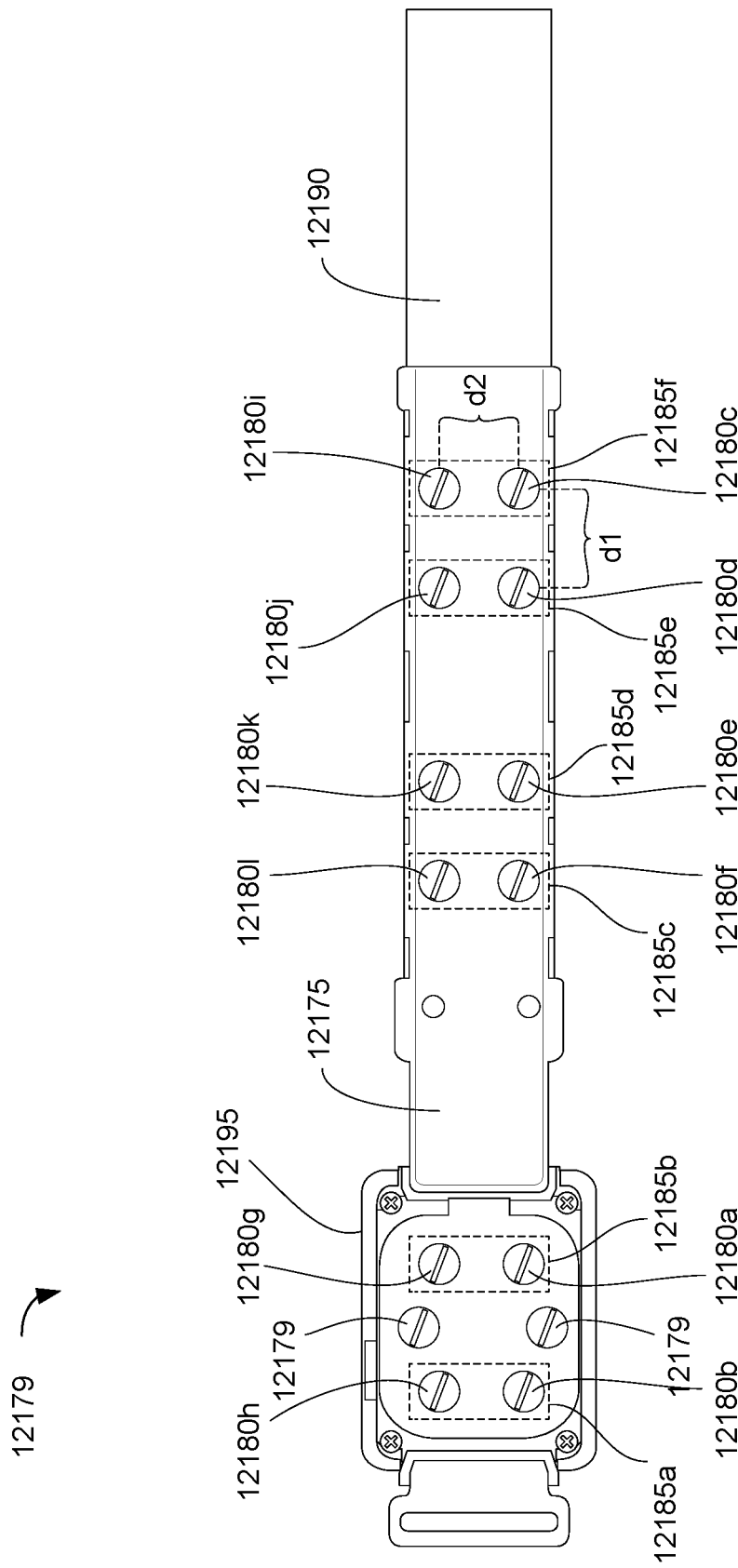

FIG. 12E illustrates a wearable device 12179 in accordance with some embodiments. The wearable device 12179 includes paired sensor channels 12185a-12185f along an interior surface of a wearable structure 12175 that are configured to detect neuromuscular signals. Different number of paired sensors channels can be used (e.g., one pair of sensors, three pairs of sensors, four pairs of sensors, or six pairs of sensors). The wearable structure 12175 can include a band portion 12190, a capsule portion 12195, and a cradle portion (not pictured) that is coupled with the band portion 12190 to allow for the capsule portion 12195 to be removably coupled with the band portion 12190. For embodiments in which the capsule portion 12195 is removable, the capsule portion 12195 can be referred to as a removable structure, such that in these embodiments the wearable device includes a wearable portion (e.g., band portion 12190 and the cradle portion) and a removable structure (the removable capsule portion which can be removed from the cradle). In some embodiments, the capsule portion 12195 includes the one or more processors and/or other components of the wrist-wearable device 170 described above in reference to FIG. 11. The wearable structure 12175 is configured to be worn by a user 115. More specifically, the wearable structure 12175 is configured to couple the wearable device 12179 to a wrist, arm, forearm, or other portion of the user's body. Each paired sensor channels 12185a-12185f includes two electrodes 12180 (e.g., electrodes 12180a-12180h) for sensing neuromuscular signals based on differential sensing within each respective sensor channel. In accordance with some embodiments, the wearable device 12170 further includes an electrical ground and a shielding electrode.

The techniques described above can be used with any device for sensing neuromuscular signals, including the arm-wearable devices of FIG. 12A-12C, but could also be used with other types of wearable devices for sensing neuromuscular signals (such as body-wearable or head-wearable devices that might have neuromuscular sensors closer to the brain or spinal column).

In some embodiments, a wrist-wearable device can be used in conjunction with a head-wearable device described below, and the wrist-wearable device can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR glasses and VR headsets.

Example Head-Wearable Devices

Figure 13A:
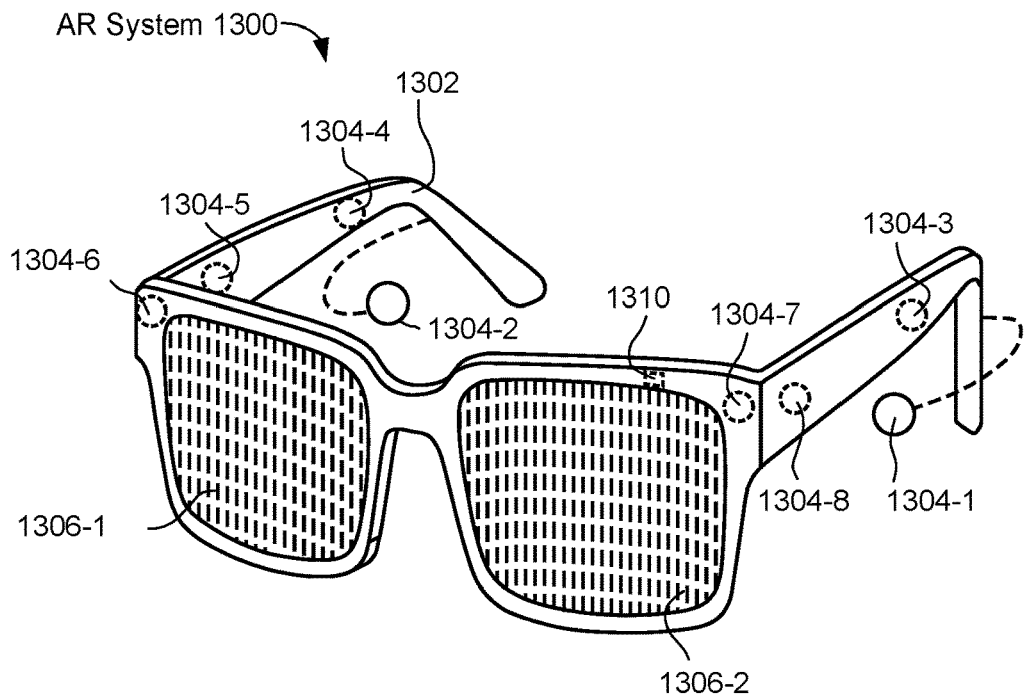
FIGS. 13A-13B illustrate an example AR system in accordance with some embodiments.

FIG. 13A shows an example AR system 1300 in accordance with some embodiments. In FIG. 13A, the AR system 1300 includes an eyewear device with a frame 1302 configured to hold a left display device 1306-1 and a right display device 1306-2 in front of a user's eyes. The display devices 1306-1 and 1306-2 may act together or independently to present an image or series of images to a user. While the AR system 1300 includes two displays, embodiments of this disclosure may be implemented in AR systems with a single near-eye display (NED) or more than two NEDs.

In some embodiments, the AR system 1300 includes one or more sensors, such as the acoustic sensors 1304. For example, the acoustic sensors 1304 can generate measurement signals in response to motion of the AR system 1300 and may be located on substantially any portion of the frame 1302. Any one of the sensors may be a position sensor, an IMU, a depth camera assembly, or any combination thereof. In some embodiments, the AR system 1300 includes more or fewer sensors than are shown in FIG. 13A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 1300 includes a microphone array with a plurality of acoustic sensors 1304-1 through 1304-8, referred to collectively as the acoustic sensors 1304. The acoustic sensors 1304 may be transducers that detect air pressure variations induced by sound waves. In some embodiments, each acoustic sensor 1304 is configured to detect sound and convert the detected sound into an electronic format (e.g., an analog or digital format). In some embodiments, the microphone array includes ten acoustic sensors: 1304-1 and 1304-2 designed to be placed inside a corresponding ear of the user, acoustic sensors 1304-3, 1304-4, 1304-5, 1304-6, 1304-7, and 1304-8 positioned at various locations on the frame 1302, and acoustic sensors positioned on a corresponding neckband, where the neckband is an optional component of the system that is not present in certain embodiments of the artificial-reality systems discussed herein.

The configuration of the acoustic sensors 1304 of the microphone array may vary. While the AR system 1300 is shown in FIG. 13A having ten acoustic sensors 1304, the number of acoustic sensors 1304 may be more or fewer than ten. In some situations, using more acoustic sensors 1304 increases the amount of audio information collected and/or the sensitivity and accuracy of the audio information. In contrast, in some situations, using a lower number of acoustic sensors 1304 decreases the computing power required by a controller to process the collected audio information. In addition, the position of each acoustic sensor 1304 of the microphone array may vary. For example, the position of an acoustic sensor 1304 may include a defined position on the user, a defined coordinate on the frame 1302, an orientation associated with each acoustic sensor, or some combination thereof.

The acoustic sensors 1304-1 and 1304-2 may be positioned on different parts of the user's ear. In some embodiments, there are additional acoustic sensors on or surrounding the ear in addition to acoustic sensors 1304 inside the ear canal. In some situations, having an acoustic sensor positioned next to an ear canal of a user enables the microphone array to collect information on how sounds arrive at the ear canal. By positioning at least two of the acoustic sensors 1304 on either side of a user's head (e.g., as binaural microphones), the AR device 1300 is able to simulate binaural hearing and capture a 3D stereo sound field around a user's head. In some embodiments, the acoustic sensors 1304-1 and 1304-2 are connected to the AR system 1300 via a wired connection, and in other embodiments, the acoustic sensors 1304-1 and 1304-2 are connected to the AR system 1300 via a wireless connection (e.g., a Bluetooth connection). In some embodiments, the AR system 1300 does not include the acoustic sensors 1304-1 and 1304-2.

The acoustic sensors 1304 on the frame 1302 may be positioned along the length of the temples, across the bridge of the nose, above or below the display devices 1306-1 and 1306-2, or in some combination thereof. The acoustic sensors 1304 may be oriented such that the microphone array is able to detect sounds in a wide range of directions surrounding the user that is wearing the AR system 1300. In some embodiments, a calibration process is performed during manufacturing of the AR system 1300 to determine relative positioning of each acoustic sensor 1304 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 1300 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices. The other devices may provide certain functions (e.g., tracking, localizing, depth mapping, processing, storage, etc.) to the AR system 1300. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 1300. For example, the controller may process information from the acoustic sensors 1304. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 1300 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-wearable display system, such as the VR system 1350 in FIG. 13B, which mostly or completely covers a user's field of view.

Figure 13B:
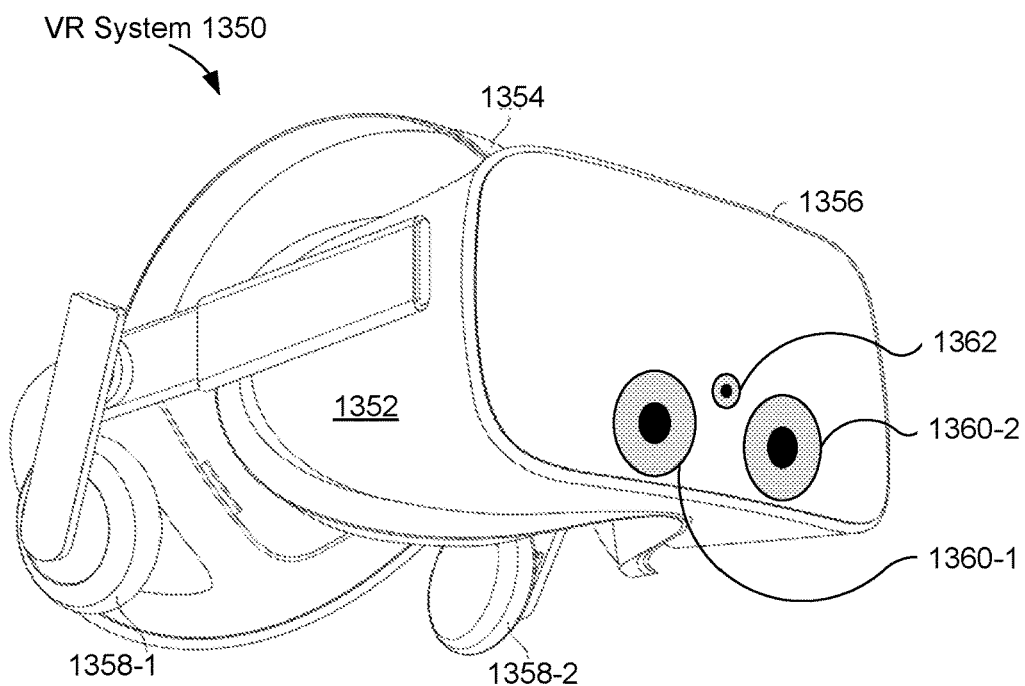

FIG. 13B shows a VR system 1350 (e.g., also referred to herein as VR headsets or VR headset) in accordance with some embodiments. The VR system 1350 includes a head-mounted display (HMD) 1352. The HMD 1352 includes a front body 1356 and a frame 1354 (e.g., a strap or band) shaped to fit around a user's head. In some embodiments, the HMD 1352 includes output audio transducers 1358-1 and 1358-2, as shown in FIG. 13B (e.g., transducers). In some embodiments, the front body 1356 and/or the frame 1354 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 1300 and/or the VR system 1350 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1300 and/or the VR system 1350 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 1300 and/or the VR system 1350 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 13B shows VR system 1350 having cameras 1360-1 and 1360-2 that can be used to provide depth information for creating a voxel field and a two-dimensional mesh to provide object information to the user to avoid collisions. FIG. 13B also shows that the VR system includes one or more additional cameras 1362 that are configured to augment the cameras 1360-1 and 1360-2 by providing more information. For example, the additional cameras 1362 can be used to supply color information that is not discerned by cameras 1360-1 and 1360-2. In some embodiments, cameras 1360-1 and 1360-2 and additional cameras 1362 can include an optional IR cut filter configured to remove IR light from being received at the respective camera sensors.

In some embodiments, the AR system 1300 and/or the VR system 1350 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above can be used with any device for interacting with an artificial-reality environment, including the head-wearable devices of FIG. 13A-13B, but could also be used with other types of wearable devices for sensing neuromuscular signals (such as body-wearable or head-wearable devices that might have neuromuscular sensors closer to the brain or spinal column). Having thus described example wrist-wearable device and head-wearable devices, attention will now be turned to example feedback systems that can be integrated into the devices described above or be a separate device.

Having thus described system-block diagrams and then example wearable devices, attention will now be directed to certain example embodiments.

Example Aspects

A few example aspects will now be briefly described.

(A1) In accordance with some embodiments, a method of using a gesture detected based on data from a wrist-wearable device to cause presentation of camera data at a head-wearable device is disclosed. The method includes receiving data generated based on performance of an in-air hand gesture by a user is wearing a wrist-wearable device that is wearing a wrist-wearable device and, in accordance with a determination that the data indicates that the in-air hand gesture is a camera-control gesture, causing presentation to the user, via a display of a head-wearable device that is worn by the user and that is in communication with the wrist-wearable device, of a representation of camera data from a camera that is in communication with one or both of the wrist-wearable device and the head-wearable device.

(A2) In some embodiments of A1, the camera is selected from among one or more available cameras that are communicatively coupled to the wrist-wearable device or the head-wearable device based on a characteristic of the in-air hand gesture.

(A3) In some embodiments of any of A1 and A2, the camera-control gesture causes capturing of an image using the camera, and the causing presentation to the user includes causing presentation, via the display of the head-wearable device, of the image captured by the camera.

(A4) In some embodiments of A3, the method further includes, after the image is captured, causing presentation of one or more options for sharing the image, and responsive to a user selection of a first option of the one or more options for sharing the image, causing the image to be sent to another electronic device.

(A5) In some embodiments of A4, the method further includes responsive to a user selection of a second option, distinct from the first option, of the one or more options for sharing the image with a specific contact, causing the image to be send to an electronic device associated with the specific contact.

(A6) In some embodiments of any of A3-A5, the image is one of a plurality of images, each respective image caused to be captured in accordance with the determination that the data indicates that the in-air hand gesture is the camera-control gesture, and the causing presentation to the user includes causing presentation of respective representations of each respective image of the plurality of images.

(A7) In some embodiments of any of A1-A6, the data is generated using, in part, one or more sensors of the wrist-wearable device, and while data generated by the one or more sensors of the wrist-wearable device indicates that the in-air hand gesture is maintained, continuing to cause the presentation of the representation of the camera data via the display of the head-wearable device.

(A8) In some embodiments of A7, continuing to cause the presentation of the representation of the camera data via the display of the head-wearable device includes causing presentation of a representation of a field of view of the camera to the user via the display of the head-wearable device.

(A9) In some embodiments of any of A7-A8, the method further includes in accordance with a determination that data generated by the one or more sensors of the wrist-wearable device indicates that the in-air hand gesture is no longer maintained, causing the presentation of the representation of the camera data via the display of the head-wearable device to cease.

(A10) In some embodiments of any of A7-A9, the method further includes, in accordance with a determination that data generated by the one or more sensors of the wrist-wearable device indicates that the in-air hand gesture is no longer maintained, causing a capture of an image within the field of view using the camera, and causing presentation of a representation of the image via the display of the head-wearable device.

(A11) In some embodiments of any of A7-A10, the in-air hand gesture is a single pinch gesture performed using at least two phalanges of a user's hand contacting one another, without any contact with a display of the wrist-wearable device.

(A12) In some embodiments of any of A1-A11, the method further includes receiving additional data generated based on performance of an additional in-air hand gesture by the user while the user is wearing the wrist-wearable device and, in accordance with a determination that the additional data indicates that the additional in-air hand gesture is not a camera-control gesture, forgo causing presentation of camera data via the display of the head-wearable device and causing activation of a microphone of the head-wearable device for allowing the user to provide a voice command to a digital assistant. The microphone is in communication with one or both of the wrist-wearable device and the head-wearable device.

(A13) In some embodiments of any of A1-A12, the in-air hand gesture is a first in-air hand gesture, and the method further includes, responsive to a determination that a second in-air hand gesture is performed while the first in-air hand gesture is maintained, causing a zoomed-in representation of the camera data to be presented via the display of the head-wearable device.

(A14) In some embodiments of A13, the method further includes in accordance with a determination that the first in-air hand gesture is no longer maintained while the zoomed-in representation of the camera data is being presented via the display of the head-wearable device, causing the camera to capture the zoomed-in representation of the camera data and causing presentation to the user, via the display of the head-wearable device that is worn by the user, an image of the zoomed-in representation of the camera data.

(A15) In some embodiments of A13, the method further includes responsive to a determination that a third in-air hand gesture is performed while the first in-air hand gesture is maintained, causing a zoomed-out representation of the camera data to be presented via the display of the head-wearable device.

(A16) In some embodiments of A15, the method includes, in accordance with a determination that the first in-air hand gesture is no longer maintained while the zoomed-out representation of the camera data is being presented via the display of the head-wearable device, causing the camera to capture the zoomed-out representation of the camera data and causing presentation to the user, via the display of the head-wearable device that is worn by the user, an image of the zoomed-out representation of the camera data.

(A17) In some embodiments of A15 or A16, the first in-air hand gesture is a maintained contact between at least two phalanges of a user's hand, the second in-air hand gesture is an in-air rotational movement of the user's wrist in a first direction, and the third in-air hand gesture is an in-air rotational movement of the user's wrist in a second direction distinct from the first direction.

(A18) In some embodiments of A12, the method further includes, upon determining that further data indicates that the additional in-air hand gesture is no longer maintained, causing deactivation of the microphone that is in communication with one or both of the wrist-wearable device and the head-wearable device.

(A19) In some embodiments of any of A1-A18, the camera is a first camera, and the method further includes in accordance with a determination that one or more characteristics of the in-air hand gesture are within a first threshold, causing the first camera to capture the camera data for presentation at the display of the head-wearable device that is worn by the user. The method also includes, in accordance with a determination that the one or more characteristics of the in-air hand gesture are within a second threshold, causing a second camera to capture the camera data for presentation at the display of the head-wearable device that is worn by the user.

(A20) In some embodiments of A19, the first camera is in proximity to the user and the second camera is remote to the user (A21) In some embodiments of any of A19 and A20, the one or more characteristics of the in-air hand gesture include one or more of a force, a duration, a number of contacts, and a pattern.

(A22) In some embodiments of A1, the method further includes receiving, via one or more sensors of the head-wearable device, facial movement related data based on the performance of a vestigial ear muscle gesture by the user that is wearing the head-wearable device. The method includes, in accordance with a determination that the facial movement related data indicates that the vestigial ear muscle gesture is a control gesture, causing the head-wearable device to provide one or more instructions for performing the control gesture at the head-wearable device and/or another communicatively coupled device.

(A23) In some embodiments of A22, the method further includes in accordance with a determination that the vestigial ear muscle gesture is a camera-control gesture for capturing image data via a communicatively coupled imaging device, capturing camera data via a camera that is in communicatively coupled with the head-wearable device and presenting to the user, via the display of the head-wearable device of a representation of camera data from the camera that is in communication with the head-wearable device.

(A24) In some embodiments of A22, the method further includes, in accordance with a determination that the vestigial ear muscle gesture is a video-control gesture, capturing a video using the camera.

(A25) In some embodiments of A22, the method further includes, in accordance with a determination that the vestigial ear muscle gesture is an application control-gesture, causing performance of one or more application specific operations.

(B1) In accordance with some embodiments, a method of being responsive to an indication that a user wearing a head-wearable device requests to enable vestigial ear muscle detection, initiating a vestigial muscle training mode. The method includes wile in vestigial training mode, presenting instructions to the user to perform a facial movement to move a respective vestigial ear muscle of one or more vestigial ear muscles. The method further includes in accordance with a determination that facial movement related data detected via sensors of the head-wearable device and based on the facial movement performed by the user satisfies detectable vestigial ear muscle movement criteria associated with movement of the respective vestigial ear muscle, providing an indication that a vestigial ear muscle movement was detected, receiving a user input to assign a vestigial ear muscle gesture to the vestigial ear muscle movement, and storing the facial movement related data associated with the vestigial ear muscle gesture.

(B2) In some embodiments of B1, the method includes in accordance with a determination that the facial movement related data does not satisfy the detectable vestigial ear muscle movement criteria associated with movement of the respective vestigial ear muscle, providing an indication that the respective vestigial ear muscle movement was not detected, and presenting additional instructions to the user to perform an additional facial movement.

(B3) In some embodiments of B2, presenting the additional instructions to the user to perform the facial movement includes instructing the user to move one or more facial muscles connected to the one or more vestigial ear muscles.

(B4) In some embodiments of B3, the method further includes in accordance with a determination that updated facial movement related data detected based on the movement of the facial muscle connected to the respective vestigial ear muscle satisfies detectable vestigial ear muscle movement criteria associated with movement of the respective vestigial ear muscle providing an indication that the vestigial ear muscle movement was detected, and presenting further instructions to the user to perform a further additional facial movement to isolate the one or more vestigial ear muscles without movement of the facial muscle connected to the respective vestigial ear muscle.

(B5) In some embodiments of any of B1-B4, the facial movement is a first facial movement, the facial movement related data is first facial movement related data, and the vestigial ear muscle gesture is a first vestigial ear muscle gesture. The method further includes after storing the first facial movement related data associated with the first vestigial ear muscle gesture, presenting instructions to the user to perform a second facial movement to move the respective vestigial ear muscle of the one or more vestigial ear muscles in a first direction. The method also includes, in accordance with a determination that second facial movement related data detected based on the second facial movement performed by the user satisfies detectable vestigial ear muscle movement criteria associated with movement of the respective vestigial ear muscle in the first direction, providing an indication that a first directional vestigial ear muscle movement was detected, receiving a user input to assign a second vestigial ear muscle gesture to the first directional vestigial ear muscle movement, and storing the second facial movement related data associated with the second vestigial ear muscle gesture.

(B6) In some embodiments of B1-B5, the facial movement is a first facial movement, the facial movement related data is first facial movement related data, and the vestigial ear muscle gesture is a first vestigial ear muscle gesture. The method further comprises, after storing the first facial movement related data associated with the first vestigial ear muscle gesture, presenting instructions to the user to perform a third facial movement to move a plurality of the one or more vestigial ear muscles. The method also includes in accordance with a determination that third facial movement related data detected based on the third facial movement performed by the user satisfies detectable vestigial ear muscle movement criteria associated with movement of the plurality of the one or more vestigial ear muscles, providing an indication that a plurality of vestigial ear muscle movements were detected, receiving a user input to assign a third vestigial ear muscle gesture to the plurality of vestigial ear muscle movements, and storing the third facial movement related data associated with the third vestigial ear muscle gesture.

(B7) In some embodiments of B6, wherein the first facial movement corresponds to movement of a first ear.

(B8) In some embodiments of B7, wherein the third facial movement to move the plurality of the one or more vestigial ear muscles correspond to moving the first ear and a second ear.

(B9) In some embodiments of B1-B8, wherein the indication is at least one of a visual indication, auditory indication, or haptic feedback indication.

(B10) In some embodiments of B1-B9, wherein the sensors of the head-wearable device are one or more EMG sensors.

(C1) In accordance with some embodiments, a head-wearable device for capturing and presenting representations of camera data responsive to a gesture performed at a wrist-wearable device, the head-wearable device configured to perform or cause performance of the method of any of A1-B10.

(D1) In accordance with some embodiments, a system for using a gesture detected at a wrist-wearable device to cause presentation of camera data at a head-wearable device, the system configured to perform or cause performance of the method of any of A1-B10.

(E1) In accordance with some embodiments, non-transitory, computer-readable storage medium including instructions that, when executed by a head-wearable device, a wrist-wearable device, or an intermediary device in communication with the head-wearable device and the wrist-wearable device, cause performance of the method of any of A1-B10.

(F1) In another aspect, a means on a wrist-wearable device, head-wearable device, and/or intermediary device for performing or causing performance of the method of any of claims A1-B10.

(G1) In accordance with some embodiments, a wrist-wearable device for detecting a gesture and causing presentation of camera data at a head-wearable device, the wrist-wearable device configured to perform or cause performance of the method of any of claims A1-B10.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of using a gesture detected based on data from a wrist-wearable device to cause presentation of camera data at a head-wearable device, the method comprising:
   receiving data generated based on performance of an in-air hand gesture by a user that is wearing the wrist-wearable device, the data being received from the wrist-wearable device;
   in accordance with a determination that the data indicates that the in-air hand gesture is a camera-control gesture:
      causing presentation to the user, via a display of a head-wearable device that is worn by the user and that is in communication with the wrist-wearable device, of a representation of camera data from a camera that is in communication with one or both of the wrist-wearable device and the head-wearable device;
   receiving additional data generated based on performance of an additional in-air hand gesture by the user while the user is wearing the wrist-wearable device; and
   in accordance with a determination that the additional data indicates that the additional in-air hand gesture is not a camera-control gesture:
      forgo causing presentation of camera data via the display of the head-wearable device and causing activation of a microphone for allowing the user to provide a voice command to a digital assistant, wherein the microphone is in communication with one or both of the wrist-wearable device and the head-wearable device.

2. The method of claim 1, wherein:
the camera is selected from among one or more available cameras that are communicatively coupled to the wrist-wearable device or the head-wearable device based on a characteristic of the in-air hand gesture.

3. The method of claim 1, wherein:
the camera-control gesture causes capturing of an image using the camera; and
the causing presentation to the user includes causing presentation, via the display of the head-wearable device, of the image captured by the camera.

4. The method of claim 3, further comprising:
after the image is captured, causing presentation of one or more options for sharing the image; and
responsive to a user selection of a first option of the one or more options for sharing the image, causing the image to be sent to another electronic device.

5. The method of claim 1, further comprising:
in accordance with a determination that data generated by the one or more sensors of the wrist-wearable device indicates that the in-air hand gesture is no longer maintained, causing the presentation of the representation of the camera data via the display of the head-wearable device to cease.

6. The method of claim 1, further comprising:
in accordance with a determination that data generated by the one or more sensors of the wrist-wearable device indicates that the in-air hand gesture is no longer maintained:
   causing a capture of an image within the field of view using the camera; and
   causing presentation of a representation of the image via the display of the head-wearable device.

7. The method of claim 1, wherein the in-air hand gesture is a single pinch gesture performed using at least two phalanges of a user's hand contacting one another, without any contact with a display of the wrist-wearable device.

8. The method of claim 1, wherein the in-air hand gesture is a first in-air hand gesture, and the method further comprises:
responsive to a determination that a second in-air hand gesture is performed while the first in-air hand gesture is maintained, causing a zoomed-in representation of the camera data to be presented via the display of the head-wearable device.

9. The method of claim 8, further comprising:
in accordance with a determination that the first in-air hand gesture is no longer maintained while the zoomed-in representation of the camera data is being presented via the display of the head-wearable device, causing the camera to capture the zoomed-in representation of the camera data; and
causing presentation to the user, via the display of the head-wearable device that is worn by the user, an image of the zoomed-in representation of the camera data.

10. The method of claim 8, further comprising:
responsive to a determination that a third in-air hand gesture is performed while the first in-air hand gesture is maintained, causing a zoomed-out representation of the camera data to be presented via the display of the head-wearable device.

11. The method of claim 10, further comprising:
in accordance with a determination that the first in-air hand gesture is no longer maintained while the zoomed-out representation of the camera data is being presented via the display of the head-wearable device, causing the camera to capture the zoomed-out representation of the camera data; and causing presentation to the user, via the display of the head-wearable device that is worn by the user, of an image of the zoomed-out representation of the camera data.

12. The method of claim 10, wherein:
the first in-air hand gesture is a maintained contact between at least two phalanges of a user's hand;
the second in-air hand gesture is an in-air rotational movement of the user's wrist in a first direction; and
the third in-air hand gesture is an in-air rotational movement of the user's wrist in a second direction distinct from the first direction.

13. The method of claim 1:
wherein the camera is a first camera, and the method further comprises:
in accordance with a determination that one or more characteristics of the in-air hand gesture are within a first threshold, causing the first camera to capture the camera data for presentation at the display of the head-wearable device that is worn by the user; and
in accordance with a determination that the one or more characteristics of the in-air hand gesture are within a second threshold, causing a second camera to capture the camera data for presentation at the display of the head-wearable device that is worn by the user.

14. The method of claim 1, further comprising:
receiving, via one or more sensors of the head-wearable device, facial movement related data based on performance of a vestigial ear muscle gesture by the user that is wearing the head-wearable device; and
in accordance with a determination that the facial movement related data indicates that the vestigial ear muscle gesture is a control gesture, causing the head-wearable device to provide one or more instructions for performing the control gesture at the head-wearable device and/or another communicatively coupled device.

15. A system comprising a head-wearable device and a wrist-wearable device, the system configured to:
receive data generated based on performance of an in-air hand gesture by a user that is wearing the wrist-wearable device, the data being received from the wrist-wearable device;
in accordance with a determination that the data indicates that the in-air hand gesture is a camera-control gesture:
cause presentation to the user, via a display of a head-wearable device that is worn by the user and that is in communication with the wrist-wearable device, of a representation of camera data from a camera that is in communication with one or both of the wrist-wearable device and the head-wearable device;
receive additional data generated based on performance of an additional in-air hand gesture by the user while the user is wearing the wrist-wearable device; and
in accordance with a determination that the additional data indicates that the additional in-air hand gesture is not a camera-control gesture:
forgo causing presentation of camera data via the display of the head-wearable device and causing activation of a microphone for allowing the user to provide a voice command to a digital assistant, wherein the microphone is in communication with one or both of the wrist-wearable device and the head-wearable device.

16. The system of claim 15 further configured to:
responsive to a determination that a second in-air hand gesture is performed while the first in-air hand gesture is maintained, cause a zoomed-in representation of the camera data to be presented via the display of the head-wearable device.

17. A non-transitory, computer-readable storage medium including instructions that when executed by a system including a head-wearable device and a wrist-wearable device, cause the system to:
receive data generated based on performance of an in-air hand gesture by a user that is wearing the wrist-wearable device, the data being received from the wrist-wearable device;
in accordance with a determination that the data indicates that the in-air hand gesture is a camera-control gesture:
cause presentation to the user, via a display of a head-wearable device that is worn by the user and that is in communication with the wrist-wearable device, of a representation of camera data from a camera that is in communication with one or both of the wrist-wearable device and the head-wearable device;
receive additional data generated based on performance of an additional in-air hand gesture by the user while the user is wearing the wrist-wearable device; and
in accordance with a determination that the additional data indicates that the additional in-air hand gesture is not a camera-control gesture:
forgo causing presentation of camera data via the display of the head-wearable device and causing activation of a microphone for allowing the user to provide a voice command to a digital assistant, wherein the microphone is in communication with one or both of the wrist-wearable device and the head-wearable device.

18. The non-transitory, computer-readable storage medium of claim 17, wherein the instructions, when executed by a system including a head-wearable device and a wrist-wearable device, further cause the system to:
responsive to a determination that a second in-air hand gesture is performed while the first in-air hand gesture is maintained, cause a zoomed-in representation of the camera data to be presented via the display of the head-wearable device.

19. The non-transitory, computer-readable storage medium of claim 18, wherein the instructions, when executed by a system including a head-wearable device and a wrist-wearable device, further cause the system to:
responsive to a determination that a third in-air hand gesture is performed while the first in-air hand gesture is maintained, cause a zoomed-out representation of the camera data to be presented via the display of the head-wearable device.

20. The non-transitory, computer-readable storage medium of claim 19, wherein:
the first in-air hand gesture is a maintained contact between at least two phalanges of a user's hand;
the second in-air hand gesture is an in-air rotational movement of the user's wrist in a first direction; and
the third in-air hand gesture is an in-air rotational movement of the user's wrist in a second direction distinct from the first direction.

* * * * *